United States Patent [19]

Hosokawa et al.

[11] Patent Number: 5,121,029
[45] Date of Patent: Jun. 9, 1992

[54] ELECTROLUMINESCENCE DEVICE HAVING AN ORGANIC ELECTROLUMINESCENT ELEMENT

[75] Inventors: Chishio Hosokawa; Tadashi Kusumoto; Hiroshi Tokailin; Hisahiro Higashi, all of Sodegaura, Japan

[73] Assignee: Idemitsu Kosan Co., Ltd., Tokyo, Japan

[21] Appl. No.: 461,407

[22] Filed: Jan. 5, 1990

Related U.S. Application Data

[63] Continuation-in-part of Ser. No. 448,214, Dec. 8, 1989, abandoned, and a continuation-in-part of Ser. No. 276,692, Nov. 28, 1988, abandoned.

[30] Foreign Application Priority Data

| Dec. 11, 1987 | [JP] | Japan | 62-312356 |
| Apr. 2, 1988 | [JP] | Japan | 63-080257 |
| Dec. 14, 1988 | [JP] | Japan | 63-313932 |
| Feb. 10, 1989 | [JP] | Japan | 1-029681 |
| Mar. 9, 1989 | [JP] | Japan | 1-054957 |
| Mar. 20, 1989 | [JP] | Japan | 1-068388 |
| Mar. 22, 1989 | [JP] | Japan | 1-067448 |
| Mar. 29, 1989 | [JP] | Japan | 1-075035 |

[51] Int. Cl.$^5$ .................................... H05B 33/14
[52] U.S. Cl. ............................ 313/504; 428/917
[58] Field of Search .......... 313/504, 503, 506; 252/301.16, 301.21, 301.26; 428/917

[56] References Cited

U.S. PATENT DOCUMENTS

| 3,112,197 | 11/1963 | Neugebauer et al. | 96/1 |
| 3,180,729 | 4/1965 | Klupfel et al. | 96/1 |
| 3,257,203 | 6/1966 | Süs et al. | 96/1.5 |
| 3,526,501 | 9/1970 | Fox | 96/1.5 |
| 3,567,450 | 4/1971 | Brantly et al. | 96/1.5 |
| 3,615,402 | 10/1971 | Rule | 96/1.5 |
| 3,615,404 | 10/1971 | Price | 96/1.5 |
| 3,644,211 | 2/1972 | Heller | 252/301.2 |
| 4,539,507 | 9/1985 | VanSlyke et al. | 313/504 |
| 4,672,265 | 6/1987 | Eguchi et al. | 313/504 |
| 4,734,338 | 3/1988 | Eguchi et al. | 428/690 |

FOREIGN PATENT DOCUMENTS 0281381  9/1988  European Pat. Off.
2222417 10/1974 France .

OTHER PUBLICATIONS

The Journal of Organic Chemistry, vol. 24, Jul–Dec. 1959; Tod W. Campbell et al., "Synthesis of Hydrocarbon Derivatives by the Witting Synthesis. I. Distyrylbenzenes," pp. 1246–1251.
Applied Physics Letters, vol. 51, No. 12, Sep. 21, 1987, C. W. Tang et al., "Organic Electroluminescent Diodes," pp. 913–915.
Japanese Journal of Applied Physics, vol. 27, No. 2, Feb. 1988, Chiyaya Adachi et al., "Electroluminescence in Organic Films with Three-Layer Structure," pp. L 269-L-271.

*Primary Examiner*—Sandra L. O'Shea
*Attorney, Agent, or Firm*—Frishauf, Holtz, Goodman & Woodward

[57] ABSTRACT

An electroluminescence device (EL device) and method of manufacture thereof in which an emitting material is made of an organic compound represented by general formula (I), (I') or (II):

$$X-CH=CH-Y-CH=CH-Z \quad (I)$$

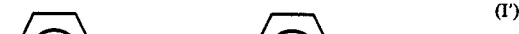

$$X-CH=CH-Z \quad (II)$$

The EL device displays a high brightness by applying only low voltage.

10 Claims, 1 Drawing Sheet

Figure
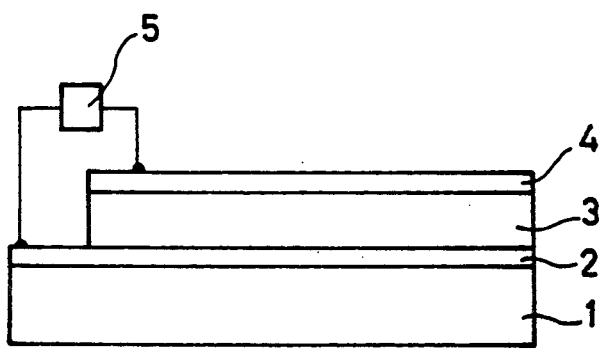

ELECTROLUMINESCENCE DEVICE HAVING AN ORGANIC ELECTROLUMINESCENT ELEMENT

This is a continuation-in-part of both application Ser. No. 07/276,692 filed Nov. 28, 1988 (abandoned) and Ser. No. 07/448,214 filed Dec. 8, 1989 (abandoned).

BACKGROUND OF THE INVENTION

1. Field of the Invention

The present invention relates to an electroluminescence device, and more particularly to an electroluminescence device to be used as an emitting material for various display devices.

2. Detailed Description of Relates Arts

An electroluminescence device (hereinafter referred to as an "EL" device) is easily distinguished because it emits light, and durable to impacts because it is a completely solid device. An EL device using ZnS:Mn, which is an inorganic phosphor, has been widely used. Such inorganic EL devices, however, need an applied voltage that is as high as about 200 V to emit light. Therefore, the driving method is complicated. Given these circumstances, organic thin film EL devices using various materials are now under investigation because they permit greatly reduced voltages to be applied. Vincett et al. produced an EL device using a vacuum-deposited film (luminescent film) of anthracene having a film thickness of about 0.6 μm as an emitting material, and obtained a blue visible light which is visible under normal illumination with an applied voltage of 30 V. (Thin Solid Film, 94 (1982) 171). EL brightness of this device, however, is unsatisfactory and needs a high applied voltage. Furthermore, it is not sufficiently efficient for practical use.

An organic EL device displaying high brightness and relatively high emission efficiency upon application of a low voltage of less than 25 V, has also been developed (U.S. Pat. No. 4,539,507). This device is a multi-layer type of electrode/positive hole injection layer/emitting layer/electrode, in which the film thickness between electrodes must be less than 1 μm. Thus, pinholes are readily formed unless the film quality of the emitting layer is satisfactory, and it should be noted that productivity is low. Although blue light is obtained in this EL device when tetraphenylbutadiene is used as the emitting layer, the efficiency of this device in the bright emission range is as low as 0.008 lm/W that it is unsatisfactory. In order to obtain emissions of blue light, it is necessary to use a material having a peak wavelength of 450 to 480 nm. However, it has been difficult to obtain an efficiency higher than 0.05 lm/W., because the sensitivity of the eye to this wavelength range is about two-tenth lower than that to the green range. Nevertheless, the formation of this device of electrode/hole injection layer/emitting layer/electrode was a breakthrough in that it enabled a bright emission to be obtained upon application of a low voltage when the emitting material forming a emitting layer was properly chosen.

Among the multi-layer EL devices mentioned above, a device, using a diamine compound as the hole injection layer and a complex of aluminum with 8-hydroxyquinoline as the emitting layer, has been developed (Appl. Phys. Lett., 51 (1987) 913). This device emits a green light with a brightness of more than 1000 cd/m$^2$ at a low voltage of about 10 V. It should be noted, however, that also the film thickness between electrodes must be very thin, for example, about 130 nm; and therefore the device has the drawback that pinholes are readily formed unless the quality of the thin film is satisfactory, as in the above-mentioned device.

According to European Patent Application Laid-open No. 0281381 an EL device of a multi-layer type with positive electrode/positive hole injection and transportation zone/emitting zone/negative electrode, is disclosed. The emitting zone of this device is made of a thin film comprising a host material and a very small amount of a fluorescent material doped onto the host material. This EL device emits a strong light in the green-red range when a low voltage is applied. built-in by LB process, one of which is a layer made of a luminescent compound having electron accepting property, and the other, a layer made of a luminescent compound with electron donating property, are disclosed in the specifications of U.S. Pat. Nos. 4672265, 4725531, 4734338, 4741976 and 4775820, etc. The luminescent compounds in these elements have a high luminescence quantum efficiency, and a π-electron system which is sensitive to external perturbations. These compounds permit electrical excitation.

In these EL devices, however, it is necessary that the light-emitting layer comprises two layers, in contrast to a emitting layer made of one layer comprising one specified compound in the previously mentioned formation of hole injection layer/emitting layer.

In these EL devices, the EL is caused by the formation of exciplexes, which takes place between the electron donating and the electron accepting compounds forming the two layers, in the vicinity of the interface between these two layers. Thus, the luminescence performance is strongly dependent on the state of the interface. Therefore, the production conditions are delicate in these EL devices, and the EL is reduced remarkably with the degradation of the interface. Furthermore, the EL of exciplexes has a tendency to shift to a longer wavelength than the photo luminescence of the compound itself, i.e. that of the one-layered emission layer, and thus, the emission of blue light with a short wavelength is so difficult that it cannot be achieved by using the EL of exciplexes.

In the EL devices disclosed in the specifications of U.S. Pat. Nos. 4672265 and 4725513, at least one of the two light emitting layers is a molecular accumulated film prepared by the LB process. The long alkyl chain to be used in the molecular accumulated film has a low heat resistant temperature of about 100° C. and is not stable against heating (Kobunshi Gakkaishi, 36 (1987) 267). Therefore, the abovementioned mono molecular built-up film is damaged during vacuum evaporation of the opposite electrode, resulting in a low production yield of the EL devices. Another serious drawback of this mono molecular built-up film lies in that the long alkyl chains are aligned almost perpendicular to an electrode, forming an insulating layer which greatly hinders the mobility of charges. Thus, the EL performance of this device is not satisfactory, because recombinations of electrons and holes are hindered and it is unsuitable for practical use. The two-layer-structured light emitting layer, to which the insulating layer is added, disclosed in the specifications of U.S. Pat. Nos. 4734338, 4741976 and 4775820, has unsatisfactory EL performance and is unsuitable for practical use because the mobility of charges is hindered. Thus, the formations of the EL devices proposed in the specifications of U.S. Pat. Nos. 4672265 to 4775820 have, at present, unsatisfactory performance and have not made any contribution to technological advancement.

In general, it is believed to be important that the emitting materials forming the emitting layer of an EL device have the property of fluorescence in a solid state. Many conventional fluorescent materials, however, lose their fluorescence efficiency in a solid state while they emit fluorescent light as a solution. Fluorescein, rhodamine-based dyes and cyanine-based dyes, for instance, are non-fluorescent or show only greatly reduced fluorescence in a solid state because of association or some other causes. A material such as perylene usually forms dimers in a well-known crystal form, resulting in a sudden - reduction of fluorescence. Therefore, a material which does not lose fluorescence even in a solid state is desired. As an emitting material satisfying this condition and enabling EL blue light emission, a material having a stilbene-skeleton is disclosed. Using this material, a high brightness of about 80 cd/m² was obtained when applying a low voltage of about 20 V (EP 0319881).

As another literature describing an application of a distylylbenzene derivative to an organic this film EL device, there is European Patent Application Laid-Open No. 281381, previously cited. According to this literature, p-bis-(o-methylstyryl)benzene are used as fluorescent material which means fluorescent material in a solution. They are doped in a very small amount into the host material as if they were into a solvent. The thin-layered host material, doped with a very small amount of the fluorescent material, forms the light emitting zone in which the light emits from the fluorescent material. The light emitting zone (light emitting layer) must have injection function (a function which enables the injection of holes from an electrode or the hole injection layer, and the injection of electrons from an electrode or the electron injection layer, upon application of an electric field), transport function (a function to transport holes and electrons upon application of an electric field) and light-emitting function (a function which provides a field in which holes and electrons recombine and relate them to light emission). In the EL device disclosed in this literature, injection function, transportation function and part of light emitting function (recombination) are fulfilled by the host material. A very small amount (about 5 mol %) of fluorescent material is doped onto the host material, because only part of its light-emitting function, namely, to emit light according to recombinations between holes and electrons, is used. This literature discloses nothing about the performance of the emitting layer composed of distyryl benzene derivative which necessitates the above-mentioned three functions and has the function both of the host and the guest as well.

Nothing is disclosed about the performance of the emitting materials forming the emitting layer, either.

Furthermore, 1,4-bis(2-methylstyryl)benzene is described as an example of luminescent compounds in the specifications of U.S. Pat. Nos. 4672265, 4725531, 4734338, 4741976, and 4775320 and Japanese Patent Application Laid-Open No. 37890/1986, etc. Nothing is shown, however, about the EL performance of the devices using this compound. They are inventions, in which the light emitting function is specifically attributed to exciplexes, because the light emission is ascribed to interactions between the two layers, as mentioned previously. No technical disclosure is made about the fact that a thin layer made of a distyrylbenzene derivative may function as the light emitting layer enabling emission of bluish light, not based upon the specified light emitting function, i.e. even when the emitting layer does not have a two-layered structure which enables the EL by the exciple

SUMMARY OF THE INVENTION

An object of the present invention is to provide, based upon that a emitting material to be used as the emitting layer or the emitting zone shows sufficient fluorescence in a solid state, a thin film EL devices emitting bluish light with a high brightness upon application of a low voltage.

Another object of the present invention is to provide a thin film EL device with an excellent film quality and which thus can be easily produced.

Still another object of the present invention is to provide an EL emitting material with a bluish colour such as blue, bluish green, greenish blue, bluish purple and light blue with a high brightness and a relatively high efficiency of, for example, more than 0.05 lm/W, and to provide an organic EL device using such a material.

The present invention provides an EL device in which an emitting material, i.e. a material to be used as the emitting layer or zone, is made of an organic compound represented by general formulae (I) or (II):

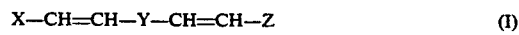

$$X-CH=CH-Y-CH=CH-Z \quad (I)$$

$$X-CH=CH-Z \quad (II)$$

(where X and Z are independently a monovalent aromatic group or a monovalent aromatic complex ring group having one nitrogen atom, and Y is a divalent aromatic group or a divalent aromatic complex ring group having one nitrogen atom. In general formula (I), those cases, in which X and Z represent in each an unsubstituted phenyl group or a mono alkyl-substituted phenyl group having an alkyl group with 1 to 4 carbon atoms and Y represents an unsubstituted phenylene group or a mono alkyl-substituted phenylene group having an alkyl group with 1 to 4 carbon atoms, are excluded. In general formula (II), those cases, in which X and Z are both unsubstituted biphenyl groups, monoalkyl substituted biphenyl groups having an alkyl group with 1 to 4 carbon atoms or unsubstituted phenyl groups, are excluded. Those cases, in which X is unsubstituted or mono-alkyl substituted phenyl groups having an alkyl group with 1 to 4 carbon atoms and Z is unsubstituted or mono-alkyl substituted tert.-phenyl groups having an alkyl group with 1 to 4 carbon atoms, are excluded.)

It should be noted that the choice of the above compounds in the present invention is based upon a recognition that compounds having a styryl structure and a distyryl structure, and their extensions represented by general formulae (I) and (II) as well as (I') shown below, show strong bluish fluorescence in the blue range to the green range in a solid state, and that they have the three functions described previously, i.e. injection, transportation and emission, when they are used as the emitting layer, and that they achieve the highly efficient emission of a bright bluish light. Furthermore, the compounds almost satisfy the required film quality.

The present invention also relates to an EL element in which an emitting material is made of an organic compound represented by the general formula (I')

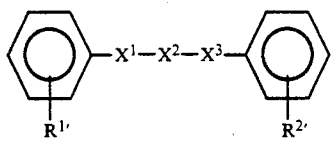

(I')

wherein $R^1$ and $R^2$ independently a hydrogen or an alkyl group having 1 to 4 carbon atoms, and $X^1$, $X^2$, and $X^3$ are independently —C=C— or

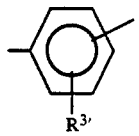

wherein $R^3$ is a hydrogen or an alkyl group having 1 to 4 carbon atoms.

The present invention relates to a method for using an organic compound of general formula as an emitting material for an EL element as well as a thin film EL element in which a thin film of an organic compound represented by general formula is sandwiched between two electrodes, at least one of which is transparent or semitransparent.

BRIEF DESCRIPTION OF THE DRAWING

The FIGURE is a schematic cross-sectional view illustrating an embodiment of the EL element of the present invention.

DESCRIPTION OF THE PREFERRED EMBODIMENT

Organic compounds to be used as the emitting material, i.e. a material as the emitting layer in the present invention are represented by the above general formula (I') or (II), in $R^1$, $R^2$, $R^3$, X, $X^1$, $X^2$, $X^3$, Y and Z have the same meaning as defined above.

X and Z are in each an aryl group (i.e. a monovalent aromatic group), i.e. a phenyl, a naphthyl and an anthryl group; or a monovalent aromatic complex ring group having only one nitrogen atom as a hetero-atom, e.g. a pyrrolyl group, a pyridyl group, a quinoly group and a carbazolyl group. These aryl groups (aromatic groups) and aromatic complex ring groups may have, or need not have substituents. As said substitutents may be mentioned, for example, an alkyl group having 1 to 6 carbon atoms, e.g. a methyl group, an ethyl group, an isopropyl group and a t-butyl group, or one of their halogen-substituted compound thereof; and alkoxy group having 1 to 6 carbon atoms, e.g. a methoxy group, a propoxy group and a butoxy group; an acyl group, e.g, a formyl group, an acetyl group, a propyonyl group and a butylyl group; an aralkyl group e.g. a benzyl group and a phenetyl group; an aryloxy group e.g. a phenoxy group and a tolyloxy group; an alkoxy-carbonyl group, e.g. a recognition that compounds having compounds having a styryl structure and a distyryl structure, and their extensions represented by general formulae (I) and (II) show strong bluish fluorescence in the blue range to he green range in a solid state, and that they have the three functions described previously, i.e. injection, transportation and emission, when they are used as the emitting layer, and that they achieve the high efficient emission of a bright bluish light. Furthermore, the emitting layer made of a compound represented by general formula (I) or (II) almost satisfies the required film quality.

The present invention also relates to an EL element in which an emitting material is made of an organic compound represented by general formula (I'):

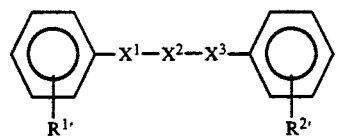

(I')

wherein $R^{1'}$ and $R^{2'}$ are independently a hydrogen or an alkyl group having 1 to 4 carbon atoms, and $X^1$, $X^2$ and $X^3$ are independently —C=C— or

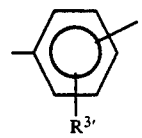

(wherein $R^{3'}$ is a hydrogen or an alkyl group having 1 to 4 carbon atoms).

The present invention relates to a method for using an organic compound of general formula (I) as an emitting material for an EL element.

The present invention further relates to a thin film EL element in which a thin film of an organic compound represented by general formula (I) is sandwiched between two electrodes, at least one of which is transparent or semitransparent.

BRIEF DESCRIPTION OF THE DRAWING

The Figure is a schematic cross-sectional view illustrating an embodiment of the EL element of the present invention.

DESCRIPTION OF THE PREFERRED EMBODIMENT

Organic compounds to be used as the emitting material, i.e. a material as the emitting layer in the present invention are represented by the above general formula (I), (I') or (II), in which X, Y and Z have the same meaning as that defined above.

X and Z are in each an aryl group (i.e. a monovalent aromatic group), e.g. a phenyl, a naphthyl and an anthryl group; or a monovalent aromatic complex ring group having only one nitrogen atom as a hetero-atom, e.g. a pyrropyl group a pyridyl group, a quinolyl group and a carbazolyl group. These aryl groups (aromatic groups) and aromatic complex ring groups may have, or need not have substituents. As said substituents may be mentioned, for example, an alkyl group having 1 to 6 carbon atoms, e.g. a methyl group, an ethyl group, an isopropyl group and a t-butyl group, or one of their halogen-substituted compound thereof; and alkoxy group having 1 to 6 carbon atoms, e.g. a methoxy group, an ethoxy group, a propoxy group and a butoxy group; an acyl group, e.g, a formyl group, an acetyl group, a propyonyl group and a butylyl group; an aralkyl group e.g. a benzyl group and a phenetyl group; an aryloxy group e.g. a phenoxy group and a tolyloxy group; an alkoxy-carbonyl group, e.g. a methoxycarbonyl group, an ethoxy-carbonyl group, a propoxycarbonyl group, and a butoxycarbonyl group; an acyloxy group e.g. an acetyloxy group, a propyonyloxy group and a butylyloxy group; an acylamino group, e.g. an acetylamino group, a propyonylamino group and a butylylamino group; a halogen atom; a carboxyl group; a hydroxy group; an aminocarbonyl group, e.g. an anilino-carbonyl group, a carbamoyl group and a dimethylaminocarbonyl group; an aryloxycarbonyl group, e.g. a phenoxycarbonyl group, a tolyloxycarbonyl group and a xylyloxycarbonyl group; an aryl group; and further an amino group represented by the general formula (III):

(III)

(wherein R¹ and R² are each a hydrogen atom, an alkyl group, an acyl group such as an aldehyde group, a formyl group, an acetyl group and a propyonyl group, an aryl group and the like; R¹ and R² may be the same or different, and they may combine with each other to form a saturated five-membered ring or a saturated six-membered ring (these rings may be with or without a substituent), and may combine with the substituents on X and Z to form a saturated five-membered ring or a saturated six-membered ring (these rings may be with or without a substituent.)

In general formula (I), X and Z may be the same or different, and the substitutents on X or Z may combine with each other to form a saturated five-membered ring or a saturated six-membered ring (these rings may be with or without a substituent).

In general formula (I), Y represents an arylene group (a divalent aromatic group) such as a phenylene group, a naphthylene group and the like or a divalent aromatic complex ring group having only one nitrogen atom as a hetero-atom, such as a pyrolylene group, a pyridylene group, a quinolylene group, a carbazolylene group and the like. These aromatic groups and aromatic complex ring groups may have, or need not have substituents. As said substituent, any substituent on X and Z, explained above, are mentioned. Substituents on Y may combine with each other to form a saturated five-membered ring or a saturated six-membered ring.

In general formula (I), those cases, in which X and Z are each an unsubstituted phenyl group or a mono alkyl-substituted phenyl group having an alkyl group with 1 to 4 carbon atoms and Y is an unsubstituted phenylene group or a mono alkyl-substituted phenylene group having an alkyl group with 1 to 4 carbon atoms, are excluded. In general formula (II), those cases, in which X and Z are both unsubstituted biphenyl groups, mono-alkyl substituted biphenyl groups having an alkyl group with 1 to 4 carbon atoms or unsubstituted phenyl groups, are excluded. Those cases, in which X is unsubstituted or mono-alkyl substituted phenyl groups having an alkyl group with 1 to 4 carbon atoms and Z is unsubstituted or mono-alkyl substituted tert.-phenyl groups having an alkyl group with 1 to 4 carbon atoms, are excluded. All these synthesized by the Wittig process described in J. Org. Chem. 24, 1246(1959).

Representative examples of the compounds represented by formula (I) can be classified into the following four groups.

Compounds belong to the group 1 are those represented by general formula (I), in which Y is a substituted or unsubstituted p-phenylene or 4,4'-biphenylene group, and X and Z are in each a monovalent aromatic group including a benzene ring.

Representative structural formulae of the aromatic groups including a benzene ring are given below.

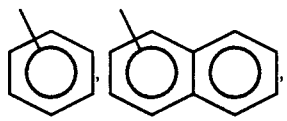

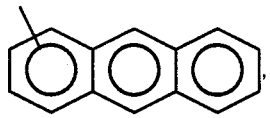

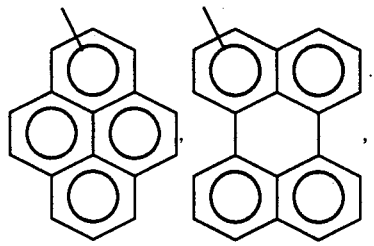

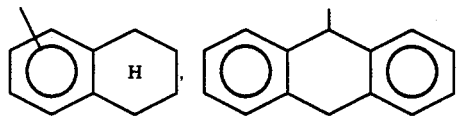

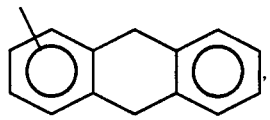

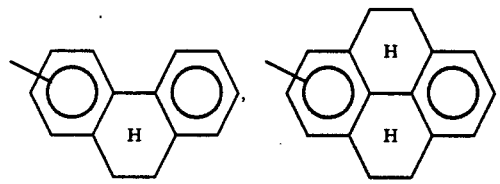

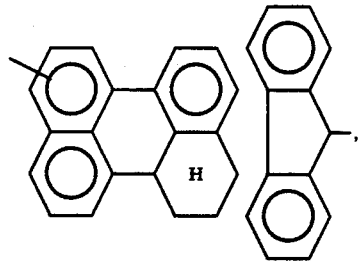

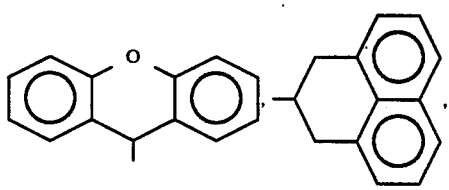

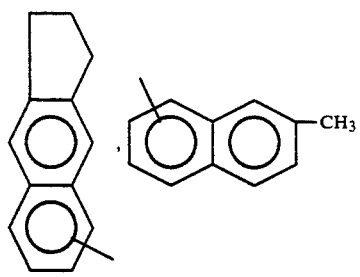
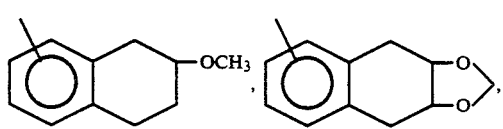
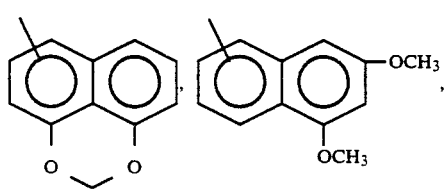
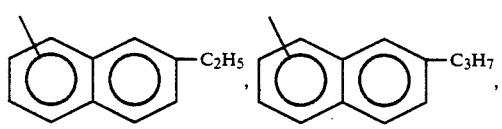
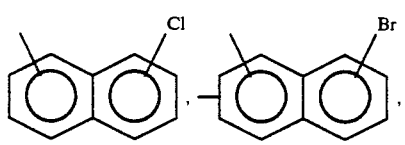
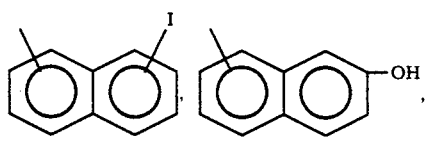
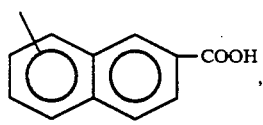
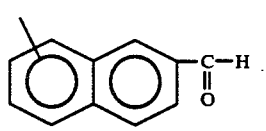
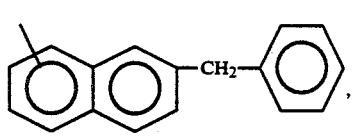
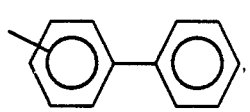
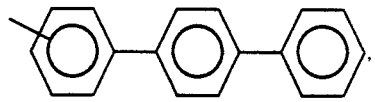
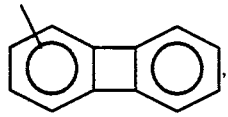
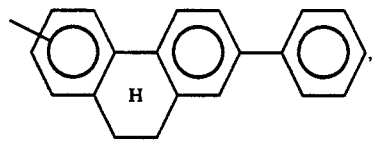
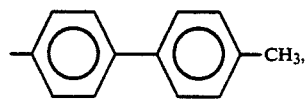
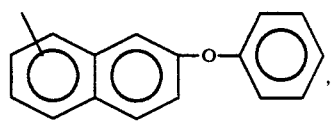
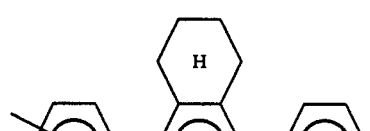
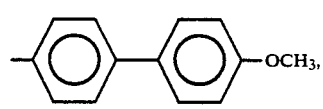
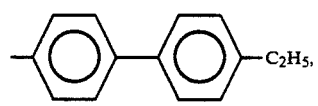
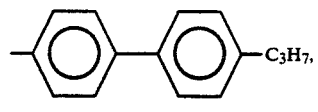
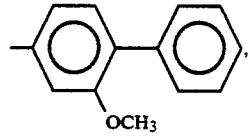
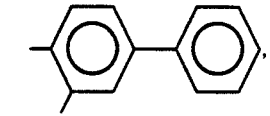
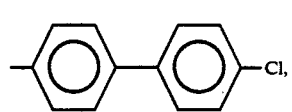

-continued
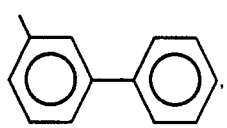
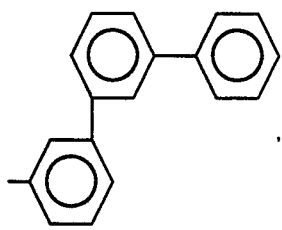
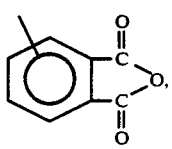
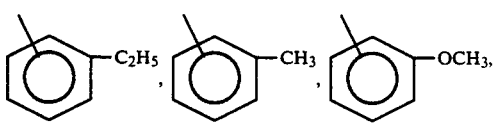
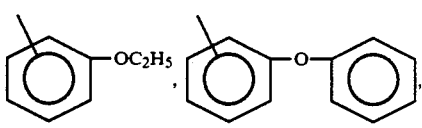
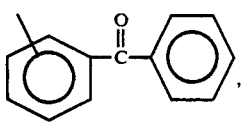
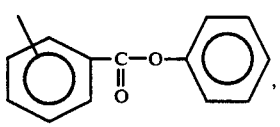
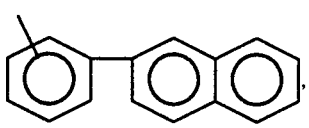
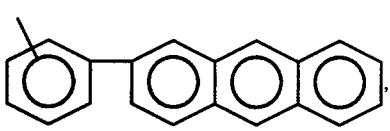
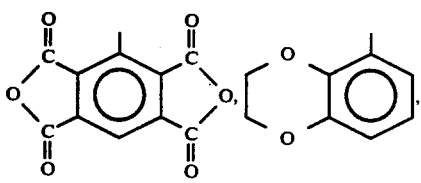
-continued
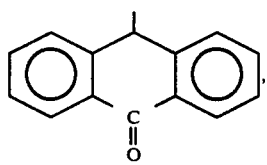
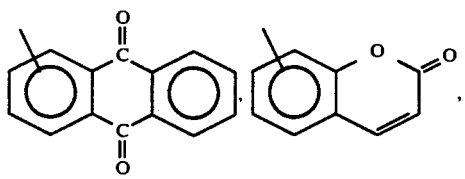
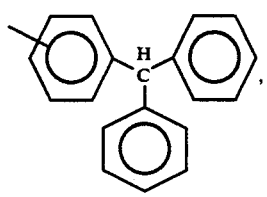
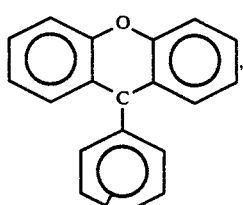
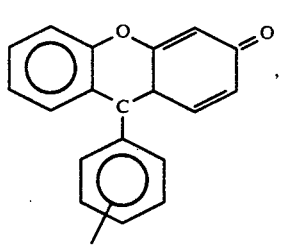
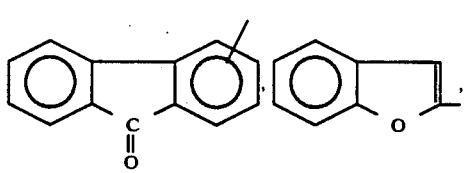
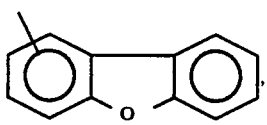
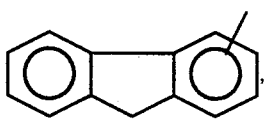
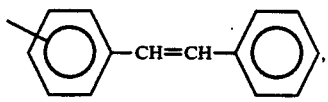

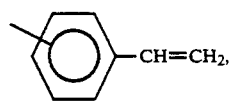
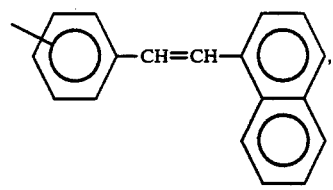
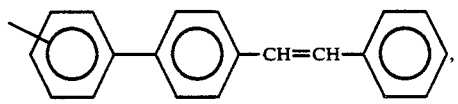
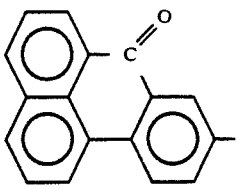
Representative examples of the compounds in the group 1 are given below.
(formula 20)
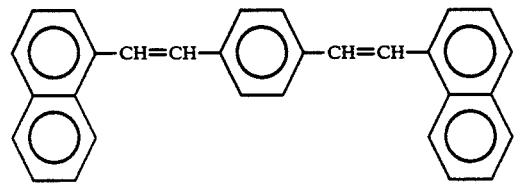
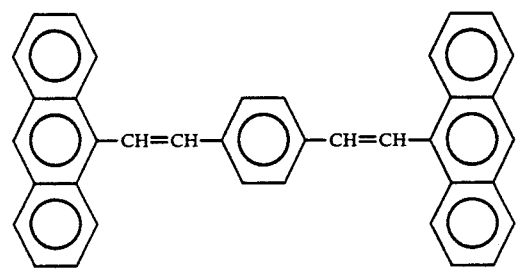
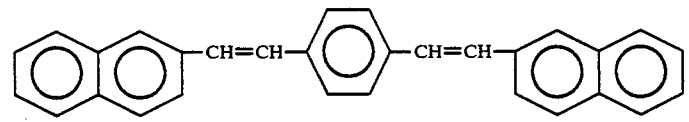
(formula 22)
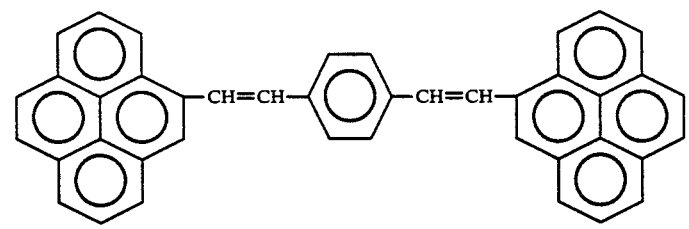
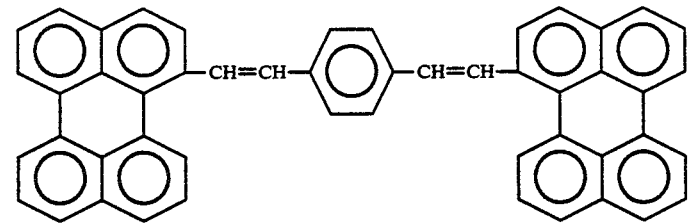
(formula 23)
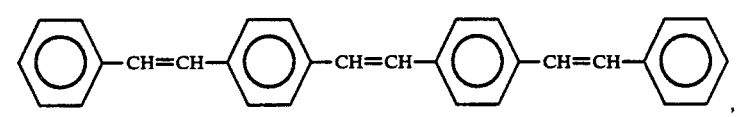

(formula 24)
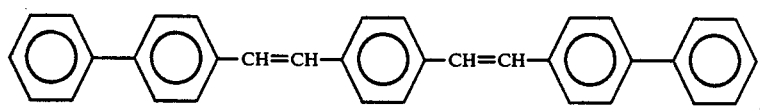
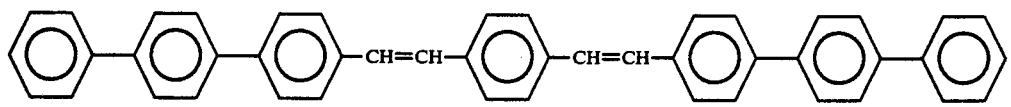
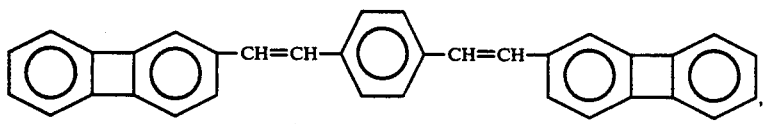
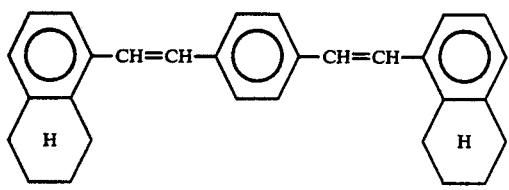
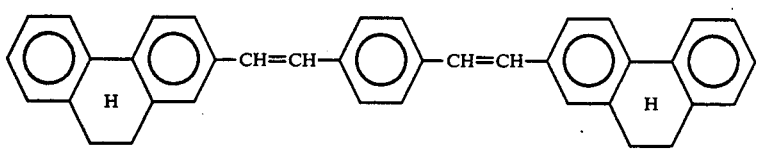
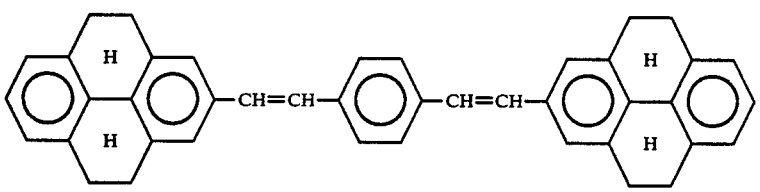
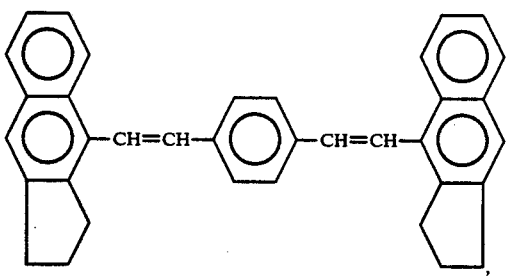
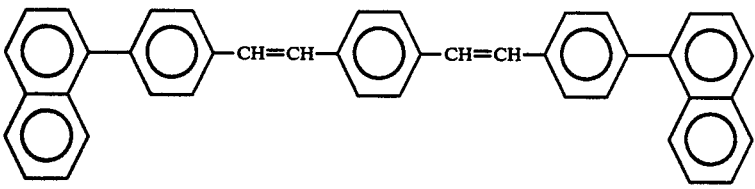
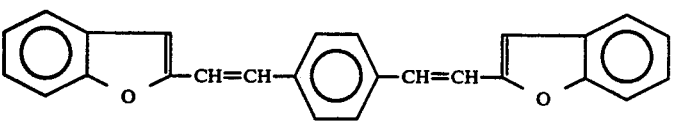

-continued
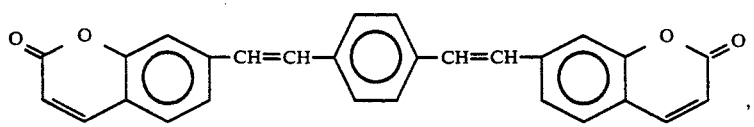
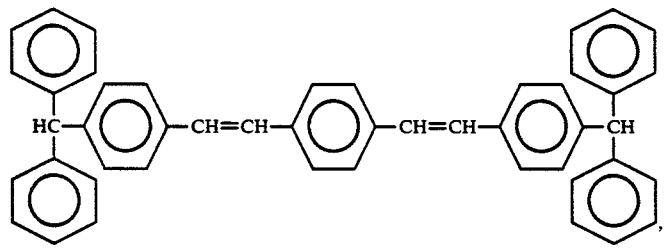
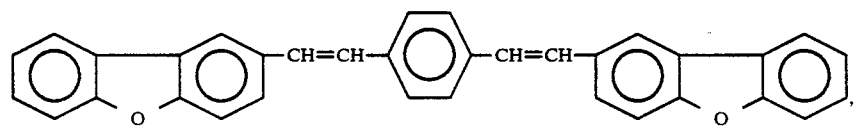
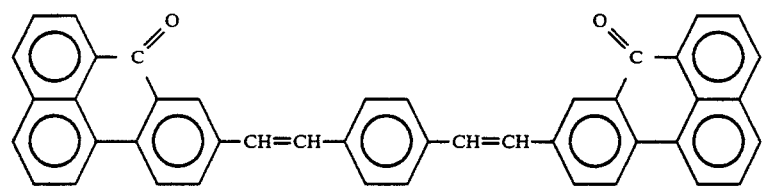
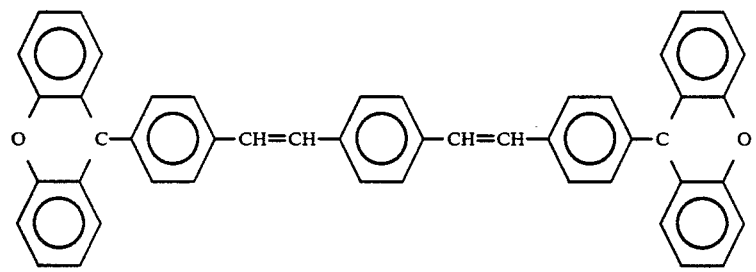
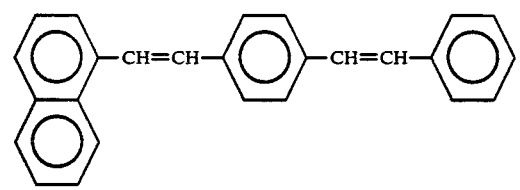
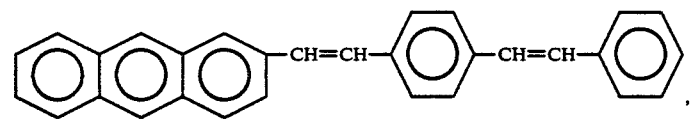
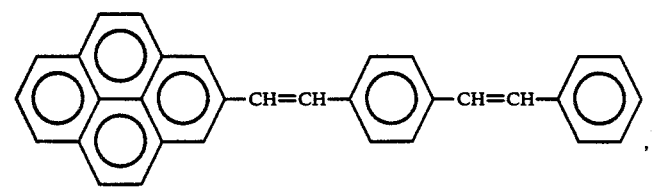
(formula 21)

-continued
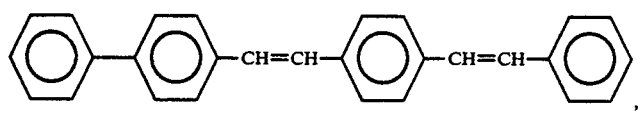
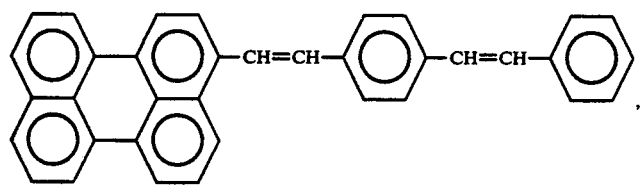
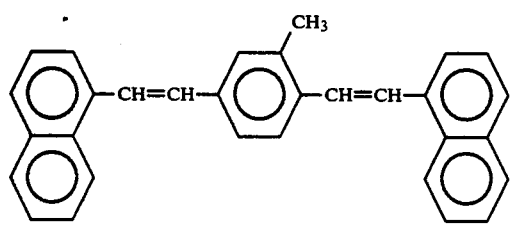
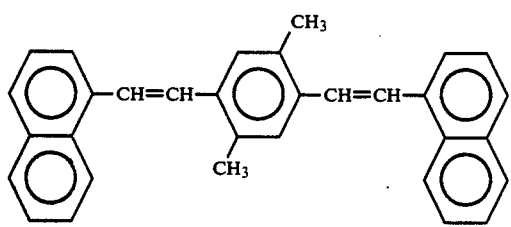
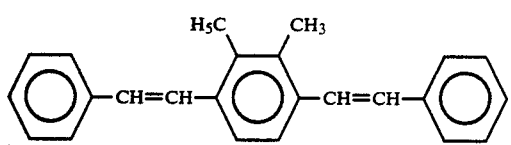
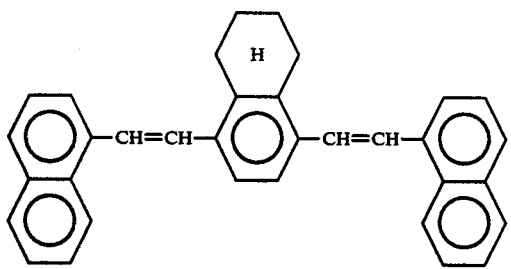
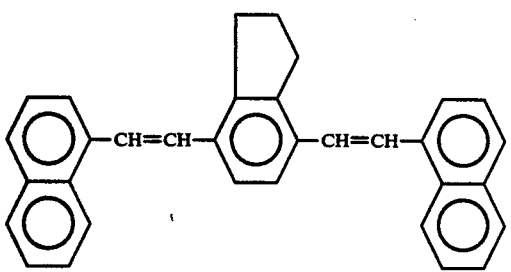

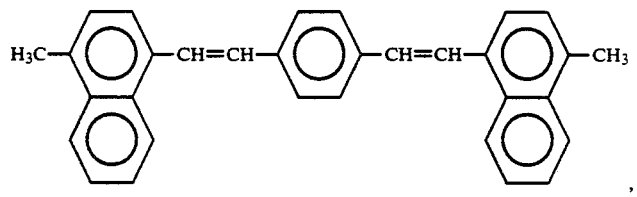
,
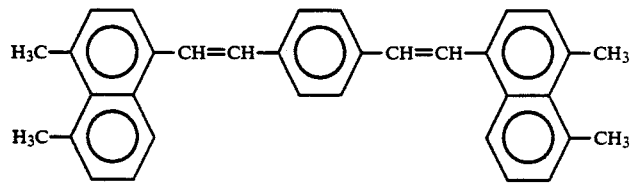
,
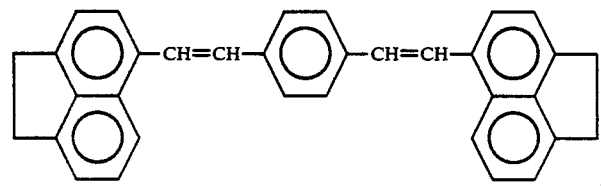
,
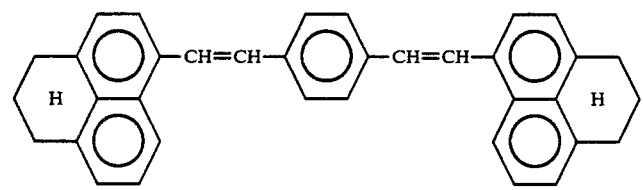
,
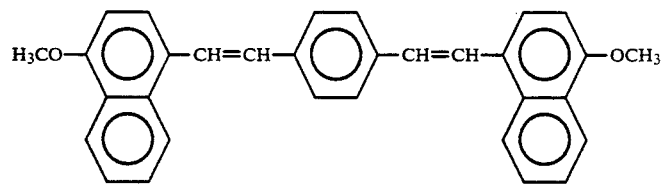
,
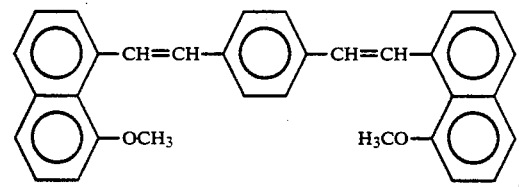
,
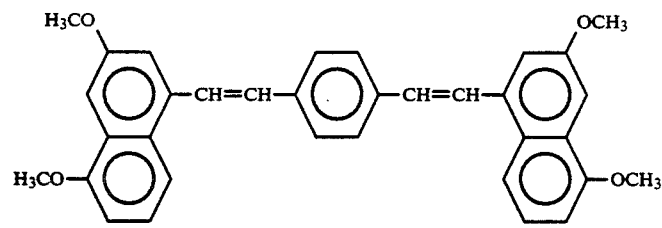
,
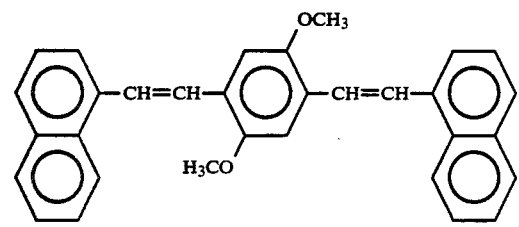

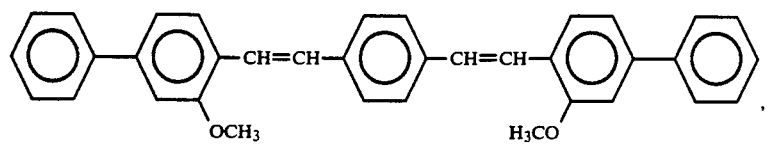
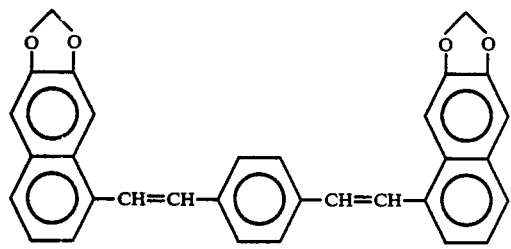
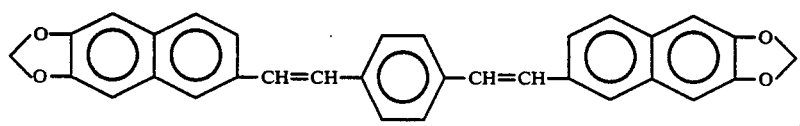
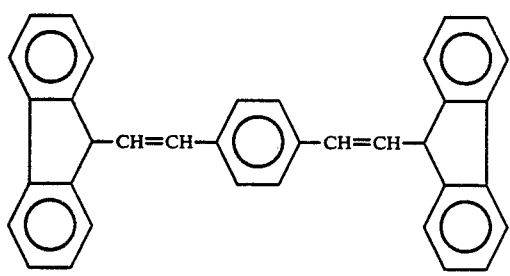
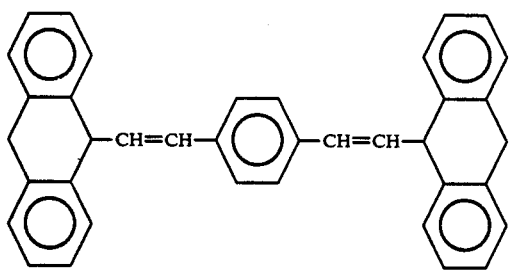
Those compounds, whose substituted or unsubstituted p-phenylene group in the central part of the molecule is replaced by a substituted or unsubstituted 4,4'-biphenylene group, are also mentioned. Furthermore, the following compounds are mentioned.
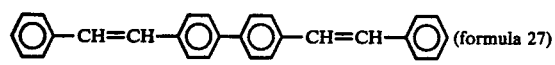 (formula 27)
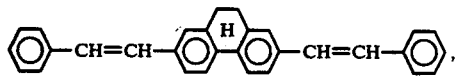
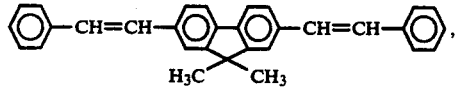
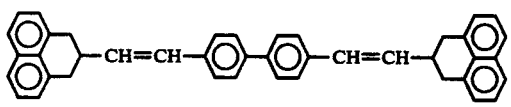
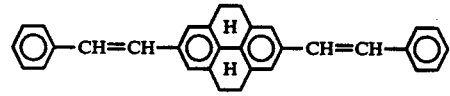
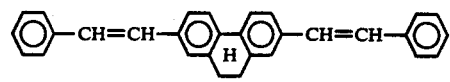

Compounds belong to group 2 are those represented by general formula (I), in which Y is a substituted or unsubstituted phenylene group, and X and Z are each a substituted or unsubstituted phenyl group. Representative examples of these compounds are shown below.
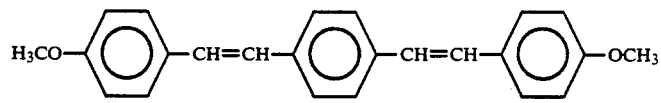
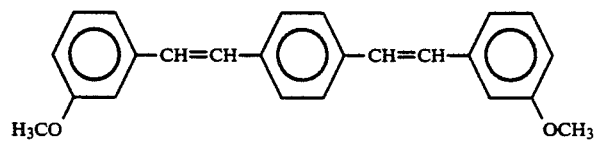
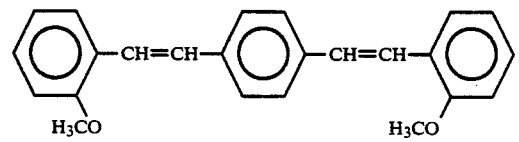
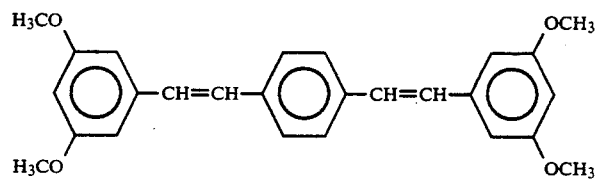
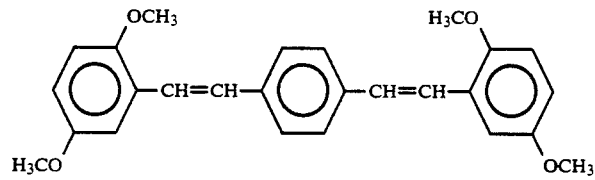
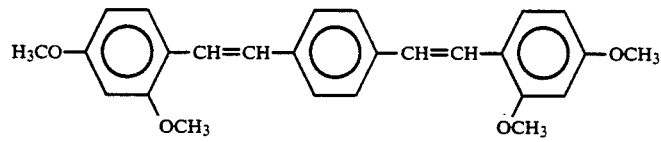
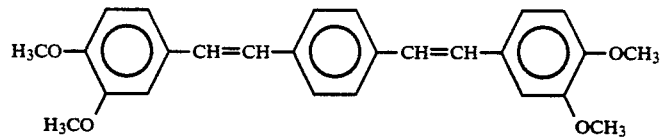
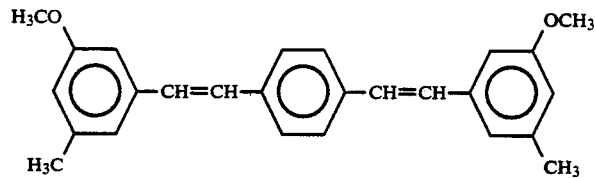
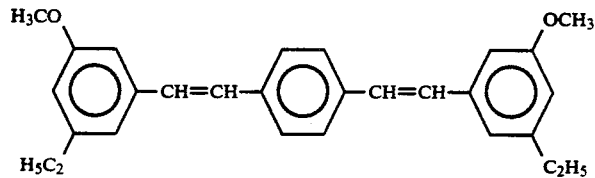

-continued
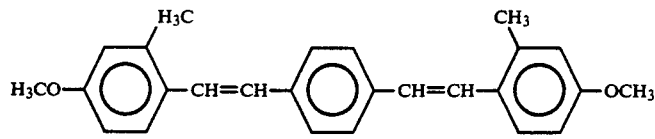
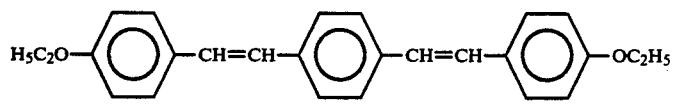
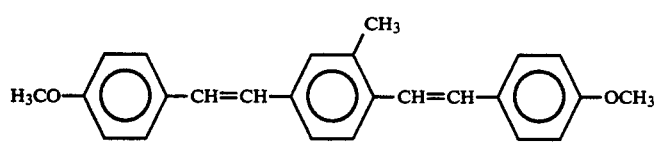
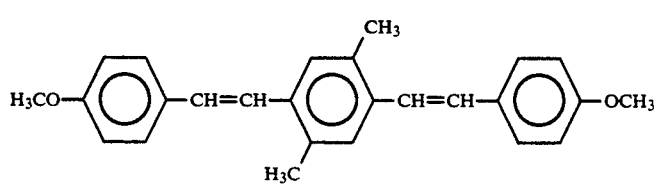
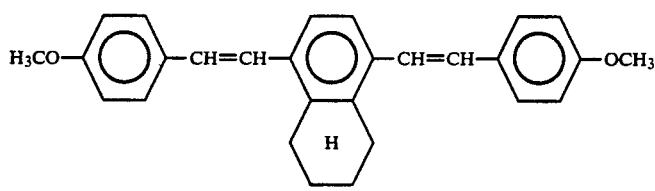
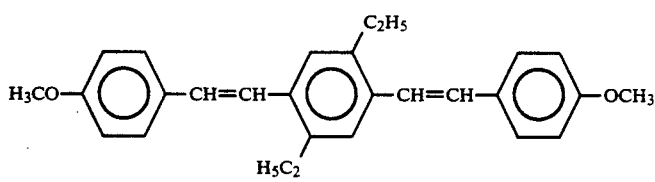
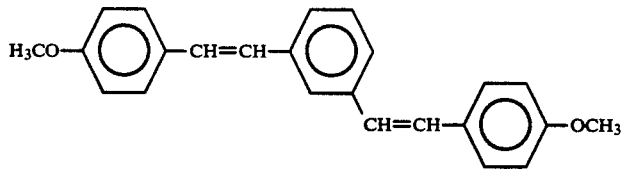
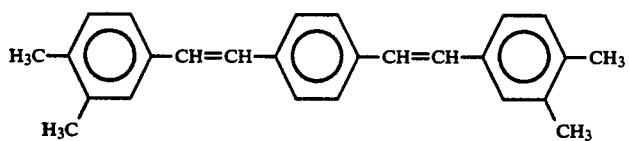
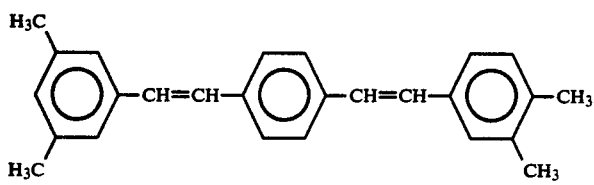

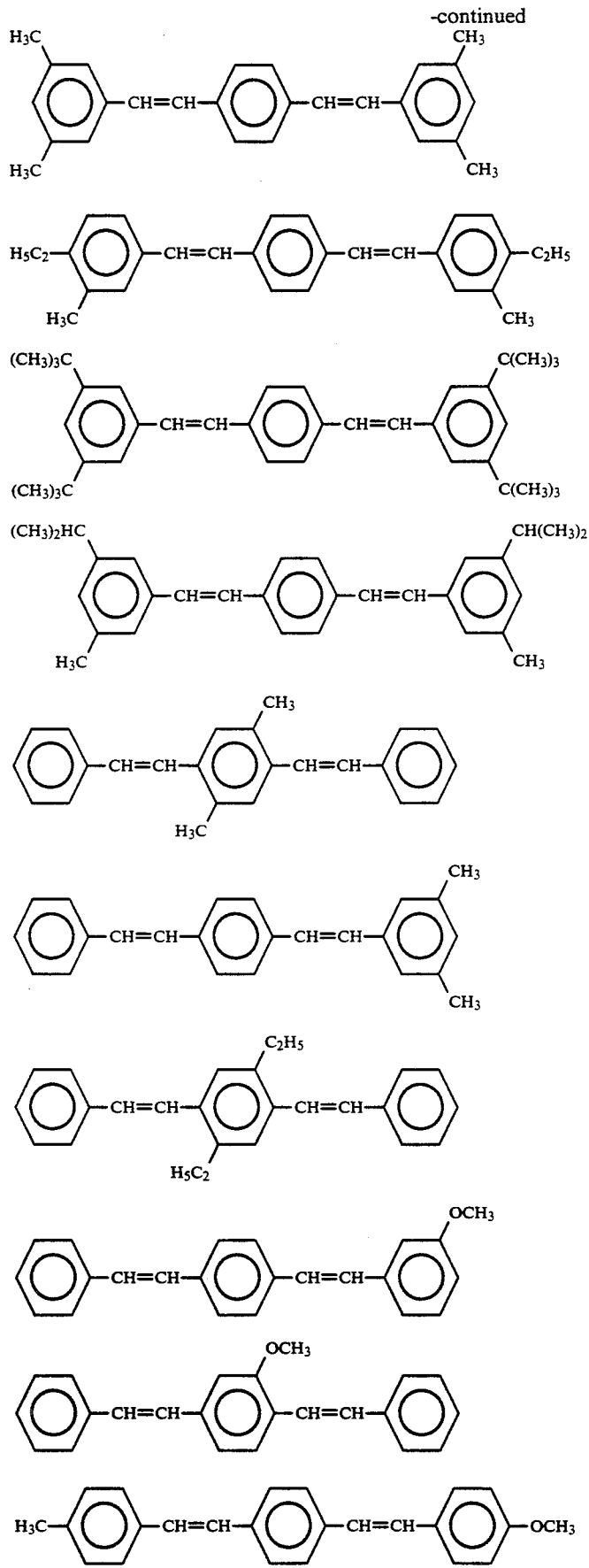

-continued
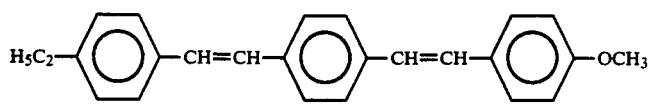
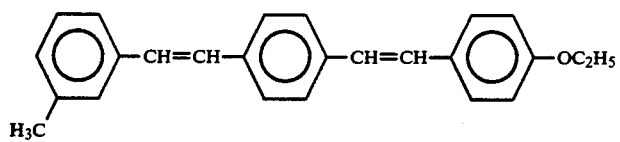
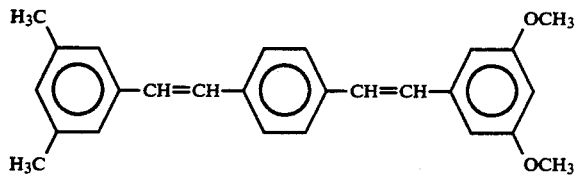
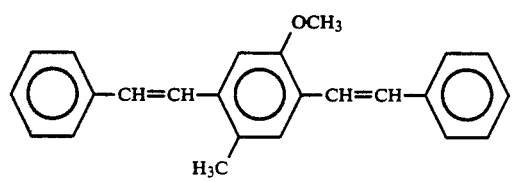
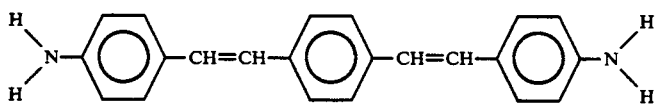
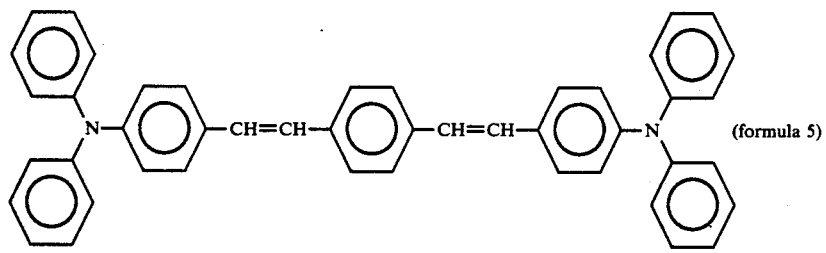 (formula 5)
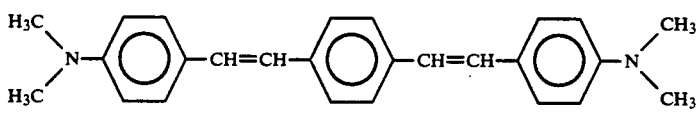
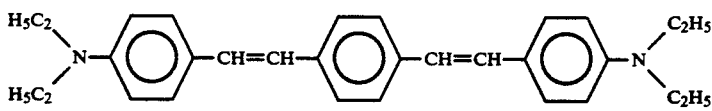
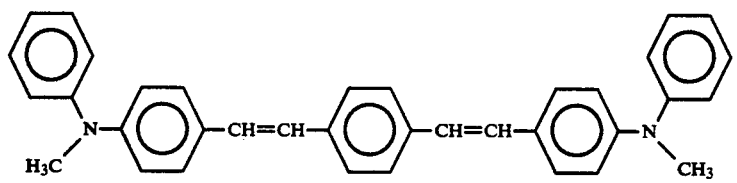
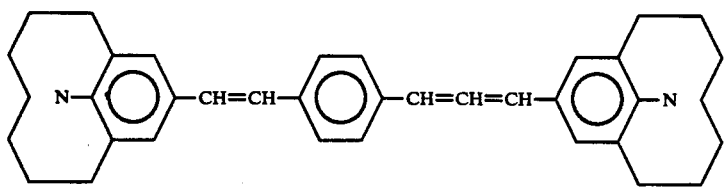

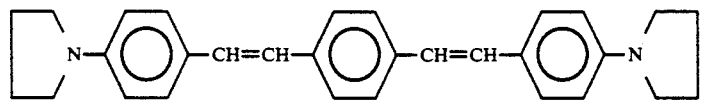
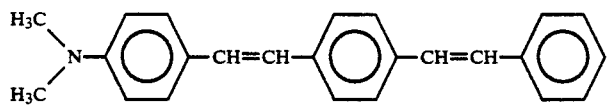
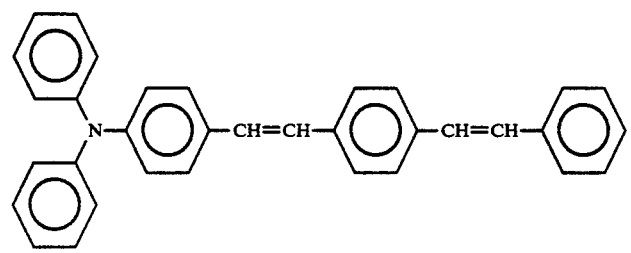
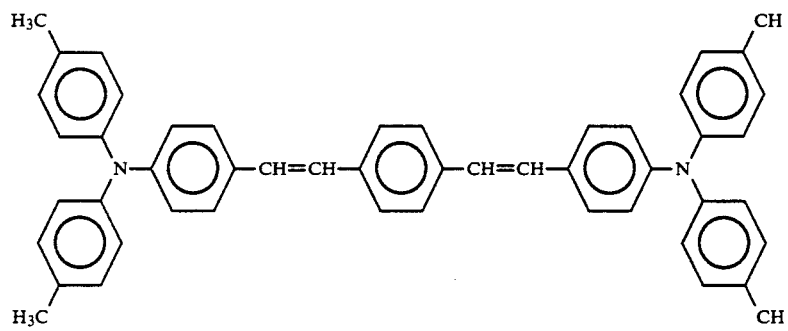
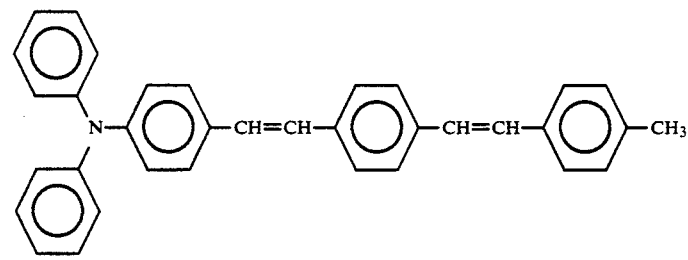
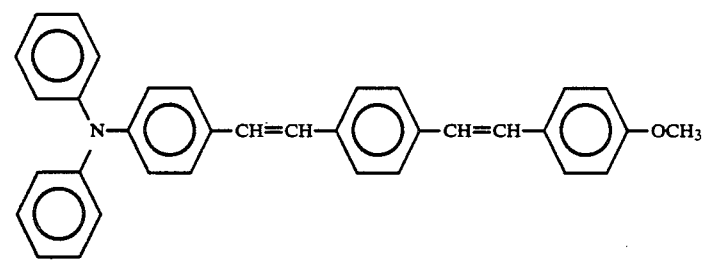
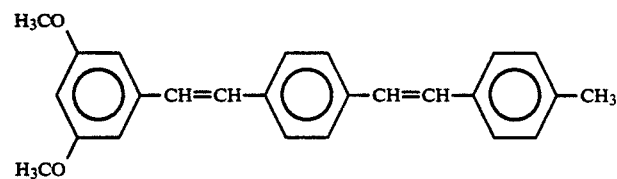

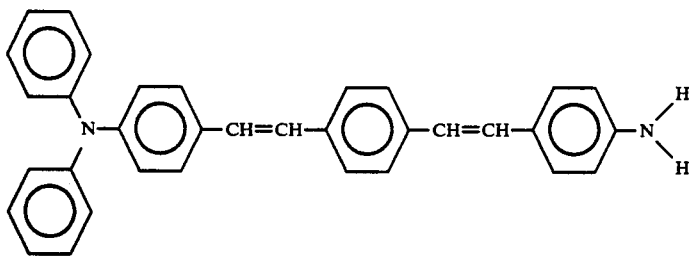
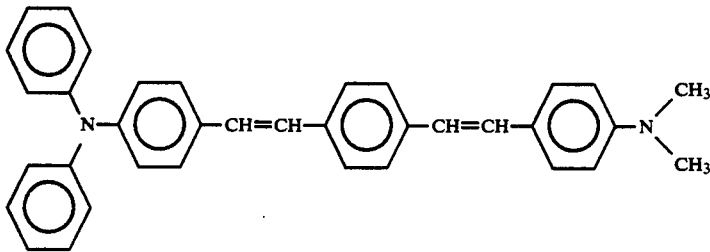
Compounds belonging to group 3 are those represented by general formula (I), in which at least one of X, Y or Z is an aromatic complex ring group having one nitrogen atom. Representative examples of these compounds are shown below.
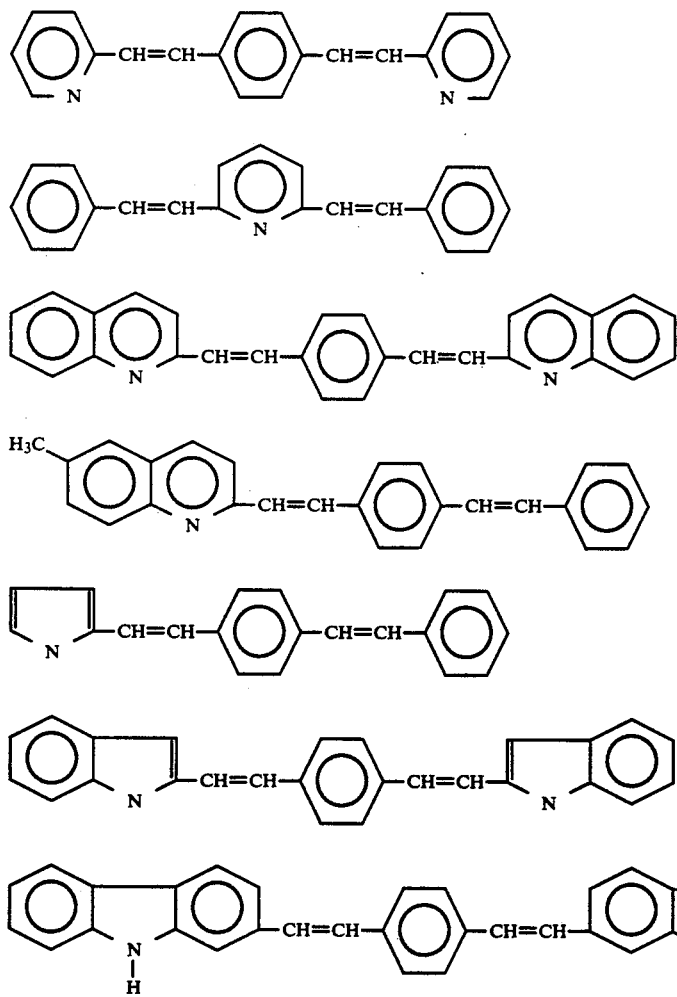

-continued
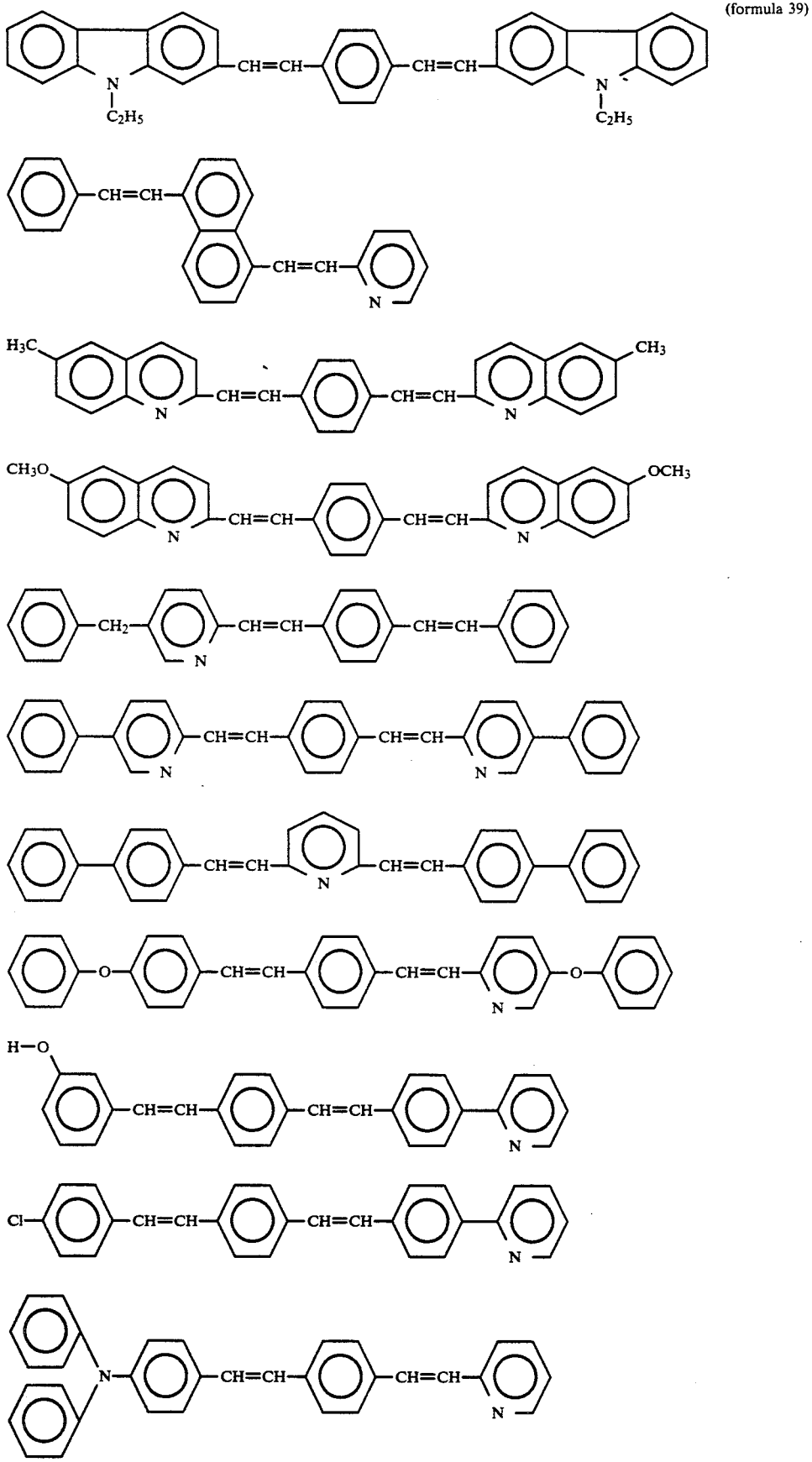
(formula 39)

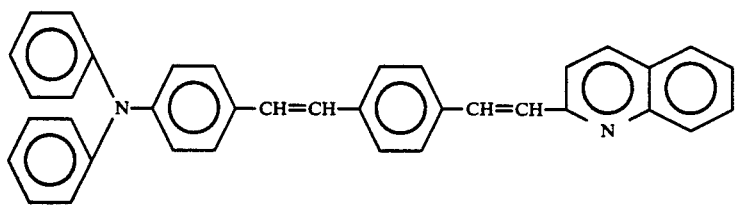

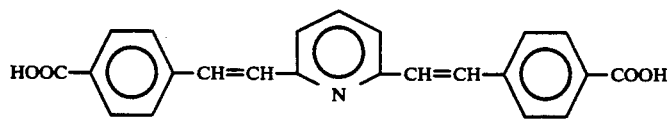

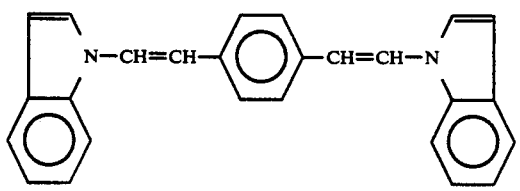

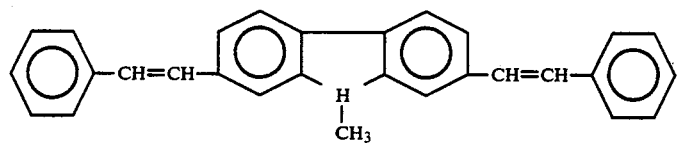

Furthermore, compounds belonging to group 4 are those represented by general formula (II), in which X and Z have the same meaning as defined previously. (Those cases, in which X and Z are both unsubstituted biphenyl groups, mono-alkyl substituted biphenyl groups having an alkyl group with 1 to 4 carbon atoms or unsubstituted phenyl groups, are excluded. Those cases, in which X is unsubstituted or mono-alkyl substituted phenyl groups having an alkyl group with 1 to 4 carbon atoms and Z is unsubstituted or mono-alkyl substituted tert.-phenyl groups having an alkyl group with 1 to 4 carbon atoms, are excluded.)

Representative examples of the compounds in group 4 are shown below.

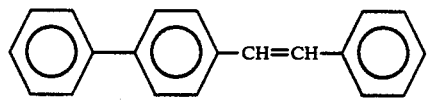

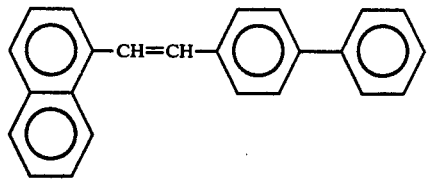

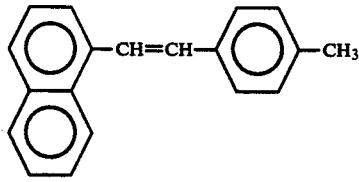

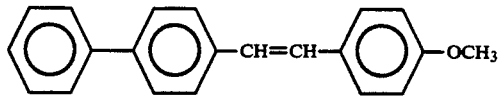

-continued
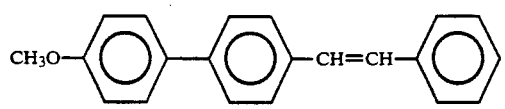
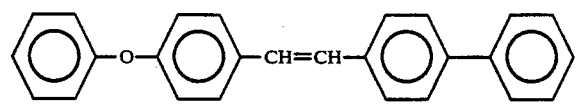
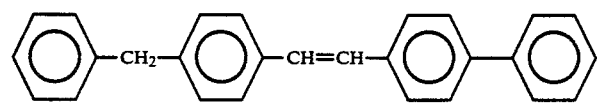
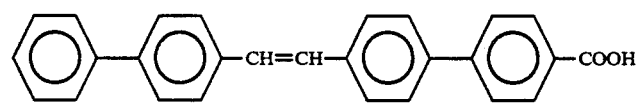
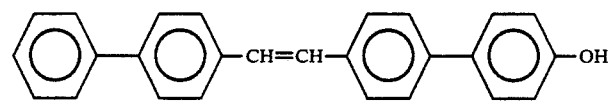
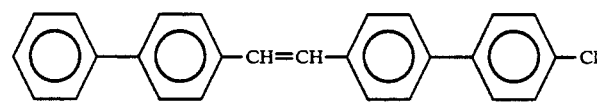
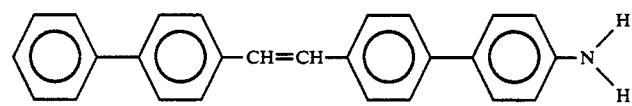
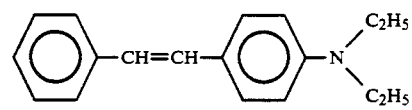
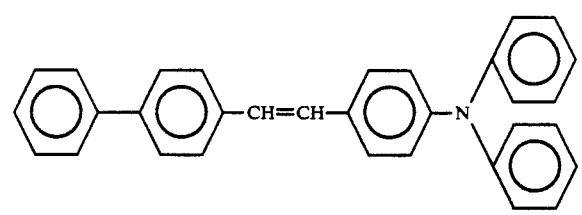
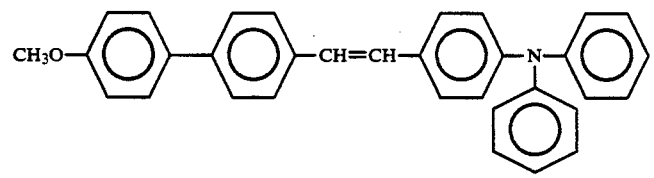
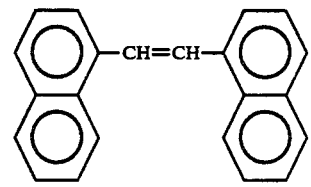

-continued

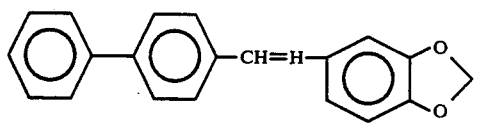

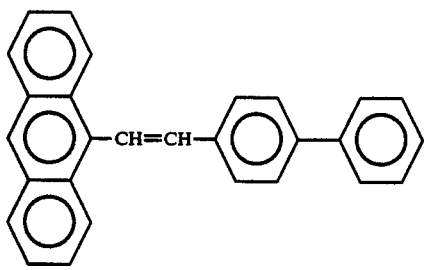

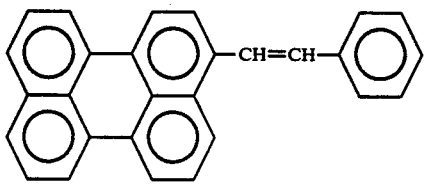

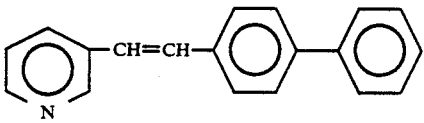

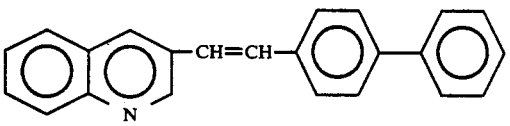

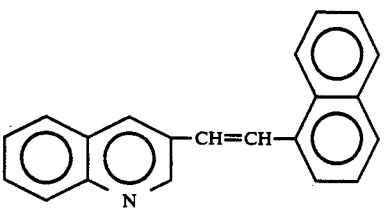

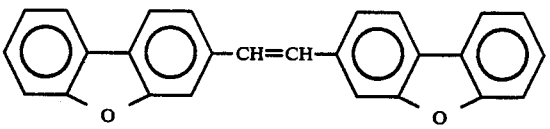

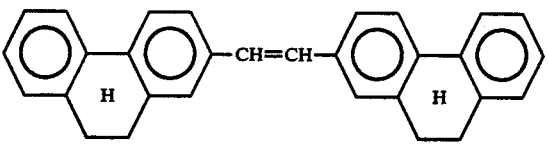

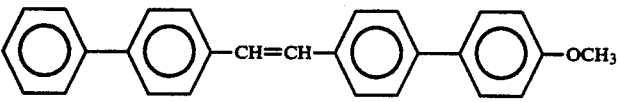

Particularly preferred substituents in the compounds represented by general formulae (I) and (II) are alkyl group, alkoxy group and amino groups such as diethylamino group and diphenylamino group, all of which have an electron-donating tendency. It is preferred that the ethenyl part of each of these compounds has a trans-structure, since it makes fluorescence in a solid state stronger. Although there is no particular restriction on the use of an emitting material comprising an emitting zone, it is preferable that a layer made of a molecular accumulated film in a thin film form be used as the emitting layer. The layer referred to as the molecular accumulated layer means a thin film formed by depositing a compound from the gaseous state and a thin film formed by solidification from a solution or the liquid state.

The emitting layer, composed of the emitting material of an EL device in the present invention has the following three functions.

(1) Injection Function

A function which enables the injection of holes from the positive electrode or the hole injection and transport layer, and the injection of electrons from the negative electrode or the electron injection and transport layer, upon applying an electric field.

(2) Transport Function

A function to transport charges (electrons and holes) upon applying an electric field.

(3) Light Emitting Function

A function to provide a field in which recombinations take place between electrons and holes, and to relate them to light emission.

In the light-emitting layer, there may be a difference in readiness between hole injection and electron injection, and a difference in transport ability (mobility) between holes and electrons. However, it is preferred that either of the charges can be transported.

The compounds, represented by general formula (I) or (II), to be used as the emitting material (emitting layer) in an EL device of the present invention, have a low ionization potential, for example, of less than 6.0 eV. Thus, holes can be relatively easily injected into them, when a metal or a compound is properly chosen as the positive electrode. They also have a high electron affinity of, for example, more than 2.8 eV. Therefore, electrons can be relatively easily injected into them when the proper metal or compound is chosen as the negative electrode. They also have an excellent transport function for electrons and holes. Furthermore, they have a good ability to transform the excited states formed in them, their associated forms or their crystals upon charge recombinations, into light, because they have strong fluorescence in a solid state.

In the EL device of the present invention, the film thickness of the light-emitting layer is not critical and can be appropriately determined. The thickness of the film is usually 5 nm to 5 $\mu$m. Although there is a variety of embodiments of the formation of an EL device in the present invention, an EL device can be formed in such a manner that the above-mentioned emitting layer is sandwiched between two electrodes (positive and negative electrodes). Other layers may be inserted in between, if required. Representative formations are of: (1) positive electrode/ emitting layer/ negative electrode; (2) positive electrode/ hole injection and transport layer/ emitting layer/ negative electrode; and (3) positive electrode/ hole injection and transport layer/ emitting layer/ electron injection and transport layer/ negative electrode. The EL device of the present invention is preferably formed on a substrate.

In the EL device of the present invention, a transparent supporting substrate is preferably used. In general, glass, transparent plastic or quarz is used. It is preferred to use as electrodes (positive and negative electrodes) a metal such as gold, aluminum or indium; or an alloy; a mixture of the said metals, or a transparent material such as indiumtinoxide (mixture of indium oxide and tin oxide; ITO), SnO or ZnO. A metal or an electroconducting compound, both having a large work function, is preferred as the positive electrode, and a metal or an electroconducting compound, both having a small work function, is preferred as the negative electrode. It is preferred that at least one of these electrodes is transparent or semi-transparent.

An EL device comprising (1) positive electrode/ emitting layer/ negative electrode, mentioned previously, is made, for example, according to the following procedure. That is, an electrode is generally prepared in a thickness of 10 nm to 1 $\mu$m by the vacuum evaporation method or the sputtering method on a supporting substrate. An electrode with a thickness of less than 200 nm is particularly preferred, because it ensures a high transmittance of light emission. Then, an emitting material of a compound of general formula (I) or (II) is formed in a thin film as the emitting layer on the above-mentioned electrode. The thin film of the emitting material can be formed by techniques to form a molecular accumulated film such as spin-coating, casting and vacuum evaporation. The vacuum evaporation method is most preferably in that a film with good uniformity can be obtained and pinholes are less likely to be formed in the film. The conditions under which the thin film of the emitting material is formed by the vacuum evaporation method are: that the temperature for heating the boat is 50° to 400° C.; that the pressure is $10^{-5}$ to $10^{-5}$ Pa; that the deposition rate is 0.01 to 50 nm/sec; and that the temperature of the substrate is -50° to +300° C. These conditions are chosen so that the film thickness is within the range of 5 nm to 5 $\mu$m. The EL device is made by forming the opposite electrode in a thickness of 50 to 200 nm by the vacuum deposition process or the sputtering process after forming the emitting layer. The conditions under which the emitting layer is formed by the vacuum deposition process vary depending upon the compound represented by general formula (I) or (II), the desired crystal structure of its molecular deposited layer and its associated structure. It is preferred, however, that the temperature for heating the boat is within the range in which the compound of general formula (I) or (II) does not decompose.

An EL device comprising (2) positive electrode/ hole injection and transport layer/ emitting layer/ negative electrode is made according to the following procedure. Firstly, an electrode is prepared in a similar manner as in an EL device of the formation (1), and then, a hole injection material (hole transport material) is formed in a thin film as the hole injection and transport layer by the vacuum deposition process on the above-mentioned electrode. The conditions under which the hole injection and transport layer is formed by the vacuum deposition process are chosen in a similar manner as those for forming a thin layer of the previously mentioned emitting material. Then, a thin layer of an emitting material and the opposite electrode are formed in a similar manner as in an EL device of the formation (1). The desired EL device of the formation (2) is thus made. In the EL device of the formation (2), the hole injection and transport layer and the emitting layer can be formed in the reverse order, i.e. in the order of an electrode/ emitting layer/ hole injection and transport layer/ an electrode.

Furthermore, an EL device comprising (3) positive electrode/ hole injection and transport layer/ emitting layer/ electron injection and transport layer/ negative electrode is made in the following manner. Firstly, an electrode is prepared in a similar manner as for an EL device in the formation (1). Then, the hole injection and transport layer is formed in a similar manner as in an EL device of the formation (2). A thin film of an emitting material is formed on it in a similar manner as in an EL device of the formation (1). After that, an electron injection material (electron transport material) is formed in a thin film by the vacuum deposition process on the emitting layer as the electron injection and transport layer. Finally, the opposite electrode is formed in a similar manner as in an EL device of the formation (1). The desired EL device of the formation (3) is thus made. The order of hole injection and transport layer/ emitting layer/ electron injection and transport layer can be changed to electron injection and transport layer/ emitting layer/ hole injection and transport layer to make an EL device according to the order of an electrode, the electron injection and transport layer, the emitting layer the hole injection and transport layer, and then an electrode. Further, an EL device can be made according to the order of an electrode/ emitting layer/ electron injection and transport layer/ an electrode in which the hole injection and transport layer is eliminated.

In the EL device of the present invention, layers such as the hole injection and transport layer, or the electron injection and transport layer are not needed in the EL device of the present invention. However, these layers further improve light emission performance. The hole injection and transport layer (hole injection layer) is made of a hole transport compound (hole injection material), and has a function to transport holes injected from the positive electrode to the emitting layer. By sandwiching this layer between the positive electrode and the emitting layer, more holes are injected into the emitting layer at a lower voltage, increasing the brightness of the EL device.

The hole transport compounds to be used as the hole injection and transport layer are those which can properly transport the holes, which are injected from the positive electrode when the layer is placed between two electrodes and an electric field is applied between them, to the emitting layer. More holes are injected into the emitting layer with a weaker electric field by sandwiching the hole injection and transport layer between the positive electrode and the emitting layer. Furthermore, electrons injected from the negative electrode or the electron injection and transport layer are accumulated in the emitting layer in the vicinity of the interface between the emitting layer and the hole injection and transport layer, because the hole injection and transport layer does not have the transport ability of the electron, increasing the light emission efficiency. A preferred hole transport compound has a hole mobility of at least $10^{-6}$ cm$^2$/ V.sec, when it is placed between electrodes between which an electric field of $10^4$ to $10^6$ V/cm is applied. Thus, those compounds of photoconductive materials used as a charge transport material for holes are mentioned as examples of the preferred hole transport compounds.

The following compounds are mentioned as examples of the said charge transport materials.

(1) triazole derivatives described in the specification of U.S. Pat. No. 3112197, etc.;

(2) oxadiazole derivatives described in the specification of U.S. Pat. No. 3189447, etc.;

(3) imidazole derivatives described in Japanese Patent Publication No. 16096/ 1962, etc.;

(4) polyarylalkane derivatives described in the specifications of U.S. Pat. Nos. 3615402, 3820989 and 3542544, Japanese Patent Publication Nos. 555/ 1970 and 10983/ 1976, and further, in Japanese Patent Application Laid open Nos. 93224/ 1976, 17105/ 1980; 4148/ 1981, 108667/ 1980, 156953/ 1980 and 36656/ 1981, etc.;

(5) pyrazoline derivatives or pyrazolone derivatives, described in the specifications of U.S. Pat. Nos. 3180729 and 4278746, and Japanese Patent Application Laid-open Nos. 88064/ 1980, 88065/ 1980, 105537/ 1974, 51086/ 1980, 80051/ 1981, 88141/ 1981, 45545/ 1982, 112637/ 1979 and 74546/ 1980, etc.;

(6) phenylenediamine derivatives described in the specifications of U.S. Pat. Nos. 3615404, Japanese Patent Publication Nos. 10105/ 1976, 3712/ 1971, 25336/ 1972, and further, in Japanese Patent Application Laid-open Nos. 53435/ 1979, 110536/ 1979 and 119925/ 1979, etc.;

(7) arylamine derivatives described in the specifications of U.S. Pat. Nos. 3567450, 3180703, 3240597, 3658520, 4232103, 4175961 and 4012376, Japanese Patent Publication Nos. 35702/ 1974 and 27577/ 1964, and further, in Japanese Patent Application Laid-open Nos. 144250/ 1980, 119132/ 1981 and 22437/ 1981 and German Patent No. 1110518, etc.;

(8) amino-substituted carkone derivatives described in the specifications of U.S. pat. No. 3526501, etc.;

(9) oxazole derivatives described in the specifications of U.S. Pat. No. 3257203, etc.;

(10) styrylanthracene derivatives described in Japanese Patent Application Laid-open No. 46234/ 1981, etc.;

(11) fluorenone derivatives described in Japanese Patent Application Laid-open No. 110837/ 1979, etc.;

(12) hydrazone derivatives described in the specification of U.S. Pat. No. 3717462 and Japanese Patent Application Laid open Nos. 59143/ 1979, 52063/ 1980, 52064/ 1980, 46760/ 1980, 85495/ 1980, 11350/ 1982 and 148749/ 1982, etc.; and

(13) stylbenzene derivatives described in Japanese Patent Application Laid-open Nos. 210363/ 1986, 228451/ 1986, 14642/ 1986, 72255/ 1986, 47646/ 1987, 36674/ 1987, 10652/ 1987, 30255/ 1987, 93445/ 1985, 94462/ 1985, 174749/ 1985 and 175052/ 1985, etc.

Furthermore, as particularly preferred examples the compounds as the hole transport layer (aromatic tertiary amines) and the compounds as the hole injection layer (porphiline compounds), described in Japanese Patent Application Laid-open No. 295695/ 1988 are mentioned.

Furthermore, particularly preferred examples of the hole transport compounds are those disclosed in 27033/ 1978, 58445/ 1979, 149634/ 1979, 64299/ 1979, 79450/ 1980, 144250/ 1980, 119132/ 1981, 295558/ 1986 and 98353/ 1986 and the specification of U.S. Pat. No. 4127412, etc.. These are shown below.

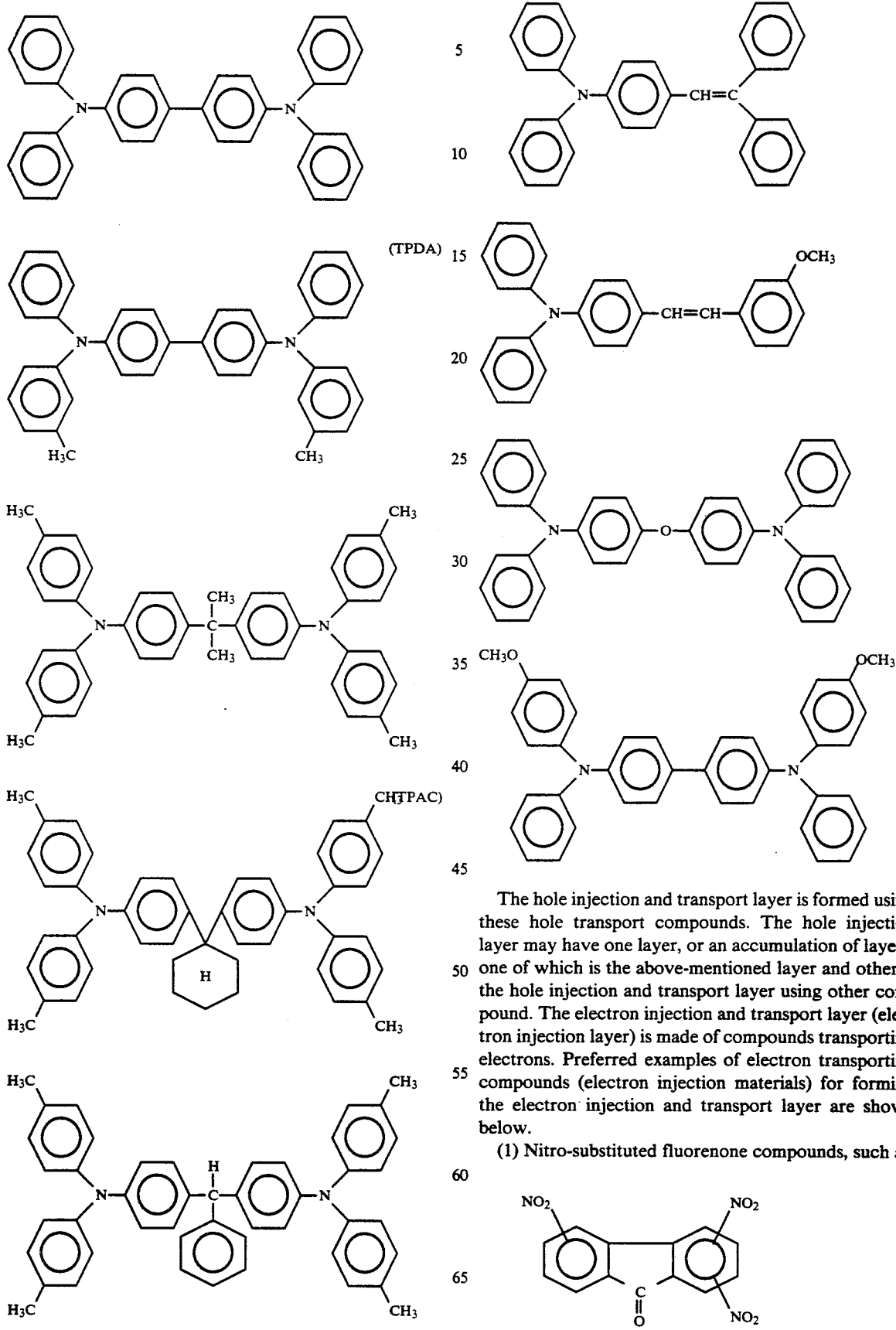

The hole injection and transport layer is formed using these hole transport compounds. The hole injection layer may have one layer, or an accumulation of layers, one of which is the above-mentioned layer and other is the hole injection and transport layer using other compound. The electron injection and transport layer (electron injection layer) is made of compounds transporting electrons. Preferred examples of electron transporting compounds (electron injection materials) for forming the electron injection and transport layer are shown below.

(1) Nitro-substituted fluorenone compounds, such as

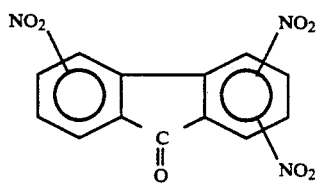

-continued

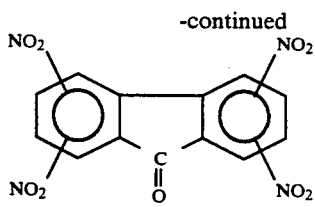

(2) anthraquinodimethane derivatives described, for example, in Japanese Patent Application Laid-open Nos.149259/ 1982, 55450/ 1983 and 104061/ 1988, etc.;

(3) diphenylquinone derivatives such as described in Polymer Reprints, Japan, 37 (No. 3) (1988) 681, etc.;

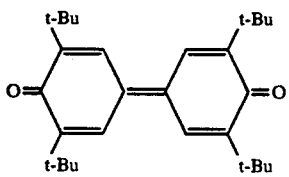

(4) thiopyrandioxid derivatives such as

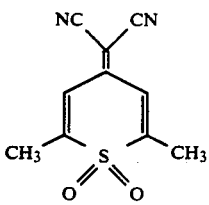

(5) compounds represented by formulae:

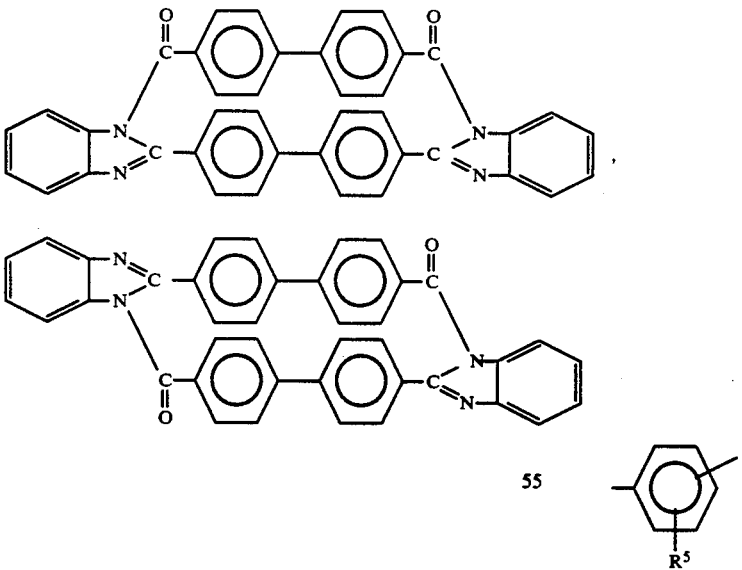

which are described in J.J. Appl. Phys., 27 (1988) L269, etc.;

(6) fluorenylidenemethane derivatives described, for example, in Japanese Patent Application Laid-open Nos. 69657/ 1985, 143764/ 1986 and 148159/ 1986, etc.;

(7) anthraquinodimethane derivatives and anthrone derivatives, described in Japanese Patent Application Laid-open Nos. 225151/ 1986 and 233750/ 1986, etc.;

(8) and, t-Bu PBD

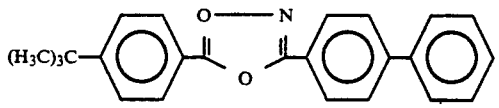

The EL device of the present invention, comprising the above-mentioned formation, emits light when 3 to 40 DC volts is applied with the polarity of the positive electrode and the negative electrode being positive and negative, respectively. When a voltage is applied to it with the other polarity, the current does not flow and it does not emit light. AC voltage and pulsed voltages can be also applied. It then only emits light in the bias states with the positive electrode and the negative electrode being positive and negative, respectively. Furthermore, when an EL device of the present invention is made according to the device formation (2) or (3), which are described previously, an organic compound represented by the following general formula (IV) can be used as the material for the emitting layer:

(IV)

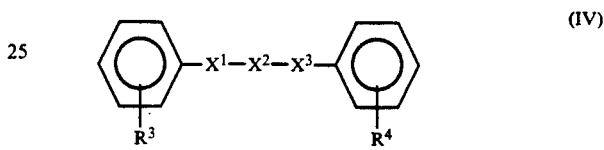

[wherein $R^3$ and $R^4$ represent in each a hydrogen or an alkyl group having 1 to 4 carbon atoms, and $X^1$, $X^2$ and $X^3$ represent each —C=C— or (wherein $R^5$ is a hydrogen or an alkyl group having 1 to 4 carbon atoms)]. EL device of the formation (2) and 3) using these compounds emit a brighter bluish light than do devices of formation electrode/emitting layer/electrode.

Compounds represented by the above general formula (IV) are commonly referred to as polyphenyl-, polyene- or stylbene-based dyes. These compounds can be synthesized by the Wittig process. Representative examples of compounds in which all $R^3$, $R^4$ and $R^5$ are hydrogen atoms, among the compounds represented by general formula (IV) are shown below.

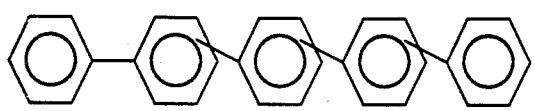

(formula 33)

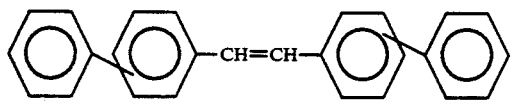

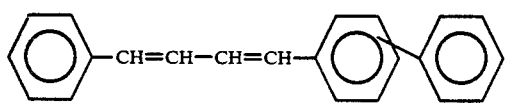

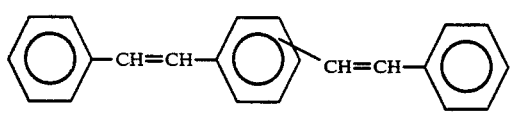

or

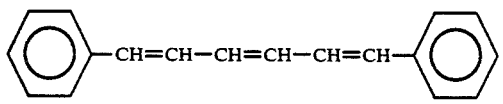

The phenylene group, i.e., a group represented by the formula:

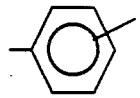

in the above formulae may be any of a p-phenylene group, a m-phenylene group and an o-phenylene group, and is preferably a p-phenylene group. Of the compounds represented by the general formula (IV), compounds with a stilbene ring are preferred. Particularly preferred are trans-4,4-diphenylstilbene and 1,4-distyryl-benzene.

When $R^3$ and $R^4$ of general formula (IV) are alkyl groups having 1 to 4 carbon atoms (which may be hydrogen atoms), 1,4-bis(alkylstyryl)benzene derivatives represented by the general formula (IV'):

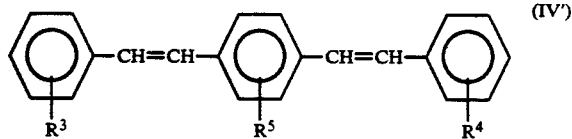

(IV')

are preferred. $R^3$ and $R^4$ in the above general formula (IV') may be identical or different, and are each an alkyl group having 1 to 4 carbon atoms, e.g., a methyl group, an ethyl group, a n-propyl group, an i-propyl group, a n-butyl group an i-butyl group, a sec-butyl group and a tert-butyl group, or may be hydrogen atoms. $R^5$ is a hydrogen atom or an alkyl group having 1 to 4 carbon atoms. Representative examples of the 1,4-bis(alkylstyryl)benzene derivatives represented by the general formula (IV') are 1,4-bis(2-methylstyryl) benzene, 1,4-bis(3-methylstyryl)benzene, 1,4-bis(4-methylstyryl)benzene, distyrylbenzene, 1,4-bis(2-ethylstyryl)benzene, 1,4-bis(3-ethylstyryl)benzene, 1,4-bis (2-ethylstyryl)-2-methylbenzene, and 1,4-bis(2-methylstyryl)-2-ethylbenzene. Of these compounds, 1,4-bis(2-methylstyryl)benzene.

As the positive electrode, the hole injection and transport layer, the negative electrode and the electron injection layer, the previously mentioned materials for those can similarly be used.

As described above, the EL device of the present invention obtains a high brightness by applying only low voltage. It has such a simple structure that it can be easily produced. Moreover, because the film thickness of the emitting layer can be made relatively thick, deficiencies such as pinholes are less likely to occur, and thus, it is easy to produce an EL device having a large area, and productivity is increased. The present invention, therefore, provides an EL device for the displays of various equipment that is inexpensive and of high quality.

The present invention is explained in further detail by the following examples.

EXAMPLE 1

Indium tin oxide (ITO) was provided on a 25 mm × 75 mm × 1.1 mm glass substrate in a 50 nm thick film form by the vacuum deposition method to obtain a transparent substrate. This transparent substrate was attached to the substrate holder of a commercially available vacuum deposition system (manufactured by ULVAC Co., Ltd.), 200 mg of 1,4-bis(2-(4-biphenyl)ethenyl)benzene was placed in an electrically-heated boat made of molybdenum. The pressure of the vacuum chamber was decreased to $1 \times 10^{-4}$ Pa and the boat were heated to 325° to 330° C. Under these conditions, 1,4-bis(2-(4-biphenyl)ethenyl)benzene, in which —C=C— has a trans-structure, was vapor deposited (vacuum deposited) onto the transparent substrate at a deposition rate of 0.5 nm/sec to obtain a luminous film 0.5 μm thick. In this vacuum deposition process, the temperature of the substrate was 130° C.

The substrate was taken out of the vacuum chamber. A stainless steel mask was placed on the luminescent film (emitting layer) of the substrate, which was then attached to the substrate holder. In the electrically-heated boat made of molybdenum, was placed 2 g of gold, and the pressure in the vacuum chamber was decreased to $2 \times 10^{-4}$ Pa. Then, the boat was heated to 1400° C., and finally a 20 nm thick gold electrode was formed as the opposite electrode on the luminescent film (emitting layer).

The absence of pinholes was confirmed by measuring the resistivity between the electrodes, which showed no short-circuit. Upon applying a DC voltage of 28 V to the EL device with the gold electrode being positive and the ITO electrode being negative, a current of 25 mA was passed and an emission of green light was obtained. The maximum emission of the green light was observed at the wavelength of 545 nm, and the brightness was 83 cd/m².

EXAMPLE 2

A transparent substrate was prepared in the same manner as in Example 1, and was then attached to a substrate holder. Then, 200 mg of 1,4-bis(2-(1-naphthyl)ethenyl)benzene, in which —C═C— has a trans-structure, was placed in an electrically-heated boat made of molybdenum. The pressure of the vacuum chamber was decreased to $1 \times 10^{-4}$ Pa and the boat was heated to 220° to 223° C. Under these conditions, 1,4-bis(2-(1-naphthyl)ethenyl)benzene was vacuum deposited onto the transparent substrate at a rate of 0.8 to 1.4 nm/sec to form a luminous film 0.5 μm thick. The substrate was at room temperature in this deposition process.

The substrate was taken out of the vacuum chamber. A stainless steel mask was placed on the luminescent film, and was then attached to the substrate holder. 2 g of gold was placed in an electrically-heated boat made of molybdenum, and the pressure of the vacuum chamber was decreased to $2 \times 10^{-4}$ Pa.

A gold electrode was then formed in the same manner as in Example 1. The absence of pinholes was confirmed in the same manner as in Example 1. Upon applying a DC voltage of 32 V to the EL device, a current of 30 mA was passed and an emission of green light was obtained. The maximum emission was observed at the wavelength of 530 nm, and the brightness was 60 cd/m$^2$.

EXAMPLE 3

ITO was provided on a 25 mm×75 mm×1.1 mm glass substrate a 50 nm thick film formed by the vacuum deposition method to obtain a transparent substrate. This transparent substrate was attached to the substrate holder of a commercially available vacuum deposition system (manufactured by ULVAC Co., Ltd.). 200 mg of 4,4'-distyrylbiphenyl was placed in an electrically-heated boat made of molybdenum. The pressure of the vacuum chamber was decreased to $1 \times 10^{-4}$ Pa and the boat was heated to 250° to 270° C. Under these conditions, 4,4'-distyrylbiphenyl, in which —C═C— has a trans-form, was vacuum deposited onto the transparent substrate at a rate of 0.4 to 0.6 nm/sec to obtain a luminescent film 0.5 μm thick. In this vacuum evaporation process, the temperature of the substrate was 60° C.

The substrate was taken out of the vacuum chamber. A stainless steel mask was placed on the luminescent film of the substrate, which was then attached to the substrate holder. Then, 2 g of gold was placed in an electrically-heated boat made of molybdenum, and the pressure of the vacuum chamber was decreased to $2 \times 10^{-4}$ Pa. Next, the boat was heated to 1400° C. to obtain a 20 nm thick gold electrode as the opposite electrode on the luminescent film. The absence of pinholes in the (luminescent) thin film was confirmed by measuring the resistivity between the electrodes, which showed an infinitely large resistivity, indicating the absence of a short-circuit in the element. Upon applying a DC voltage of 25 V to the EL device with the gold electrode positive and the ITO electrode negative in polarity, a current of 6 mA was passed and an emission of blue light was obtained. The maximum emission was observed at the waver length of 457 nm, the wavelength range emitted by the EL device was 425 to 520 nm, and the brightness was 72 cd/m$^2$.

EXAMPLE 4

A glass substrate provided with ITO in a 100 nm thick film to be used as a transparent electrode (25 mm×75 mm×1.1 mm, manufactured by HOYA Co., Ltd.) was used as the transparent substrate. It was ultrasonically cleaned for 30 minutes, and was further cleaned by dipping it into iso-propyl-alcohol. The transparent substrate was then dried using dry nitrogen gas. Then, it was attached to the substrate holder of a commercially available vacuum deposition system. 200 mg of N,N'-diphenyl-N,N'-bis(3-methylphenyl)-1,1'-biphenyl)-1,1'-biphenyl-4,4'-diamine (TPDA) was placed in an electrically-heated boat made of molybdenum, and 200 mg of 1,4-bis-(2-methoxystyryl)benzene, which is of all-trans-form, was placed in another electrically-heated boat made of molybdenum. Then, the pressure of the vacuum chamber was decreased to $2 \times 10^{-4}$ Pa, and the boat containing TPDA was heated to 220° C. TPDA was vacuum deposited onto the transparent substrate at a rate of 0.1 to 0.3 nm/sec to form the hole injection layer (hole injection and transport layer) 70 nm thick. Furthermore, the boat containing 1,4-bis-(2-methoxystyryl)benzene, which has an all-trans-form, was heated to 215° C. This compound was vacuum deposited onto the hole injection layer of the transparent substrate at a rate of 0.1 to 0.3 nm/sec to form the emitting layer 70 nm thick. In these vacuum deposition processes, the substrate was at room temperature.

Then, the vacuum chamber was opened to the atmosphere. The substrate was taken out of the vacuum chamber, and a stainless steel mask was placed on the emitting layer. Then, 1 g of magnesium was placed in an electrically-heated boat made of molybdenum, and 100 g of copper was placed in the crucible of an electron beam evaporation system. The pressure of the vacuum chamber was decreased again to $3 \times 10^{-4}$ Pa. Then, the boat containing magnesium was heated, and magnesium was deposited at a rate of 4 to 5 nm/sec. Copper was simultaneously heated by the electron beam and was deposited at a rate of 0.2 to 0.3 nm/sec. In this vacuum deposition process, the opposite electrode was formed of a mixture of magnesium and copper. The EL device was thus made.

Upon applying a DC voltage of 20 V to the EL device with the positive ITO electrode and the negative opposite electrode comprising a mixture of magnesium and copper, a current with a current density of 21 mA/cm$^2$ was passed, and an emission of blue light was obtained. The maximum emission of the blue light was observed at the wavelength of 450 nm, and the CIE colour coordinate was : x=0.15 and y=0.11. The brightness of the emission was 135 cd/m$^2$, and the luminescence efficiency was 0.176 lm/W.

EXAMPLE 5

A glass substrate provided with ITO in a 100 nm thick film to be used as a transparent electrode (25 mm×75 mm×1.1 mm, manufactured by HOYA Co., Ltd.) was used as the transparent substrate. It was ultrasonically cleaned for 30 minutes in iso-propylalcohol, and was further cleaned by dipping it into iso-propylalcohol. The transparent substrate was then dried using a dry nitrogen gas. Then, it was attached to the substrate holder of a commercially available vacuum evaporation system. Next, 200 mg of TPDA was placed in an electrically-heated boat made of molybdenum, and 200 mg of 1,4-bis-(3,4-dimethoxystyryl)benzene, which is of all-transform, was placed in another electrically-heated boat made of molybdenum. Then, the pressure of the vacuum chamber was decreased to $2 \times 10^{-4}$ Pa, and the boat containing TPDA was heated to 220° C. TPDA was vacuum deposited onto the transparent substrate at a rate of 0.1 to 0.3 nm/sec to form a hole injection layer (hole injection and transport layer) 80 nm thick. Furthermore, the boat containing 1,4-bis-(3,4-dimethoxystyryl)benzene, which is of all-trans-form, was heated to 210° C. This compound was vacuum deposited on the hole injection layer of the transparent substrate at a rate of 0.1 to 0.3 nm/sec to form an emitting layer 80 nm thick. The substrate was at room temperature in these vacuum evaporation processes.

Then, the vacuum chamber was opened to atmosphere. The substrate was taken out of the vacuum chamber, and a stainless steel mask was placed on the emitting layer. Then 1 g of magnesium was placed in an electrically-heated boat made of molybdenum, and 100 g of copper was placed in a crucible of an electron beam evaporation system. The pressure of the vacuum chamber was decreased again, to $3 \times 10^{-4}$ Pa. Then, the boat containing magnesium was heated, and magnesium was vacuum deposited at a rate of 4 to 5 nm/sec. Copper was simultaneously heated by the electron beam and it was deposited at a rate of 0.2 to 0.3 nm/sec. In this vacuum evaporation process, the opposite electrode was formed as a mixture of magnesium and copper. The EL device was thus completed.

Upon applying a DC voltage of 14 V to the EL device with the positive ITO electrode and the opposite negative electrode comprising a mixture of magnesium and copper, a current of 13 mA/cm$^2$ was passed and an emission of blue light was obtained. The maximum emission was observed at the wavelength of 467 nm, the CIE colour coordinate of the emission was $x = 0.15$ and $y = 0.20$, and the brightness was 100 cd/m$^2$. The emission efficiency was 0.174 lm/W. Examples 4 and 5, and Examples 11, 29, 36 and 30, which will be described later, show that the EL device of the present invention accomplishes emission of blue light with a higher brightness and higher efficiency than those developed previously.

EXAMPLE 6

A glass substrate provided with ITO in a 100 nm thick film to be used as a transparent electrode (25 mm × 75 mm × 1.1 mm, manufactured by HOYA CO., Ltd.) was used as the transparent substrate. It was ultrasonically cleaned in isopropylalcohol for 30 minutes, and was further cleaned by dipping it into iso-propylalcohol. The transparent substrate was then dried using a dry nitrogen gas. it was then attached to the substrate holder of a commercially available vacuum evaporation system. Then, 200 mg of TPDA was placed in an electrically-heated boat made of molybdenum, and 200 mg of 1,4-bis-(N,N'-diethylamino-4-styryl)benzene, which is of all-trans-form, was placed in another electrically-heated boat made of molybdenum. Then, the pressure of the vacuum chamber was decreased to $2 \times 10^{-4}$ Pa, and the boat containing TPDA was heated to 220° C. TPDA was vacuum deposited onto the transparent substrate at a rate of 0.1 to 0.3 nm/sec to form a hole injection layer (hole injection and transport layer) 80 nm thick. Furthermore, the boat containing 1,4-bis-(N,N'-diethylamino-4-styryl)benzene was heated to 230° to 235° C. This compound was vacuum deposited onto the hole injection and transport layer of the transparent substrate at a rate of 0.1 nm/sec to form an emitting layer 80 nm thick. The substrate was at room temperature in these vacuum deposition processes.

Then, the vacuum chamber was opened to the atmosphere.

The substrate was taken out of the vacuum chamber, and a stainless steel mask was placed on the emitting layer. Then, 1 g of magnesium was placed in an electrically-heated boat made of molybdenum, and 100 g of copper was placed in the crucible of an electron beam evaporation system. The pressure of the vacuum chamber was decreased again, to $3 \times 10^{-4}$ Pa. The boat containing magnesium was heated and magnesium was vacuum deposited at a rate of 4 to 5 nm/sec. Copper was simultaneously heated by the electron beam, and it was deposited at a rate 0.2 to 0.3 nm/sec. In this vacuum evaporation process, the opposite electrode was formed as a mixture of magnesium and copper. The EL device was thus completed.

Upon applying a DC voltage of 17 V to the EL device with the ITO electrode positive and the opposite electrode comprising a mixture of magnesium and copper negative in polarity, a current with a current density of 194 mA/cm$^2$ was passed and an emission of green light was obtained. The maximum emission was observed at the wavelength of 508 nm, and the brightness was 40 cd/m$^2$.

EXAMPLE 7

A glass substrate provided with ITO in a 100 nm thick film to be used as a transparent electrode (25 mm × 75 mm × 1.1 mm, manufactured by HOYA Co., Ltd.) was used s the transparent substrate. It was ultrasonically cleaned in isopropylalcohol for 30 minutes, and was further cleaned by dipping it into iso-propylalcohol. The transparent substrate was dried using a dry nitrogen gas. It was then attached to the substrate holder of a commercially available vacuum deposition system, and 200 mg of 1,4-bis-(N,N'-diphenylamino-4-styryl)benzene was placed in an electrically-heated boat made of molybdenum. Then, the pressure of the vacuum chamber was decreased to $2 \times 10^{-4}$ Pa, and the boat containing 1,4-bis-(N,N'-diphenylamino-4-styryl)-benzene was heated to 210° to 220° C. Under these conditions, the compound was vacuum deposited onto the transparent substrate at a rate of 0.3 nm/sec to form an emitting layer 300 nm thick. The substrate was at room temperature in this vacuum evaporation process.

Then, the vacuum chamber was opened to the atmosphere.

The substrate was taken out of the vacuum chamber, and a stainless steel mask was placed on the emitting layer. Then, 1 g of magnesium was placed in an electrically-heated boat made of molybdenum, and 100 g of copper was placed in the crucible of an electron beam evaporation system. The pressure of the vacuum chamber was decreased again to $3 \times 10^{-4}$ Pa, and then the boat containing magnesium was heated, and magnesium was vacuum deposited at a rate of 4 to 5 nm/sec. The copper was simultaneously heated by the electron beam, and it was deposited at a rate of 0.2 to 0.3 nm/sec. The opposite electrode was formed of a mixture of magnesium and copper.

Upon applying a DC voltage of 19 V to the EL device with the positive ITO electrode and the opposite negative electrode comprising a mixture of magnesium and copper, a current with a current density of 180 mA/cm$^2$ was passed and an emission of greenish blue light was obtained. The maximum emission was observed at the wavelength of 472 nm, and the brightness was 30 cd/m².

COMPARATIVE EXAMPLE 1

An EL device was made in the same manner as in Example 1 except that 1,4-bis-(4-cyanostyryl)benzene was used as the emitting layer, that the temperature of the boat containing this compound during the vacuum deposition was 270° C. and that the thickness of the emitting layer was 600 nm. The opposite electrode was formed by the vacuum deposition of gold.

Upon applying a DC voltage of 100 V to the device with the negative ITO electrode and the positive gold electrode a current with a current density of only 15 nA/cm² was passed. No light emission was observed.

COMPARATIVE EXAMPLE 2

An EL device was made in the same manner as in Example 1 except that 1,4-bis-(4-nitrostyryl)benzene was used as the emitting layer. The temperature of the boat containing this compound during the vacuum deposition was 260° C., and the thickness of the emitting layer was 900 nm. The opposite electrode was formed by the vacuum deposition of gold.

Upon applying a DC voltage of 100 V to the device with the negative ITO electrode and the positive gold electrode a current with a current density of only 12 nA/cm² was passed. No light emission was observed.

Comparison of the results in Example 1–7 with those in comparative Examples 1 and 2 revealed that unsubstituted compounds or compounds having electron donative substituents such as alkyl group, alkoxy group and amino group show a positive result.

EXAMPLE 8

A glass substrate provided with an ITO transparent electrode of 100 nm in thickness (25 mm×75 mm×1.1 mm, manufactured by HOYA Co., Ltd.) was used as the transparent substrate. It was ultrasonically cleaned in iso-propyl alcohol for 30 minutes, and was further cleaned by dipping it into iso-propyl alcohol. The transparent substrate was dried using a dry nitrogen gas. It was then attached to the substrate holder of a commercially available vacuum deposition system. Then, 200 mg of TPDA was placed in an electrically-heated boat made of molybdenum, and 200 mg of 1,4-bis(2-(3-N-ethyl-carvazolyl)vinyl)benzene, which has an all-trans-structure, was placed in another electrically-heated boat made of molybdenum. Then, the pressure of the vacuum chamber was decreased to 4×10⁻⁴ Pa, and the above-mentioned boat containing TPDA was heated to 220° C. Under these conditions, TPDA was vacuum deposited onto the transparent substrate at a rate of 0.1 to 0.7 nm/sec to form the hole injection and transport layer of 50 nm in thickness. Furthermore, the above-mentioned boat containing 1,4-bis-(2-(3-N-ethylcarbazolyl)vinyl)benzene was heated to 315° C. This compound was vacuum deposited at a rate of 0.1 nm/sec onto the above hole injection and transport layer to form an emitting layer 60 nm.

In these vacuum evaporation processes, the said substrate was at room temperature.

Then, the vacuum chamber was opened to atmosphere.

The substrate was taken out of the vacuum chamber, and a stainless steel mask was placed on the said emitting layer. Then, 3 g of magnesium was placed in an electrically-heated boat made of molybdenum, and copper was placed in the crucible of an electron beam evaporation system. The pressure of the vacuum chamber was again decreased, to 2×10⁻⁴ Pa, and then, the boat containing magnesium was heated. Magnesium was vacuum deposited at a rate of 4 to 5 nm/sec. Copper was simultaneously heated by the electron beam, and it was vacuum deposited at a rate of 0.3 to 0.5 nm/sec. The opposite electrode was formed as a mixture of magnesium and copper. The desired EL device was thus made.

Upon applying a DC voltage of 15 V to EL device with the positive ITO electrode and the opposite negative electrode comprising magnesium and copper, a current with a current density of 205 mA/cm² was passed and an emission of greenish blue light was obtained. The maximum emission was observed at the wavelength of 487 nm, and the CIE colour coordinate was x =0.15 and y=0.30. The brightness was 750 cd/m².

The results in Example 8, 35 and 40 reveal that emission of blue green light and greenish blue light is obtained with a high brightness and a good efficiency.

EXAMPLE 9

A glass substrate provided with a transparent electrode of ITO 100 nm thick (25 mm×75 mm×1.1 mm, manufactured by HOYA Co., Ltd.) was used as the transparent substrate. it was ultrasonically cleaned in iso-propylalcohol for 30 minutes, and was further cleaned by dipping it into iso-propylalcohol. The transparent substrate was dried using a dry nitrogen gas, and was then attached to the substrate holder of a commercially available vacuum evaporation system. Then, 200 mg of TPDA was placed in an electrically-heated boat made of molybdenum, and 200 mg of 1-(2-(2-(6-methyl-quinoly))-vinyl)-4-styrylbenzene was placed in another electrically-heated boat made of nolybdenum. Then, the pressure of the vacuum chamber was decreased to 2.8×10⁻⁴ Pa, and the above-mentioned boat containing TPDA was heated to 220° C. Under these conditions, TPDA was vacuum deposited onto the transparent substrate at a rate of 0.1 to 0.3 nm/sec to form a hole injection and transport layer 50 nm thick. Furthermore, the above-mentioned boat containing 1-(2-(2-(6-methyl-quinolyl))-vinyl)-4-styrylbenzene was heated to 211° C. Under these conditions, this compound was vacuum deposited onto the above hole injection and transport layer at a rate of 0.1 to 0.5 nm/sec to form an emitting layer 60 nm thick. In these vacuum deposition processes, the said substrate was at room temperature.

Then, the vacuum chamber was opened to the atmosphere.

The substrate was taken out of the vacuum chamber, and a stainless steel mask was placed on said emitting layer. Then, 3 g of magnesium was placed in an electrically-heated boat made of molybdenum, and copper was placed in the crucible of an electron beam evaporation system. The pressure of the vacuum chamber was again decreased, to 2×10⁻⁴ Pa, and then the boat containing magnesium was heated. Magnesium was vacuum deposited at a rate of 4 to 5 nm/sec. Copper was simultaneously heated by the electron beam and it was vacuum deposited at a rate of 0.1 to 0.3 nm/sec. The opposite electrode was formed as a mixture of magnesium and copper. The desired EL device was thus made.

Upon applying a DC voltage of 10 V to the EL device with the positive ITO electrode and the opposite negative electrode comprising a mixture of magnesium and copper, a current with a current density of 153 mA/cm$^2$ was passed and an emission of green light was obtained. The maximum emission was observed at the wavelength of 505 nm, and the CIE colour coordinate was x=0.20 and y=0.41. The brightness was 305 cd/m$^2$.

EXAMPLE 10

A glass substrate provided with a transparent electrode of ITO 100 nm thick (25 mm×75 mm×1.1 mm, manufactured by HOYA Co., Ltd.) was used as the transparent substrate. It was ultrasonically cleaned in iso-propylalcohol for 30 minutes, and was further cleaned by dipping it into iso-propylalcohol. The transparent substrate was dried using a dry nitrogen gas, and was then attached to the substrate holder of a commercially available vacuum deposition system. Then, 200 mg of TPDA was placed in an electrically-heated boat made of molybdenum, and 200 mg of 1,4-bis(2-(quinolinyl)vinyl) benzene, which is of an all-trans-structure, was placed in another electrically-heated boat made of molybdenum. Then, the pressure of the vacuum chamber was decreased to $3 \times 10^{-4}$ Pa, and the above-mentioned boat containing TPDA was heated to 220° C. Under these conditions, TPDA was vacuum deposited onto the transparent substrate at a rate of 0.1 to 0.3 nm/sec to form a hole injection and transport layer 50 nm thick. Furthermore, the above-mentioned boat containing 1,4-bis(2-(quinolinyl)vinyl)benzen was heated to 211° C. Under these conditions, this compound was vacuum deposited on the above hole injection and transport layer at a rate of 0.1 to 0.5 nm/sec to form an emitting layer 60 nm thick. In these vacuum deposition processes, the said substrate was at room temperature.

Then, the vacuum chamber was opened to the atmosphere, the substrate was taken out of the vacuum chamber, and a stainless steel mask was placed on the said emitting layer. Next, 3 g of magnesium was placed in an electrically-heated boat made of molybdenum, and copper was placed in the crucible of an electron beam evaporation system. The pressure of the vacuum chamber was again decreased, to $1.2 \times 10^{-4}$ Pa, and then the boat containing magnesium was heated. Magnesium was vacuum deposited at a rate of 5 nm/sec. Copper was simultaneously heated by the electron beam, and it was vacuum deposited at a rate of 0.1 to 0.3 nm/sec. The opposite electrode was formed as a mixture of magnesium and copper. Then, the device was annealed at 70° C. for 30 seconds. The desired EL device was thus made.

Upon applying a DC voltage of 15 V to the EL device with the positive ITO electrode and the opposite negative electrode comprising a mixture of magnesium and copper a current with a current density of 161 mA/cm$^2$ was passed and an emission of green light was obtained. The maximum emission was observed at the wavelength of 513 nm, and the CIE colour co-ordinate was x=0.20 and y=0.41. The brightness was 136 cd/m$^2$.

EXAMPLE 11

A glass substrate provided with a transparent electrode of ITO 100 nm thick (25 mm×75 mm×1.1 mm, manufactured by HOYA Co., Ltd.) was used as the transparent substrate. It was ultrasonically cleaned in iso-propylalcohol for 30 minutes, and was further cleaned by dipping it into in iso-propylalcohol. The transparent substrate was dried using a dry nitrogen gas, and was then attached to the substrate holder of a commercially available vacuum evaporation system. Then, 200 mg of TPDA was placed in an electrically-heated boat made of molybdenum, and 200 mg of 4,4'-(1-naphthyl)ethene, which has a trans-structure, was placed in another electrically-heated boat made of molybdenum. Then, the pressure of the vacuum chamber was decreased to $3 \times 10^{-4}$ Pa, and the above-mentioned boat containing TPDA was heated to 220° C. Under these conditions, TPDA was vacuum deposited onto the transparent substrate at a rate of 0.1 to 0.7 nm/sec to form a hole injection and transport layer 60 nm thick. Furthermore, the above-mentioned boat containing 4,4'-(1-napthyl)ethene was heated to 168° C. Under these conditions, this compound was vacuum deposited onto the above hole injection and transport layer at a rate of 0.1 to 0.3 nm/sec to form an emitting layer 90 nm thick. In these vacuum evaporation processes, the said substrate was at room temperature.

Then, the vacuum chamber was opened to the atmosphere.

The substrate was taken out of the vacuum chamber, and a stainless steel mask was placed on the said emitting layer. Then, 3 g of magnesium was placed in an electrically-heated boat made of molybdenum, and copper was placed in the crucible of an electron beam evaporation system. The pressure of the vacuum chamber was again decreased, to $2 \times 10^{-4}$ Pa, and then the boat containing magnesium was heated. Magnesium was vacuum deposited at a rate of 4 to 5 nm/sec. Copper was simultaneously heated by the electron beam, and it was vacuum deposited at a rate of 0.2 to 0.3 nm/sec. The opposite electrode was formed as a mixture of magnesium and copper. The desired EL device was thus made.

Upon applying a DC voltage of 15 V to the EL device with the positive ITO electrode and the opposite negative electrode comprising a mixture of magnesium and copper a current with a current density of 70 mA/cm$^2$ was passed and an emission of blue light was obtained. The maximum emission was observed at the wavelength of 480 nm, and the CIE colour coordinate was x=0.15 and y=0.21. The brightness was 150 cd/m$^2$, and the luminescence efficiency was 0.05 lm/w.

EXAMPLE 12

A glass substrate provided with a transparent electrode of ITO 100 nm thick (25 mm×75 mm×1.1 mm, manufactured by HOYA Co., Ltd.) was used as the transparent substrate. it was ultrasonically cleaned in iso-propylalcohol for 30 minutes, and was further cleaned by dipping it into iso-propylalcohol. The transparent substrate was dried using a dry nitrogen gas, and was then attached to the substrate holder of a commercially available vacuum evaporation system. Then, 200 mg of TPDA was placed in an electrically-heated boat made of molybdenum, and 200 mg of 1-(4-biphenyl)-2-12-quinolyl) ethene, which has a trans-structure was placed in another electrically-heated boat made of molybdenum. Then, the pressure of the vacuum chamber was decreased to $2 \times 10^{-4}$ Pa, and the above-mentioned boat containing TPDA was heated to 220° C. Under these conditions, TPDA was vacuum deposited on the transparent substrate at a rate of 0.1 to 0.3 nm/sec to form the hole injection and transport layer 60 nm thick.

Furthermore the above-mentioned boat containing (1-(4-biphenyl)-2-12-quinolyl)ethene was heated to 185° C. Under these conditions, this compound was vacuum deposited on the above hole injection and transport layer at a rate of 0.1 to 0.3 nm/sec to form an emitting layer 60 nm thick. In these vacuum evaporation processes, the said substrate was at room temperature.

Then, the vacuum chamber was opened to the atmosphere.

The substrate was taken out of the vacuum chamber, and a stainless steel mask was placed on the said emitting layer. Then, 3 g of magnesium was placed in an electrically-heated boat made of molybdenium, and copper was placed in the crucible of an electron beam evaporation system. The pressure of the vacuum chamber was again decreased, to $1.2 \times 10^{-4}$ Pa, and then the boat containing magnesium was heated. Magnesium was vacuum deposited at a rate of 5 to 6 nm/sec. Copper was simultaneously heated by the electron beam, and it was vacuum deposited at a rate of 0.2 to 0.3 nm/sec. The opposite electrode was formed as a mixture of magnesium and copper. The desired EL device was thus made.

Upon applying a DC voltage of 15 V to the EL device with the positive ITO electrode and the opposite negative electrode comprising a mixture of magnesium and copper, a current with a current density of 168 mA/cm$^2$ was passed and an emission of yellow-greenish white light was obtained. The maximum emission was observed at the wavelength of 517 nm, and the emission was observed throughout the visible region. The CIE colour coordinate was x=0.27 and y=0.39, and the brightness was 50 cd/m$^2$, indicating a possibility of emitting white light.

EXAMPLE 13

A 25 mm×75 mm×1.1 mm large glass substrate provided with ITO by the vacuum evaporation method in a 100 nm thick film was used as the transparent substrate. The transparent substrate was attached to the substrate holder of a commercially available vacuum evaporation system (manufactured by ULVAC Co., Ltd.). Then, 200 mg of N,N'-diphenyl-N,N'-bis-(3-methylphenyl)-1,1'-biphenyl)-4,4'-diamine (TPDA) was placed in an electrically-heated boat made of molybdenum, and 200 mg of trans-4,4'-diphenylstilbene (DPS) was placed in another electrically-heated boat made of molybdenum. The pressure of the vacuum chamber was decreased to $1 \times 10^{-4}$ Pa, and then the above-mentioned boat containing TPDA was heated to 215° to 220° C. Under these condition, TPDA was vacuum deposited onto the transparent substrate at a rate of 0.1 to 0.3 nm/sec to form a hole injection and transport layer 60 nm thick. In this vacuum evaporation process, the substrate was at room temperature. Without taking the substrate out of the vacuum chamber, DPS was vacuum deposited from the other boat to form the emitting layer in a 60 nm thick film on the hole injection and transport layer. In this vacuum deposition process, the conditions were that the temperature of the boat was 205° to 210° C., that the deposition rate was 0.1 to 0.2 nm/sec, and that the substrate was at room temperature. The substrate was then taken out of the vacuum chamber, and a stainless steel mask was placed on the said emitting layer. Then, the substrate was again attached to the substrate holder.

Next, 1 g of magnesium ribbon was placed in an electrically-heated boat made of molybdenum, and a pellet of copper was placed as the target of an electron gun for electron beam evaporation which is located in the central part of the vacuum chamber under the substrate holder. The pressure of the vacuum chamber was then decreased to $2 \times 10^{-4}$ Pa. Then, copper was vacuum deposited by the electron beam evaporation process at a rate of 0.03 to 0.08 nm/sec, and simultaneously magnesium was vacuum deposited at a rate of 1.7 to 2.8 nm/sec by heating the boat made of molybdenum. The emission current of the filament of the electron gun was 200 to 230 mA, and the acceleration voltage was 4 kV. The temperature of the boat was about 500° C. Under these conditions, the opposite electrode was formed on the emitting layer as a mixed metal electrode of magnesium and copper 100 nm thick.

Upon applying a DC voltage of 12 V to the EL device with the positive ITO electrode and the negative mixed metal electrode comprising magnesium and copper a current with a current density of 210 mA/cm$^2$ was passed and an emission of blue light was obtained. The wavelength range of the emission was 420 to 550 nm according to spectroscopic measurement, and the peak wavelength was 470 nm, which was similar to the results obtained from the Comparative Example 3, in which the layer had a mono-layer structure. The brightness was 200 cd/m$^2$.

Thus, it revealed that an accumulation of the layers gives an emission of blue light (the same colour as in the mono-layer structure) that is brighter with a lower voltage applied than the result of Comparative Example 3, as will be described later.

EXAMPLE 13

A 25 mm×75 mm×1.1 mm large glass substrate provided with ITO by the vacuum evaporation process in a 100 nm thick film was used as the transparent substrate. The transparent substrate was attached to the substrate holder of a commercially available vacuum evaporation system (manufactured by ULVAC Co., Ltd.). Then 200 mg of TPDA was placed in an electrically-heated boat made of molybdenum, and 200 mg of 1,4-distyryl-benzene (DSB) was placed in another electrically-heated boat made of molybdenum. The pressure of the vacuum chamber was decreased to $1 \times 10^{-4}$ Pa, and then the above-mentioned boat containing TPDA was heated to 215° to 220° C. Under these conditions, TPDA was vacuum deposited onto the transparent substrate at a rate of 0.1 to 0.3 nm/sec to form the hole injection and transport layer 60 nm thick. In this vacuum deposition process, the substrate was at room temperature. Without taking the substrate out of the vacuum chamber, DSB was vacuum deposited from the other boat to form an emitting layer of a 60 nm thick film onto the hole injection and transport layer. In this vacuum evaporation process, the conditions were that the temperature of the boat was 215° to 220° C., that the deposition rate was 0.1 to 0.2 nm/sec, and that the substrate was at room temperature. The substrate was then taken out of the vacuum chamber, and a stainless steel mask was placed on the above emitting layer. Then, the substrate was again attached to the substrate holder.

Next, 1 g of magnesium ribbon was placed in an electrically-heated boat made of molybdenum, and a pellet of copper was placed as a target of an electron gun for electron beam evaporation which is located at the center of the vacuum chamber under the substrate holder. The pressure of the vacuum chamber was then decreased to $2 \times 10^{-4}$ Pa. Then, copper was vacuum deposited by the electron beam evaporation process at a rate of 0.03 to 0.08 nm/sec, and simultaneously, magnesium was vacuum deposited at a rate of 1.7 to 2.8 nm/sec by heating the boat made of molybdenum. The emission current of the filament of the electron gun was 200 to 230 mA, and the acceleration voltage was 4 kV. The temperature of the boat was about 500° C. Under these conditions, the opposite electrode was formed on the emitting layer as a mixed metal electrode of magnesium and copper 100 nm thick.

Upon applying a DC voltage of 15 V to the EL device with the positive ITO electrode and the mixed negative metal electrode comprising magnesium and copper, a current with a current density of 180 mA/cm$^2$ was passed and an emission of bluish white light was obtained. The peak wavelength was at 440 nm, and the brightness was 150 cd/m$^2$.

Thus, it revealed that an accumulation of the layers gives an emission of bluish white light that is brighter when a lower voltage is applied than with the result in Comparative Example 4 as will be described later.

EXAMPLE 15

A 25 mm×75 mm×1.1 mm large glass substrate provided with ITO in a 100 nm thick film formed by the vacuum deposition method was used as the transparent substrate. The transparent substrate was attached to the substrate holder of a commercially available vacuum evaporation system (manufactured by ULVAC Co., Ltd.). Then 200 mg of TPDA was placed in an electrically-heated boat made of molybdenum, and 200 mg of DSB was placed in another boat made of molybdenum. The pressure of the vacuum chamber was decreased to 1×10$^{-4}$ Pa, and then the above-mentioned boat containing TPDA was heated to 215° to 220° C. Under these conditions, TPDA was vacuum deposited onto the transparent substrate at a rate of 0.1 to 0.3 nm/sec to form a hole injection and transport layer 60 nm thick. In this vacuum evaporation process, the substrate was at room temperature. Without taking the substrate out of the vacuum chamber, DSB was vacuum deposited from the other boat as a 60 nm thick film for the emitting layer on the hole injection and transport layer. In this vacuum deposition process, the conditions were that the temperature of the boat was 215° to 220° C., the rate of deposition was 0.1 to 0.2 nm/sec, and the substrate was at room temperature.

These two boats made of molybdenum were taken out of the vacuum chamber, and then a boat made of molybdenum containing 200 mg of (3", 4":3,4,5;10", 9":3', 4', 5')-dipyridino(1,2-a:1',2'-a')bisbenzoimidazole-6,18-dion, which is represented by the formula:

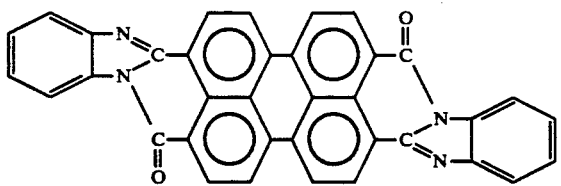

was set in the vacuum chamber. The pressure of the vacuum chamber was then decreased to 2×10$^{-4}$ Pa, and the above-mentioned boat was heated to 500° C. to form a 60 nm thick film of the above compound on the emitting layer. Then, the vacuum chamber was opened to the atmosphere, and the accumulated sample was taken out of the substrate holder. A stainless steel mask was placed on the sample, which was again attached to a substrate holder. Then, 1 g of magnesium ribbon was placed in an electrically-heated boat made of molybdenum, and a copper pellet was placed as the target of an electron gun for electron beam evaporation, which is located at the center of the vacuum chamber under the substrate holder. The pressure of the vacuum chamber was then decreased to 2×10$^{-4}$ Pa. Copper was vacuum deposited by the electron beam evaporation process at a rate of 0.03 to 0.08 nm/sec, and simultaneously, magnesium was vacuum deposited at a rate of 1.7 to 2.8 nm/sec by heating the boat made of molybdenum. The emission current of the filament of the electron gun was 200 to 230 mA, and the acceleration voltage was 4 kV. The temperature of the boat was about 500° C. Under these conditions, the opposite electrode was formed as a 100 nm thick metal mixture of magnesium and copper.

Upon applying a DC voltage of 15 V to the EL device with the positive ITO electrode and the mixed negative metal electrode comprising magnesium and copper, a current with a current density of 200 mA/cm$^2$ was passed and an emission of bluish white light was obtained as in Example 2. The peak wavelength was at 440 nm, and the emission brightness was 170 cd/m$^2$.

COMPARATIVE EXAMPLE 3

A 25 mm×75 mm×1.1 mm large glass substrate provided with ITO by the vacuum evaporation process in a 50 nm thick film was used as the transparent substrate. The transparent substrate was attached to the substrate holder of a commercially available vacuum evaporation system (manufactured by ULVAC Co., Ltd.). Then, 200 to 300 mg of trans-4,4'-diphenylstilbene, which was synthesized according to the process described in J. Org. Chem. 24 (1959) 1246, was placed in an electrically-heated boat made of molybdenum, and the pressure of the vacuum chamber wad deceased to 1×10$^{-4}$ Pa. Then, the above-mentioned boat was heated to 220° to 240° c. Under these conditions, the above compound was vacuum deposited at a rate of 2.0 nm/sec onto the transparent substrate to form a luminescent film 1.1 μm thick. In this vacuum evaporation process, the substrate was at room-temperature. The substrate was then taken out of the vacuum chamber, and a stainless steel mask was placed on the emitting layer, which was again attached to the substrate holder. Then, 2.0 mg of gold was placed in an electrically-heated boat, and the pressure of the vacuum chamber was decreased to 2×10$^{-4}$ Pa. Then, the boat was heated to 1400° C., and a 100 nm thick gold electrode was formed as the opposite electrode on the thin film.

Upon applying a DC voltage of 40 V to the EL device with the positive gold electrode and the negative ITO electrode, a current with a current density of 17 mA/cm$^2$ was passed and emission of bluish white light was obtained. The maximum emission was observed at the wavelength of 465 nm, and the brightness was 75 cd/m$^2$.

COMPARATIVE EXAMPLE 4

An EL device was made in the same manner as in Comparative Example 3 except that 1,4-distyryl-benzene, which was synthesized according to the process described in J. Org Chem. 24 (1959) 1246, was used as the material of the emitting layer, that the temperature of the boat was 240 to 260° C., and that the thickness of the luminescent layer was 1.5 m.

Upon applying a DC voltage of 20 V to the EL device in the same manner as in Comparative Example 3, a current with a current density of 50 mA/cm$^2$ was passed and emission of bluish white light was obtained. The maximum emission was observed at a wavelength of 440 nm, and an emission brightness was 80 cd/m$^2$.

EXAMPLE 16

A 25 mm×75 mm×1.1. mm large glass substrate provided with ITO in a 100 nm thick film by the vacuum evaporation process was used as the transparent substrate. The transparent substrate was attached to the substrate holder of a commercially available vacuum evaporation system (manufactured by ULVAC Co., Ltd.). Then 200 mg of TPDA was placed in an electrically-heated boat made of molybdenum, and 200 mg of 1,4-bis(2-methylstyryl)benzene (OMSB) was placed in another boat made of molybdenum. The pressure of the vacuum chamber was decreased to 1×10$^{-4}$ Pa, and then the above-mentioned boat containing TPDA was heated to 215° to 220° C. Under these conditions, TPDA was vacuum deposited on the transparent substrate at a rate of 0.1 to 0.3 nm/sec to form a hole injection and transport layer 80 nm thick. In this vacuum deposition process, the substrate was at room temperature. Without taking the substrate out of the vacuum chamber, OMSB was vacuum deposited from the other boat as a 80 nm thick film for the emitting layer on the hole injection and transport layer. In this vacuum deposition process, the conditions were that the temperature of the boat was 145° to 135° C., that the rate of deposition was 0.1 to 0.2 nm/sec, and that the substrate was at room temperature.

The substrate was taken out of the vacuum chamber, and stainless steel mask was placed on the sample, which was again attached to the substrate holder. Then, 1 g of magnesium ribbon was placed in an electrically-heated boat made of molybdenum, and a copper pellet was placed as the target of an electron gun for electron beam evaporation which is located at the center of the vacuum chamber under the substrate holder. The pressure of the vacuum chamber was then decreased to 2×10$^{-4}$ Pa. Copper was vacuum deposited by the electron beam evaporation process at a rate of 0.03 to 0.08 nm/sec, and simultaneously, magnesium was vacuum deposited at a rate of 1.7 to 2.8 nm/sec by heating the boat made of molybdenum. The emission current of the filament of the electron gun was 200 to 230 mA, and the acceleration voltage was a 4 kV. the temperature of the boat was about 500° C. Under these conditions, the opposite electrode was formed as a 60 nm thick metal mixture of magnesium and copper.

Upon applying a DC voltage of 10 V to the EL device with the positive ITO electrode and the mixed negative metal electrode comprising magnesium and copper, a current with a current density of 140 mA/cm$^2$ was passed and an emission of blue light was obtained. The maximum emission was observed by a spectroscopic measurement at the wavelength of 463 nm, and the emission brightness as 100 cd/m$^2$.

These results reveal that by accumulating the layers, an emission of a brighter blue light was obtained by applying a lower voltage, although the maximum emission shifted to a longer wavelength to 10 nm, compared with the results in Comparative Example 5, as will be described later.

EXAMPLE 17

A 25 mm×75 mm×1.1 mm large glass substrate provided with ITO in a 100 nm thick film by the vacuum evaporation process was used as the transparent substrate. The transparent substrate was attached to the substrate holder of a commercially available vacuum evaporation system (manufactured by ULVAC Co., Ltd.). Then, 200 mg of TPDA was placed in an electrically-heated boat made of molybdenum, and 200 mg of 1,4-bis(4-methylstyryl)benzene (PMSB) was placed in another boat made of molybdenum. The pressure of the vacuum chamber was decreased to 1×10$^{-4}$ Pa, and then the above-mentioned boat containing TPDA was heated to between 215° and 220° C. Under these conditions, TPDA was vacuum deposited on the transparent substrate at a rate of 0.1 to 0.3 nm/sec to form a hole injection and transport layer 85 nm thick. In this vacuum deposition process, the substrate was at room temperature. Without taking the substrate out of the vacuum chamber, PMSB was vacuum deposited from the other boat as an 80 nm thick film as the emitting layer on the hole injection and transport layer. In this vacuum deposition process, the conditions were that the temperature of the boat was between 220° and 2250° C., that the rate of deposition was 0.1 to 0.2 nm/sec, and that the substrate was at room temperature.

Then, the substrate was taken out of the vacuum chamber, and a stainless steel mask was placed on the sample, which was again attached to the substrate holder. Then, 1 g of magnesium ribbon was placed in an electrically-heated boat made of molybdenum, and a copper pellet was placed as the target of an electron gun for electron beam evaporation which is located at the center of the vacuum chamber under the substrate holder. The pressure of the vacuum chamber was then decreased to 2×10$^{-4}$ Pa. Copper was vacuum deposited by the electron beam evaporation process at a rate of 0.03 to 0.08 nm/sec, and simultaneously, magnesium was vacuum deposited at a rate of 1.7 to 2.8 nm/sec by heating the boat made of molybdenum. The emission current of the filament of the electron gun was 200 to 230 mA, and the acceleration voltage was 4 kV. The temperature of the boat was about 500° C. Under these conditions, the opposite electrode was formed as a 60 nm thick metal mixture of magnesium and copper.

Upon applying a DC voltage of 12 V to the EL device with the positive ITO electrode and the mixed negative metal electrode comprising magnesium and copper, a current with a current density of 140 mA/cm$^2$ was passed and an emission of greenish blue light was obtained. The maximum emission was observed by a spectroscopic measurement at the wavelength of 483 nm, and the brightness was 150 cd/m$^2$.

These results reveal that by accumulating the layers an emission of greenish blue light (the same color as in a mono-layer structure) was obtained with a higher brightness upon application of a lower voltage when compared with the results in Comparative Example 6 as will be described later.

EXAMPLE 18

A 25 mm×75 mm×1.1 mm large glass substrate provided with ITO in a 100 nm thick film by the vacuum evaporation process was used as the transparent substrate. The transparent substrate was attached to the substrate holder of a commercially available vacuum evaporation system (manufactured by ULVAC Co., Ltd.). Then, 200 mg of TPDA was placed in an electrically-heated boat made of molybdenum, and 200 mg of 1,4-bis(4-ethylstyryl)benzene (ESB) was placed in another boat made of molybdenum. The pressure of the vacuum chamber was decreased to $1\times10^{-4}$ Pa, and then the boat containing TPDA was heated to 215° to 220° C. Under these conditions, TPDA was vacuum deposited onto the transparent substrate at a rate of 0.1 to 0.3 nm/sec to form a hole injection and transport layer 80 nm thick. In this vacuum evaporation process, the substrate was at room temperature. Without taking the substrate out of the vacuum chamber, ESB was vacuum deposited from the other boat as an 80 nm thick film as the emitting layer on the hole injection and transport layer. In this vacuum deposition process, the conditions were that the temperature of the boat was between 220° and 225° C., that the rate of deposition was 0.1 to 0.3 nm/sec, and that the substrate was at room temperature.

Then the substrate was taken out of the vacuum chamber, and a stainless steel mask was placed on the sample, which was again attached to a substrate holder. Then, 1 g of magnesium ribbon was placed in an electrically-heated boat made of molybdenum, and a copper pellet was placed as the target of an electron gun for electron beam evaporation, which is located at the center of the vacuum chamber under the substrate holder. The pressure of the vacuum chamber was then decreased to $2\times10^{-4}$ Pa. Copper was vacuum deposited by the electron beam evaporation process at a rate of 0.03 to 0.08 nm/sec, and simultaneously, magnesium was vacuum deposited at a rate of 1.7 to 2.8 nm sec by heating the boat made of molybdenum. The emission current of the filament of the electron gun was 200 to 230 mA, and the acceleration voltage was 4 kV. The temperature of the boat was about 550° C. Under these conditions, the opposite electrode was formed as a 50 nm thick metal mixture of magnesium and copper.

Upon applying a DC voltage of 10 V to the EL device with the positive ITO electrode and the negative metal electrode comprising magnesium and copper, a current with a current density of 100 mA/cm$^2$ was passed and an emission of greenish blue light was obtained. The maximum emission was observed by a spectroscopic measurement at the wavelength of 486 nm, and the brightness was 80 cd/m$^2$.

These results reveal that by accumulating the layers an emission of greenish blue light was obtained with a higher brightness upon applying a lower voltage compared with the results in Comparative Example 7 as will be described later.

EXAMPLE 19

A 25 mm×75 mm×1.1 mm large glass substrate provided with ITO in a 100 nm thick film by the vacuum evaporation process was used as the transparent substrate. The transparent substrate was attached to the substrate holder of a commercially available vacuum evaporation system (manufactured by ULVAC Co., Ltd.). Then, 200 mg of TPDA was placed in an electrically-heated boat made of molybdenum, and 200 mg of ESB was placed in another boat made of molybdenum. the pressure of the vacuum chamber was decreased to $1\times10^{-4}$ Pa, and then the boat containing TPDA was heated to 215° to 220° C. Under these conditions, TPDA was vacuum deposited onto the transparent substrate at a rate of 0.1 to 0.3 nm/sec to form a hole injection and transport layer 60 nm thick. In this vacuum evaporation process, the substrate was at room temperature. Without taking the substrate out of the vacuum chamber, ESB was vacuum deposited from the other boat as a 60 nm thick film as the emitting layer on the hole injection and transport layer. In this vacuum deposition process, the conditions were that the temperature of the boat was between 220° and 225° C., that the rate of deposition was 0.1 to 0.3 nm/sec, and that the substrate was at room temperature.

Then, the vacuum chamber was opened to the atmosphere.

These two boats made of molybdenum were taken out of the vacuum chamber, and then a boat made of molybdenum containing 200 mg of (3'',4'':3,4,5:10'',9'':3',4',5')-dipyridino(1,2-a: 1',2'-a') bis-benzoimidazole-6,18-dion was set in the vacuum chamber. The pressure of the vacuum chamber was decreased to $2\times10^{-4}$ Pa, and the boat was heated to 500° C. to form a 60 nm thick film of the above compound on the emitting layer. Then, the vacuum chamber was opened to the atmosphere, and the accumulated sample was taken out of the substrate holder. A stainless steel mask was placed on the sample, which was again attached to the substrate holder. Then, 1 g of magnesium ribbon was placed in an electrically-heated boat made of molybdenum, and a copper pellet was placed as the target of an electron gun for electron beam evaporation which is located at the center of the vacuum chamber under the substrate holder. The pressure of the vacuum chamber was then decreased to $2\times10^{-4}$ Pa. Copper was vacuum deposited by the electron beam evaporation process at a rate of 0.03 to 0.08 nm/sec, and simultaneously, magnesium was vacuum deposited at a rate of 1.7 to 2.8 nm/sec by heating the boat made of molybdenum. The emission current of the filament of the electron gun was between 200 and 230 mA, and the acceleration voltage was 4 kV. The temperature of the boat was about 500° C. Under these conditions, the opposite electrode was formed as a 100 nm thick metal mixture of magnesium and copper.

Upon applying a DC voltage of 10 V to the EL device with the positive ITO electrode and the mixed negative metal electrode comprising magnesium and copper, a current with a current density of 120 mA/cm$^2$ was passed and an emission of a greenish blue light was obtained as in Example 18. The peak wavelength was at 486 nm, and the emission brightness was 100 cd/m$^2$.

These results reveal that, by accumulating the positive injection layer, and further the electron injection layer to the emitting layer, an emission of a greenish blue light was obtained with a higher brightness upon applying a lower voltage than in the case of a mono-layered type emitting layer compared with the results in Comparative Example 7 as will be described later.

COMPARATIVE EXAMPLE 5

A 25 mm×75 mm×1.1 mm large glass substrate provided with ITO (Indium-Tin-Oxide) by the vacuum evaporation process in a 50 nm thick film was used as the transparent substrate. The transparent substrate was attached to the substrate holder of a commercially available vacuum evaporation system (manufactured by ULVAC Co., Ltd.). Then, 100 mg of OMSB was placed in an electrically-heated boat made of molybdenum, and the pressure of the vacuum chamber was decreased to $5\times10^{-5}$ Pa. Furthermore, the boat was heated to 160° C. Under these conditions, OMSB was vacuum deposited at a rate of 1.0 nm/sec onto the transparent substrate to form a luminescent film 0.7 μm thick. In this vacuum deposition process, the substrate was at room temperature. The substrate was then taken out of the vacuum chamber, and a stainless steel mask was placed on the luminescent film, which was again attached to the substrate holder. Then, 200 mg of gold was placed in an electrically-heated boat and the pressure of the vacuum chamber was decreased to $1 \times 10^{-4}$ Pa. Then, the boat was heated to 1400° C., and a 50 nm thick gold electrode was formed as the opposite electrode on the luminescent thin film. The EL device was thus made.

Upon applying a DC voltage of 20 V to the EL device a current of 20 mA was passed and an emission of blue light was obtained. The maximum emission was observed at the wavelength of 450 nm, and the brightness was 80 cd/m².

COMPARATIVE EXAMPLE 6

A 25 mm×75 mm×1.1. mm large glass substrate provided with ITO by the vacuum evaporation process in a 50 nm thick film was used as the transparent substrate. The transparent substrate was attached to the substrate holder of a commercially available vacuum evaporation system (manufactured by ULVAC Co., Ltd.). Then, 200 mg of PMSB was placed in an electrically-heated boat made of molybdenum, and the pressure of the vacuum chamber was decreased to $1 \times 10^{-4}$ Pa. Furthermore the boat was heated to between 240° and 246° C. Under these conditions, PMSB was vacuum deposited at a rate of 0.5 to 1.0 nm/sec onto the transparent substrate to form a luminescent film 0.5 μm thick. In this vacuum evaporation process, the substrate was at room temperature. The substrate was then taken out of the vacuum chamber, and a stainless steel mask was placed on the luminescent film, which was again attached to a substrate holder. Then, 200 mg of gold was placed in an electrically-heated boat made of molybdenum and the pressure of the vacuum chamber was decreased to $2 \times 10^{-4}$ Pa. Then, the boat was heated to 1400° C., nd a 20 nm thick gold electrode was formed as the opposite electrode on the luminescent thin film.

Upon applying a DC voltage of 30 V to the EL device with the positive gold electrode and the negative ITO electrode a current of 20 mA was passed and emission of a greenish blue light was obtained. The emission range 440 to 560 nm, and the brightness was 60 cd/m².

COMPARATIVE EXAMPLE 7

A 25 mm×75 mm×1.1 mm large glass substrate provided with ITO by the vacuum evaporation process in a 50 nm thick film was used as the transparent substrate. The transparent substrate was attached to the substrate holder of a commercially available vacuum evaporation system (manufactured by ULVAC Co., Ltd.). Then 200 mg of ESB was placed in an electrically-heated boat made of molybdenum, and the pressure of the vacuum chamber was decreased to $1 \times 10^{-4}$ Pa. The boat was heated to 237° C. Under these conditions. ESB was vacuum deposited at a rate of 0.5 nm/sec onto the transparent substrate to form a luminescent film 0.5 μm thick. In this vacuum evaporation process, the substrate was at room temperature. The substrate was then taken out of the vacuum chamber, and a stainless steel mask was placed on the luminescent film, which was again attached to the substrate holder. Then, 200 mg of gold was placed in an electrically-heated boat made of molybdenum and the pressure of the vacuum chamber was decreased to $2 \times 10^{-4}$ Pa. Then, the boat was heated to 1400° C., and a 20 nm thick gold electrode was formed as the opposite electrode on the luminescent thin film.

Upon applying a DC voltage of 30 V to the EL device with the positive gold electrode and the negative ITO electrode a current of 1 mA was passed and an emission of greenish blue light was obtained. The maximum emission was observed at the wavelength of 480 nm, and the emission range was 440 to 600 nm. The brightness was 0.1 cd/m².

EXAMPLE 20-39

An EL device was made in the same manner as in Example 4 except that the emitting layer and the hole injection and transport layer (the hole injection layer) were constituted using the compounds listed in Table 1, and that the thickness of each layer was chosen as listed in Table 1. The performance of the EL device was evaluated by applying a planned voltage. The results are shown in Table 1.

EXAMPLE 40

An EL device was made in the same manner as in Example 15 except that the emitting layer and the hole injection and transport layer and the electron injection and transport layer were constituted using the compounds listed in Table 1. The performance of the EL device was evaluated by applying a planned voltage. The results are shown in Table 1.

TABLE 1

| | Emitting Layer | Hole Injection Layer | Thickness of Hole Injection Layer[nm] | Thickness of Emitting Layer [nm] | Applied voltage (V) | Current Density (mA/cm²) | Brightness (cd/m²) | Colour of Emitted Light | Luminescence Efficiency |
|---|---|---|---|---|---|---|---|---|---|
| Example 20 | formula 20 | TPDA | 60 | 60 | 17 V | 110 mA/cm² | 100 cd/m² | Whity green | |
| 21 | formula 21 | TPDA | 60 | 80 | 12 V | 70 mA/cm² | 20 cd/m² | Green | |
| 22 | formula 22 | TPDA | 60 | 60 | 12.5 V | 110 mA/cm² | 30 cd/m² | Yellowish green | |
| 23 | formula 23 | TPDA | 60 | 70 | 15 V | 100 mA/cm² | 200 cd/m² | Green | |
| 24 | formula 24 | TPDA | 60 | 60 | 20 V | 200 mA/cm² | 100 cd/m² | Green | |
| 25 | *1 | TPDA | 60 | 60 | 17 V | 100 mA/cm² | 40 cd/m² | Light blue | |
| 26 | *2 | TPDA | 60 | 60 | 20 V | 154 mA/cm² | 150 cd/m² | Greenish blue | |
| 27 | formula 27 | TPDA | 60 | 60 | 16 V | 161 mA/cm² | 170 cd/m² | Blue | |
| 28 | *3 | TPDA | 60 | 60 | 17 V | 100 mA/cm² | 40 cd/m² | Greenish blue | |
| Example 29 | *4 | TPDA | 60 | 60 | 12 V | 50 mA/cm² | 400 cd/m² | Blue | 0.2 lm/w |
| 30 | *4 | TPAC *10 | 60 | 60 | 20 V | 17 mA/cm² | 250 cd/m² | Blue | 0.23 lm/w |
| 31 | *5 | TPDA | 60 | 60 | 13 V | 200 mA/cm² | 45 cd/m² | Blue green | |

TABLE 1-continued

| | | | | | | | | | |
|---|---|---|---|---|---|---|---|---|---|
| 32 | *6 | TPDA | 60 | 80 | 20 V | 90 mA/cm$^2$ | 120 cd/m$^2$ | Blue green | |
| 33 | formula 33 | TPAC | 60 | 60 | 20 V | 70 mA/cm$^2$ | 62 cd/m$^2$ | Whity blue green | |
| 34 | formula 33 | TPDA | 60 | 60 | 19 V | 72 mA/cm$^2$ | 310 cd/m$^2$ | Light blue | 0.07 lm/w |
| 35 | formula 33 | TPDA' *11 | 60 | 60 | 17 V | 60 mA/cm$^2$ | 200 cd/m$^2$ | Purple | 0.06 lm/w |
| 36 | *7 | TPDA | 60 | 80 | 12.5 V | 60 mA/cm$^2$ | 230 cd/m$^2$ | Blue | 0.1 lm/w |
| 37 | *7 | TPDA'' | 60 | 60 | 15 V | 14 mA/cm$^2$ | 200 cd/m$^2$ | Blue | 0.3 lm/w |
| Example 38 | *8 | TPDA | 60 | 80 | 13 V | 32 mA/cm$^2$ | 180 cd/m$^2$ | Greenish blue | 0.14 lm/w |
| 39 | *9 | TPDA | 60 | 60 | 20 V | 160 mA/cm$^2$ | 140 cd/m$^2$ | Yellowish green | |
| 40 | formula 39 | TPDA | 60 | 60 | 15 V | 100 mA/cm$^2$ | 670 cd/m$^2$ | Greenish blue | 0.14 lm/w |

In Example 40, the electron injection and transport layer are composed of t-BuPBD*12.

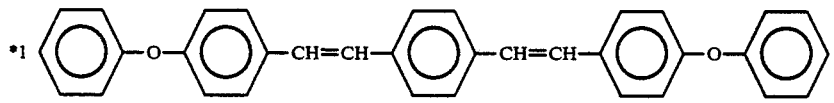

*1

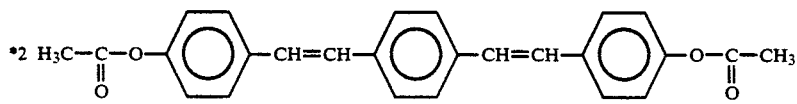

*2

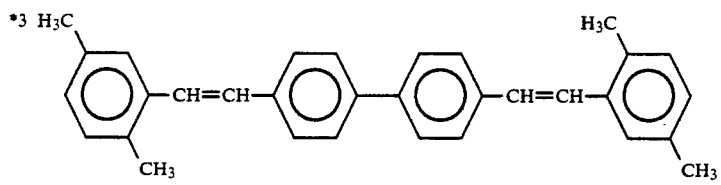

*3

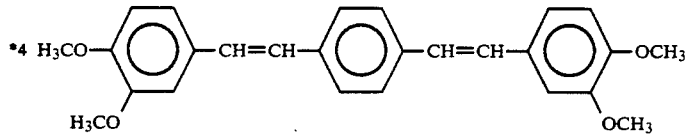

*4

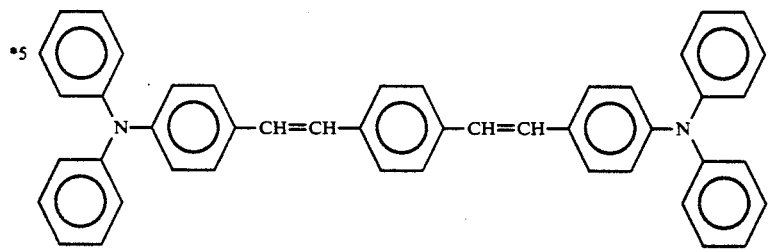

*5

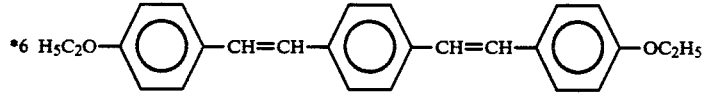

*6

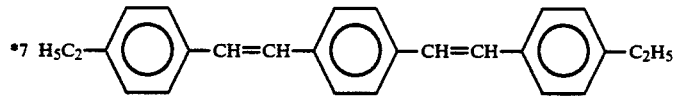

*7

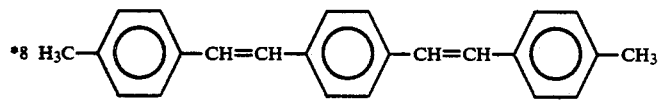

*8

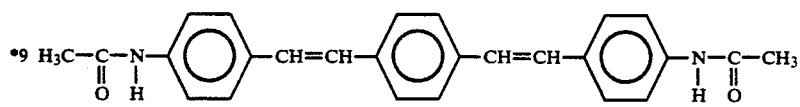

*9

TABLE 1-continued

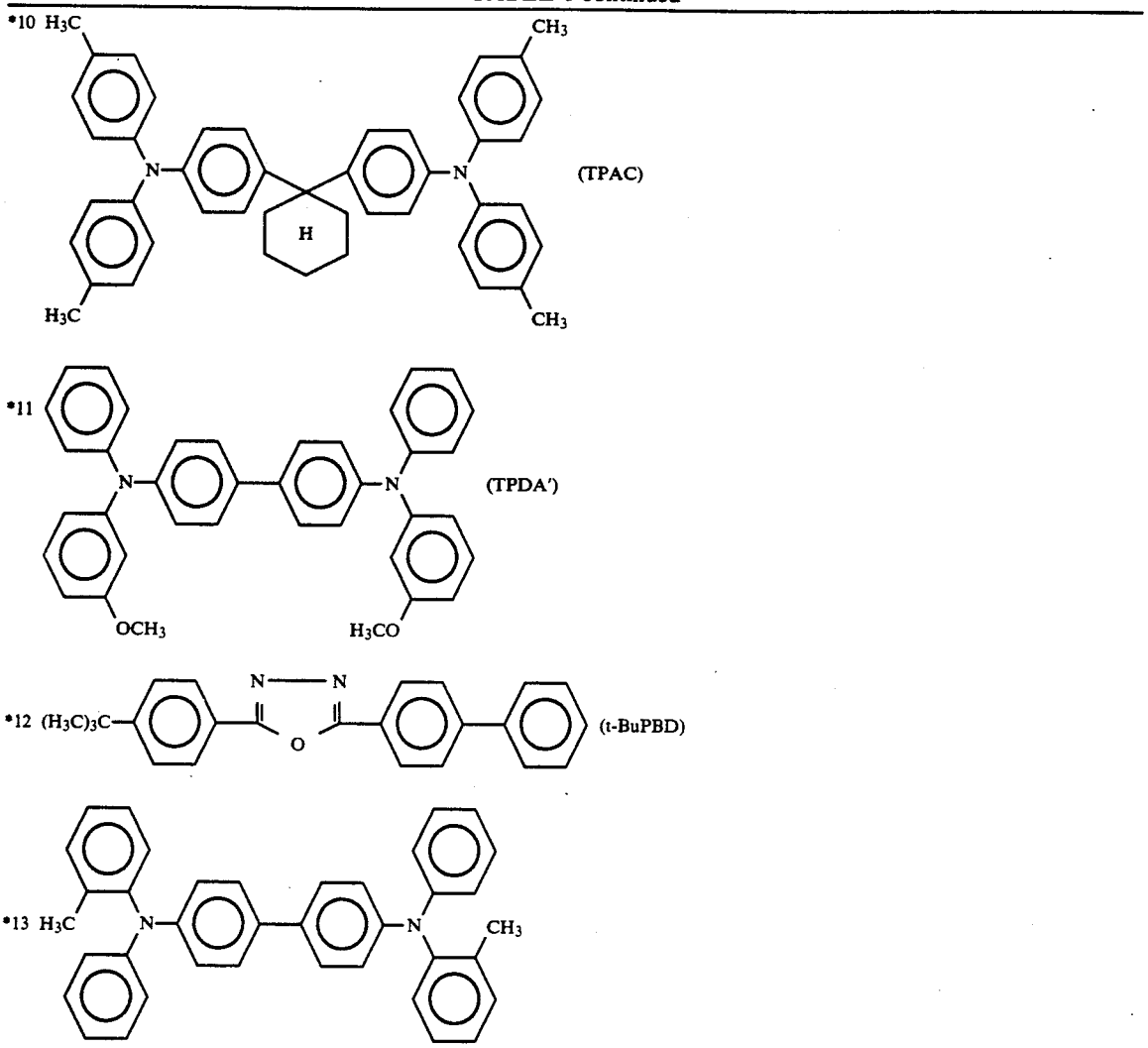

Organic compounds to be used as the emitting or luminous material in the present invention which are represented by the formula (I'), are commonly referred to as polyphenyl, polyene or stibene-based dyes. These compounds can be synthesized by the Witting method. Representative examples in which all of $R^1$, $R^2$ and $R^3$ are hydrogen atoms, among the compounds represented by general formula (I') are shown below.

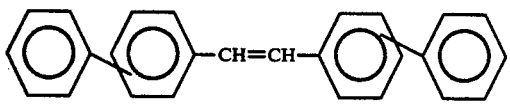

-continued

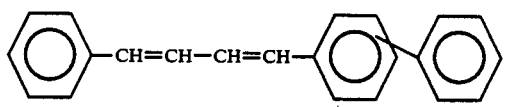

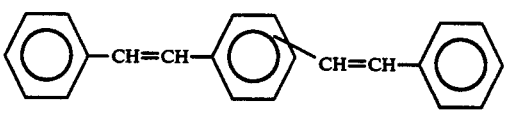

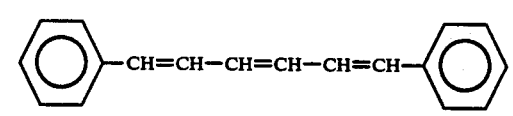

The phenylene group, i.e., a group represented by the formula:

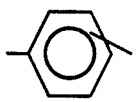

in the above formulae may be any of a p-phenylene group, a m-phenylene group and an o-phenylene group, and is preferably a p-phenylene group. Of the compounds represented by the general formula (I'), compounds with a stilbene ring are preferred. Particularly preferred are trans-4,4'-diphenylstilbene and 1,4-distyryl-benzene.

When $R^{1\prime}$ and $R^{2\prime}$ of general formula (I') are alkyl groups having 1 to 4 carbon atoms (which may be hydrogen atoms), 1,4-bis(alkylstyryl)benzene derivatives represented by the general formula (I'):

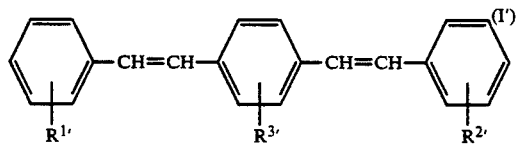

are preferred. $R^{1\prime}$ and $R^{2\prime}$ in the above general formula (I') may be identical or different and are each an alkyl group having 1 to 4 carbon atoms, e.g., a methyl group, an ethyl group, a n-propyl group, an i-propyl group, a n-butyl group, an i-butyl group, a sec-butyl group and a tert-butyl group, or may be hydrogen atoms. $R^{3\prime}$ is a hydrogen atom or an alkyl group having 1 to 4 carbon atoms. Representative examples of the 1,4-bis(alkylstyryl)benzene derivatives represented by the general formula (I') are 1,4-bis(2-methylstyryl)benzene, 1,4-bis(3-methylstyryl)benzene, 1,4-bis(4-methylstyryl)benzene, distyrylbenzene, 1,4-bis(2-ethylstyryl)benzene, 1,4-bis(3-ethylstyryl)benzene, 1,4-bis(2-methylstyryl)-2-methylbenzene, and 1,4-bis(2-methylstyryl)-2-ethylbenzene. Of these compounds, 1,4-bis(2-methylstyryl)benzene having the formula:

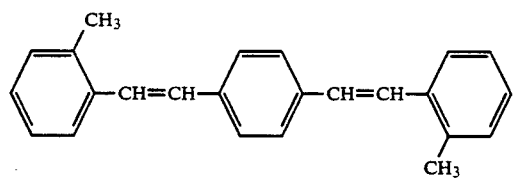

is particularly preferred.

In the present invention, an emitting material comprising the organic compound of general formula (I') is usually used in a form of thin film. The thickness of the film is not critical and can be determined appropriately. The thickness of the film is usually 10 nm to 5 μm, preferably 0.01 to 2.0 μm.

The thin film of the compound represented by general formula (I') can be formed by techniques such as spin coating, vacuum deposition, casting and the LB method. The vacuum deposition method is most preferably in that a film with good uniformity can be obtained and pinholes are less likely to be formed in the film.

Conditions under which the thin film of a compound represented by general formula (I') is formed by the vacuum deposition method vary depending on circumstances and cannot be determined unconditionally. In a preferred embodiment of the present invention, temperature for heating the boat is 100° to 400° C., the substrate temperature is −50° to 300° C., the pressure is $1 \times 10^{-5}$ to $1 \times 10^{-2}$ Pa, and the deposition rate is 0.01 to 50 nm/sec, and taking into consideration the type of compound of general formula (I'), the type of the vacuum deposition system and so forth, optimum conditions are chosen so that the film thickness is within the range of 10 nm to 5 μm.

In the EL element and the method of the present invention, the organic compound can be used in various forms as the emitting material. Preferably the organic compound is used in such a manner that its thin film is sandwiched between two electrodes, at least one of which is transparent or semitransparent.

An organic electroluminescence element (EL element) using a compound of general formula (I') is formed, for example, as shown in the Figure. That is, an electrode 2 in a thin film form of metal, e.g., gold, aluminum, indium, or magnesium, indium tin oxide (indium oxide doped with tin oxide; ITO), tin oxide ($SnO_2$), zinc oxide (ZnO), copper iodide (CuI) and the like is prepared in a thickness of 10 to 1,000 nm, for example, by the sputtering method, on a supporting substrate 1 made of glass, plastics or quartz. Particularly when the thin film is intended to be transparent or semitransparent, it is formed in a thickness of 10 to 50 nm in order to ensure its transparency. Then an emitting material 3 of a compound of general formula (I') is formed in a thin film form. An electrode 4 is formed on the emitting material 3, so that the emitting material 3 is sandwiched between electrode 2 on supporting substrate 1 and electrode 4. It is preferred that at least one of the electrodes 2 and 4 be transparent or semitransparent so as to allow light to pass therethrough. When electrode 2 is transparent or semitransparent, the supporting substrate 1 should also be transparent or semitransparent.

Electrodes 2 and 4 are each connected to an electric power supply 5, e.g., an electric power supply of 10 to 70 V DC or AC. When a direct current (DC) is to be applied, the positive electrode is connected to a metal or semiconductor with a high work function, e.g., Au, Ni, Pt, $SnO_2$ or CuI, and the negative electrode, to a metal or semiconductor with a low work function, e.g., In, Al, Mg or ITO.

Upon application of voltage from the electric source, the emitting material 3 of the compound of general formula (I') emits blue or green light.

The supporting substrate and the electrode can be formed by usual methods using various materials.

In the present invention, as described above, an organic EL element is produced using a compound of general formula (I') as an emitting material. A high brightness can be obtained by only application of a low voltage. The element is in such a simplified structure that comprises a substrate/an electrode/an emitting body (luminescent film)/an electrode and if necessary, other element, and thus can be easily produced. The emitting body is less subjected to damage because its material is excellent in heat resistance. Moreover, since the film thickness of the emitting body can be made relatively thick, deficiencies such as pinholes and the like can be avoided and thus productivity is increased. The present invention, therefore, provides an EL element for various displays such as for industrial information and cars, which are inexpensive and of high quality.

EXAMPLE 1'

Indium tin oxide (ITO) was provided on a 25 mm × 75 mm × 1.1 mm glass substrate in a 50 nm thick film form by the sputtering method to obtain a transparent substrate. This transparent substrate was attached to a substrate holder of a commercially available vacuum deposition system (manufactured by ULVAC Co., Ltd.), and 100 mg of 1,4-bis(2-methylstyryl)-benzene was placed in an electrically-heated boat made of molybdenum. The pressure in the vacuum chamber was decreased to $5 \times 10^{-5}$ Pa and the boat was heated to 160° C. Under these conditions, 1,4-bis(2-methylstyryl)benzene was vapor deposited (vacuum deposited) on the transparent substrate at a deposition rate of 1.0 nm/sec to obtain a luminescent film of 0.7 μm in thickness. In this vacuum deposition process, the substrate was at room temperature.

The substrate was taken out of the vacuum chamber. A stainless steel mask was placed on the luminescent film of the substrate, which was then attached to the substrate holder. In the electrically-heated boat made of molybdenum, 200 mg of gold was placed, and the pressure in the vacuum chamber was decreased to $1 \times 10^{-4}$ Pa. Then, the boat was heated to 1,400° C., and finally a 50 nm thick gold electrode was formed on the luminescent film to produce an organic luminescence element (EL element) in the form shown in the Figure.

Upon application of a DC voltage of 20 V to the EL element, a current of 2.0 mA was passed and blue light was emitted. The maximum emission of the blue light was observed at the wavelength of 450 nm, and the brightness as 80 cd/m².

EXAMPLE 2'

ITO was provided on a 25 mm × 75 mm × 1.1 mm glass substrate in a 50 nm thick film form by the vacuum deposition method to obtain a transparent substrate. This transparent substrate was attached to a substrate holder of a commercially available vacuum deposition system (manufactured by ULVAC Co., Ltd.), and 200 mg to 300 mg of trans-4,4'-diphenylstilbene prepared according to the method described in J. Org. Chem. 24, 1246 (1959) was placed in an electrically-heated boat made of molybdenum. The pressure in the vacuum chamber was decreased to $1 \times 10^{-4}$ Pa and the boat was heated to 220° C. to 240° C. Under these conditions, trans-4-4'-diphenystilbene was vacuum deposited on the transparent substrate at a deposition rate of 2.0 nm/sec to obtain a luminescent film of 0.9 μm in thickness. In this vacuum deposition process, the substrate was at room temperature.

The substrate was taken out of the vacuum chamber. A stainless steel mask was placed on the luminescent film of the substrate, which was then attached to the substrate holder. In the electrically-heated boat, 200 mg of gold was placed, and the pressure in the vacuum chamber was decreased to $2 \times 10^{-4}$ Pa. Then, the boat was heated to 1400° C. and a 50 nm thick gold electrode was formed on the luminescent film to make a counter electrode.

Since the sublimation temperature (Sublimation temperature under a pressure of $2 \times 10^{-4}$ Pa. The same shall apply hereinafter.) and the melting point (Melting point under atmospheric pressure. The same shall apply hereinafter.) of trans-4,4'-diphenylstilbene were 220° C. or higher, the luminescent film sustained no damage at the forming of the counter electrode. Accordingly, EL element was produced in a high yield.

Upon application of a DC voltage of 40 V to the EL element, with the gold electrode as the anode and ITO electrode as the cathode, a current of 3.1 mA was passed and pale blue light was emitted. The maximum emission of the pale blue light was observed at the wavelength of 465 nm, and the brightness was 75 cd/m².

EXAMPLE 3'

EL element was produced in the same manner as in Example 2 except that 1,4-distyryl-benzene prepared according to the method described in J. Org. Chem. 24, 1246 (1959) was used as the starting material for the luminescent film, that the temperature of the boat was 240° C. to 260° C., and that a luminescent film of 0.7 μm in thickness was produced.

The melting point of 1,4-distyryl-benzene was 268° C. to 269° C., and its sublimation temperature was not lower than 240° C., so the luminescent film sustained no damage at the forming of the counter electrode, and EL element was produced in a high yield.

When a DC voltage of 20 V was applied to the EL element in the same as in Example 2, a current of 10 mA was passed and purplish blue light was emitted. The maximum emission of the purplish blue was observed at the wavelength of 420 nm, and the brightness was 80 cd/m².

EXAMPLE 4'

EL element was produced in the same manner as in Example 2 except that 1,6-diphenylhexatriene obtained by purifying a commercially available one (produced by Aldrich Chemical Company, inc.) to be 99.5% or higher in purity was used as the starting material for the luminescent film, that the temperature of the boat was 180° C. to 190° C., and that a luminescent film of 1.3 μm in thickness was produced.

The melting point of 1,6-diphenylhexatriene was 199° C. to 203° C., and its sublimation temperature was not lower than 180° C. Accordingly, the luminescent film sustained no damage at the forming of the counter electrode, and EL element was produced in a high yield.

When an AC voltage of 45 V was applied to the EL element, a current of 0.29 mA was passed and greenish blue light was emitted. The maximum emission of the greenish blue light was observed at the wavelength of 447 nm, and the brightness was 1.0 cd/m².

EXAMPLE 5'

ITO was provided on a 25 mm × 75 mm × 1.1 mm glass substrate in a 50 nm thick film form by the vacuum deposition method to obtain a transparent substrate. This transparent substrate was attached to a substrate holder of a commercially available vacuum deposition system (manufactured by ULVAC Co., Ltd.), and 200 mg of 1,4-bis(4-methylstyrtyl)-benzene was placed in an electrically-heated boat made of molybdenum. The pressure in the vacuum chamber was decreased to $1 \times 10^{-4}$ Pa and the boat was heated to 240° C. to 246° C. Under these conditions, 1,4-bis(4-methyl-styryl)benzene was vacuum deposited on the transparent substrate at a deposition rate of 0.5 to 1.0 nm/sec to obtain a luminescent film of 0.5 μm in thickness. In this vacuum deposition process, the substrate was at room temperature.

The substrate was taken out of the vacuum chamber. A stainless steel mask was placed on the luminescent film of the substrate, which was then attached to the substrate holder. In the electrically-heated boat, 200 mg of gold was placed, and the pressure in the vacuum chamber was decreased to $2 \times 10^{-4}$ Pa. Then, the boat was heated to 1400° C., and a 20 nm thick gold electrode was formed on the luminescent film to make a counter electrode.

Upon application of a DC voltage of 30 V to the EL element, with the gold electrode as the anode and ITO electrode as the cathode, a current of 20 mA was passed and blue green light was emitted. The maximum emission of the blue green light was observed at the wavelength of 490 nm, the wavelength range emitted by the EL element was 440 to 560 nm, and the brightness was 60 cd/m$^2$.

EXAMPLE 6'

ITO was provided on a 25 mm×75 mm×1.1 mm glass substrate in a 50 nm thick film form by the vacuum deposition method to obtain a transparent substrate. This transparent substrate was attached to a substrate holder of a commercially available vacuum deposition system (manufactured by ULVAC Co., Ltd.), and 200 mg of 1,4-bis(4-ethylstyryl)benzene was placed in an electrically-heated boat made of molybdenum. The pressure in the vacuum chamber was decreased to $1 \times 10^{-4}$ Pa and the boat was heated to 237° C. Under these conditions, 1,4-bis(4-ethylstyryl)benzene was vacuum deposited on the transparent substrate at a deposition rate of 0.5 nm/sec to obtain a luminescent film of 0.5 μm in thickness. In this vacuum deposition process, the substrate was at room temperature.

The substrate was taken out of the vacuum chamber. A stainless steel mask was placed on the luminescent film of the substrate, which was then attached to the substrate holder. In the electrically-heated boat, 200 mg of gold was placed, and the pressure in the vacuum chamber was decreased to $2 \times 10^{-4}$ Pa. Then, the boat was heated to 1400° C., and a 20 nm thick gold electrode was formed on the luminescent film to make a counter electrode.

Upon application of a DC voltage of 30 V to the EL element, with the gold electrode as the anode and ITO electrode as the cathode, a current of 1 mA was passed and blue green light was emitted. The maximum emission of the blue green light was observed at the wavelength of 480 nm, the wavelength range emitted by the EL element was 440 to 600 nm, and the brightness was 0.1 cd/m$^2$.

EXAMPLE 7'

ITO was provided on a 25 mm×75 mm×1.1 mm glass substrate in a 50 nm thick film form by the vacuum deposition method to obtain a transparent substrate. This transparent substrate was attached to a substrate holder of a commercially available vacuum deposition system (manufactured by ULVAC Co., Ltd.), and 200 mg of trans-4,4'-diphenylstilbene was placed in an electrically-heated boat made of molybdenum. The pressure int he vacuum chamber was decreased to $1 \times 10^{-4}$ Pa and the boat was heated to 230° C. to 245° C. Under these conditions, trans-4,4'-diphenylstilbene was vacuum deposited on the transparent substrate at a deposition rate of 1.0 to 2.0 nm/sec to obtain a luminescent film of 0.5 μm in thickness. In this vacuum deposition process, the temperature of the substrate was 40° C.

The substrate was taken out of the vacuum chamber. A stainless steel mask was placed on the luminescent film of the substrate, which was then attached to the substrate holder. In the electrically-heated boat, 200 mg of gold was placed, and the pressure in the vacuum chamber was decreased to $2 \times 10^{-4}$ Pa. Then, the boat was heated to 1400° C., and a 20 nm thick gold electrode was formed on the luminescent film to make a counter electrode.

Upon application of a DC voltage of 23 V to the EL element, with the gold electrode as the anode and ITO electrode as the cathode, a current of 8 mA was passed and blue light was emitted. The maximum emission of the blue light was observed at the wavelength of 465 nm, the wavelength range emitted by the EL element was 430 to 550 nm, and the brightness was 80 cd/m$^2$.

What is claimed is:

1. An electroluminescence device comprising an emitting layer and at least either a hole injection and a transport layer or an electron injection and a transport layer, said layers being disposed between two electrodes, at least one of said electrodes is transparent or semitransparent, an emitting material forming said emitting layer comprising at least one organic compound selected from the group consisting of

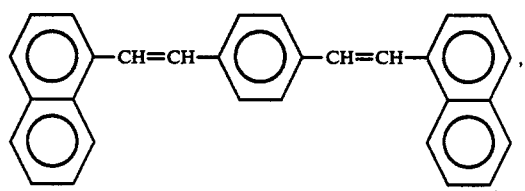

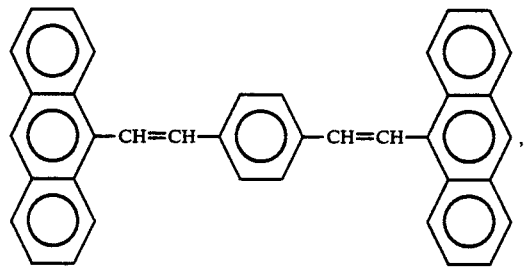

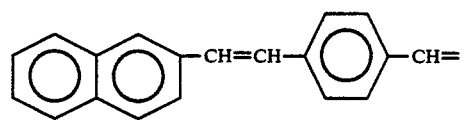

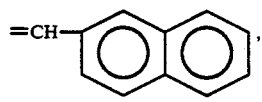

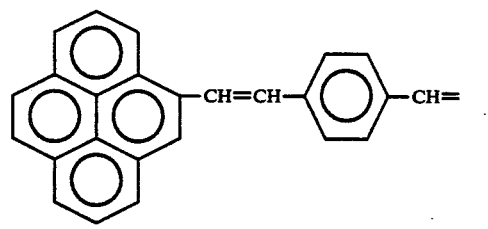

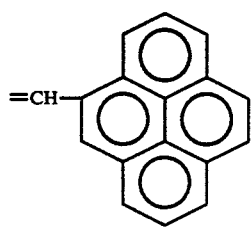

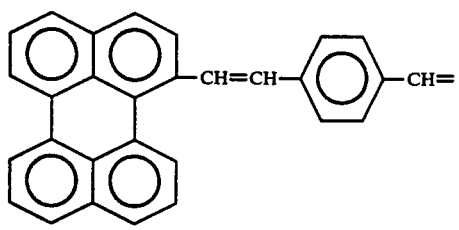
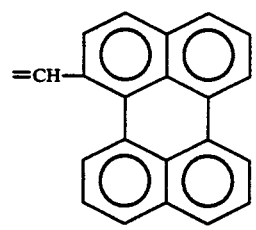
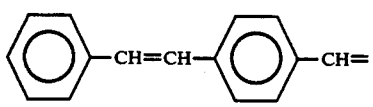
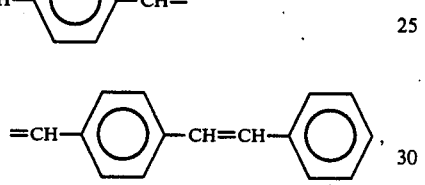
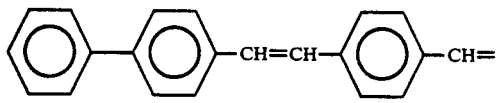
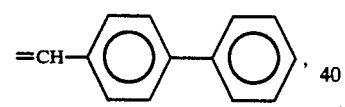
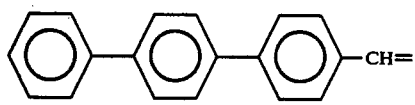
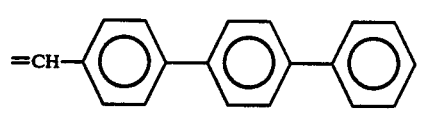
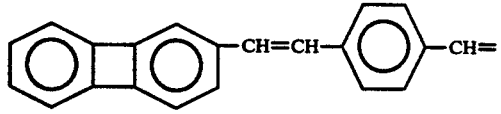
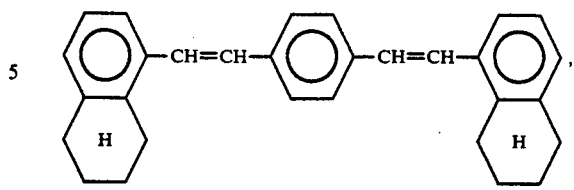
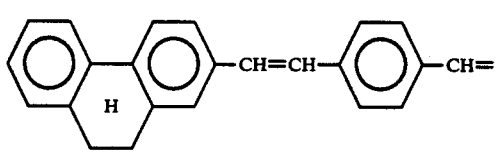
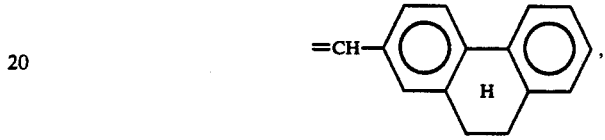
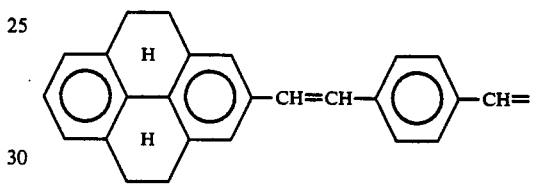
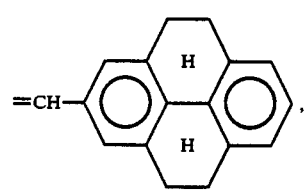
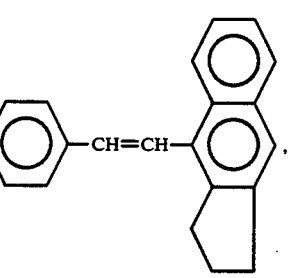
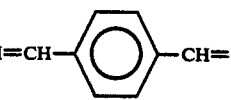
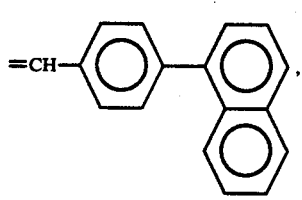

-continued
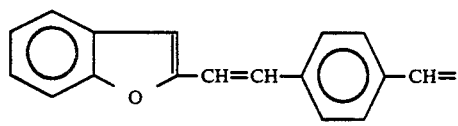
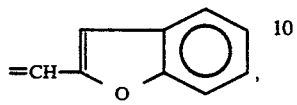
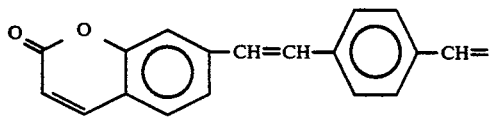
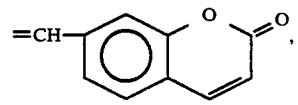
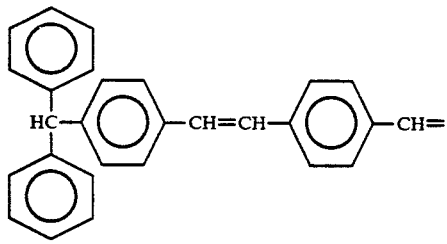
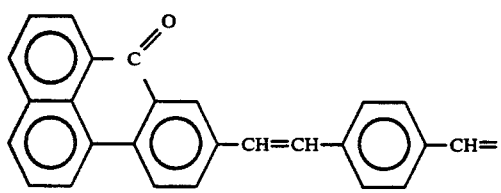
-continued
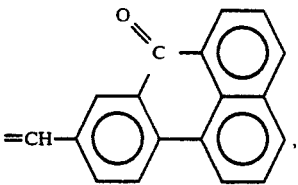
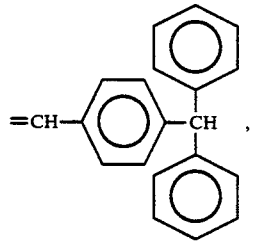
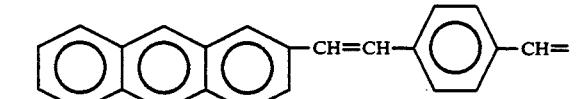
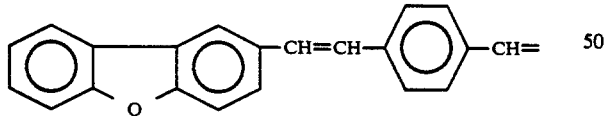
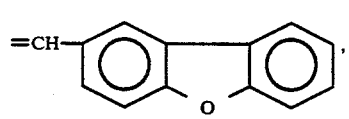
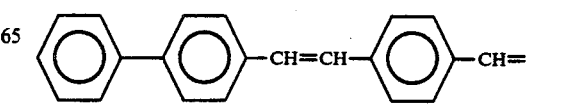

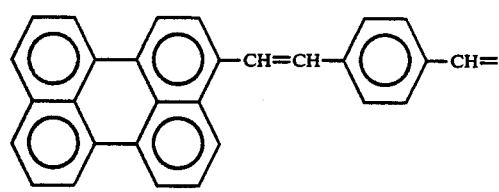

-continued

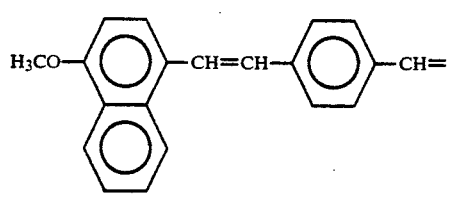

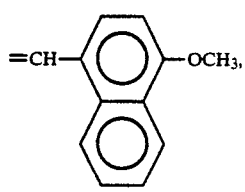

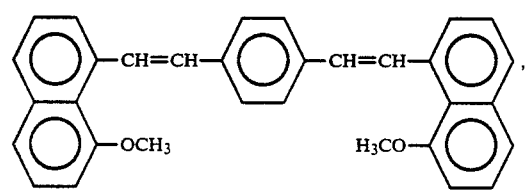

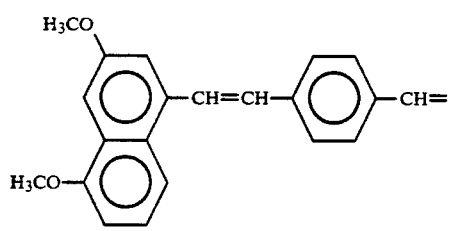

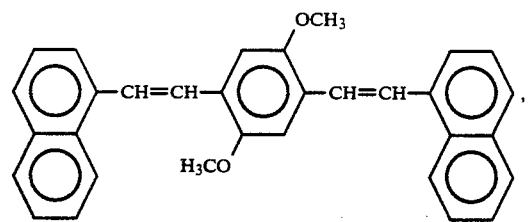

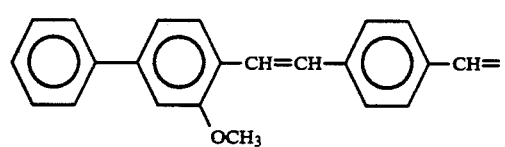

-continued

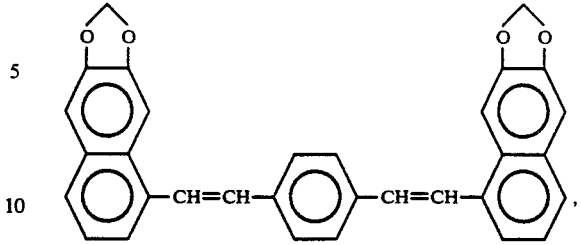

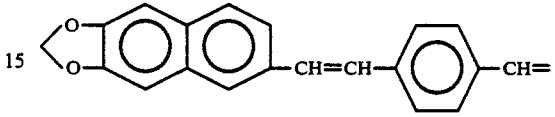

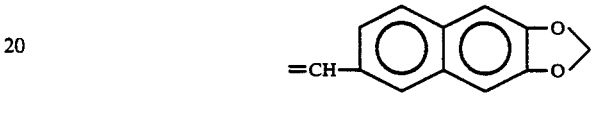

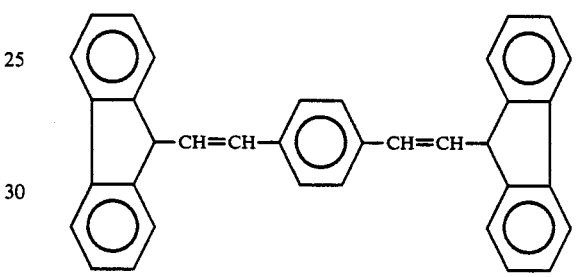

and

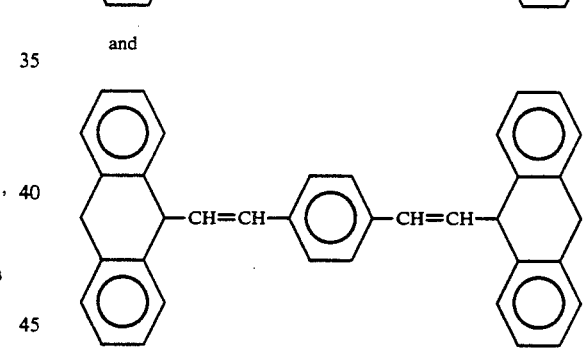

2. An electroluminescence device comprising an emitting layer and at least either a hole injection and a transport layer or an electron injection and a transport layer, said layers being disposed between two electrodes, at least one of said electrodes is transparent or semitransparent, an emitting material forming said emitting layer comprising at least one organic compound selected from the group consisting of

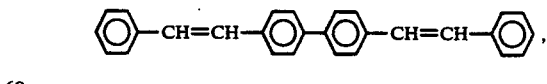

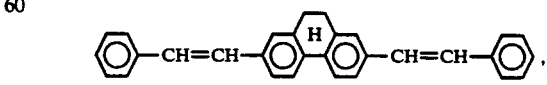

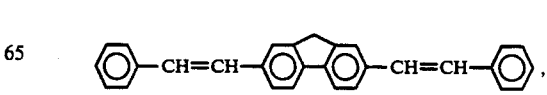

-continued

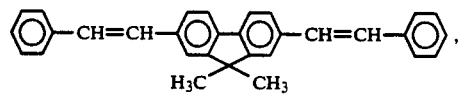

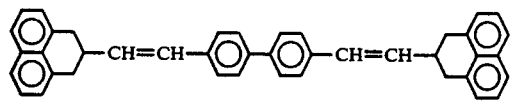

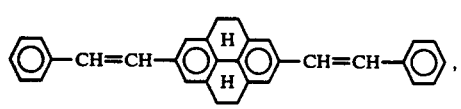

-continued and

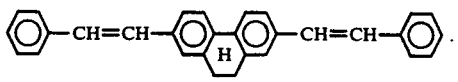

3. An electroluminescence device comprising an emitting layer and at least either a hole injection and a transport layer or an electron injection and a transport layer, said layers being disposed between two electrodes, at least one of said electrodes is transparent or semitransparent, an emitting material forming said emitting layer comprising at least one organic compound selected from the group consisting of

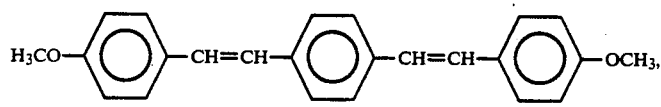

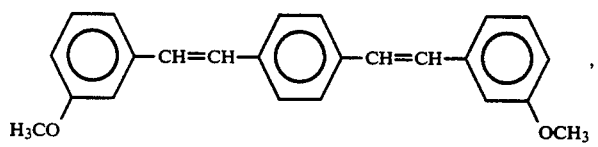

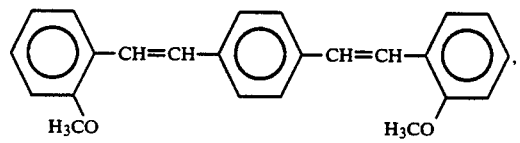

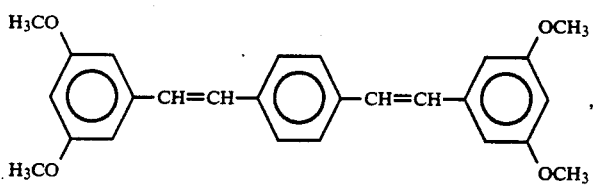

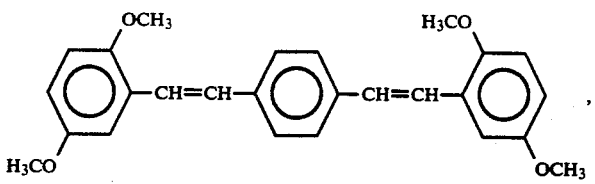

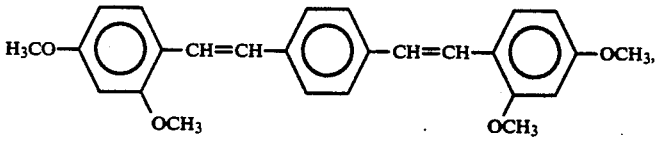

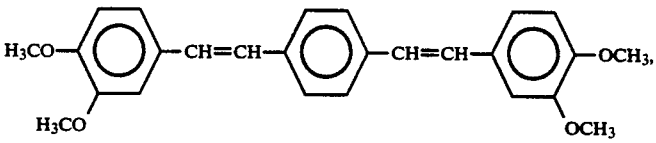

-continued
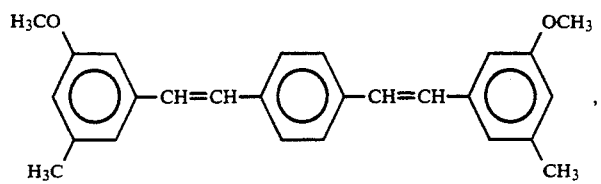
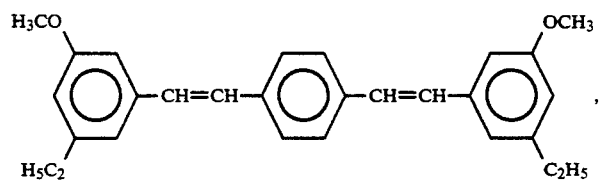
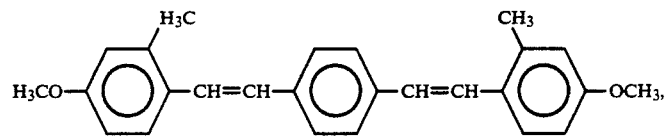
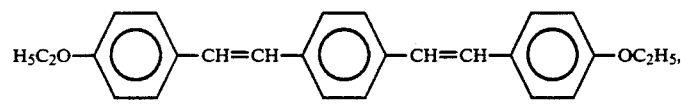
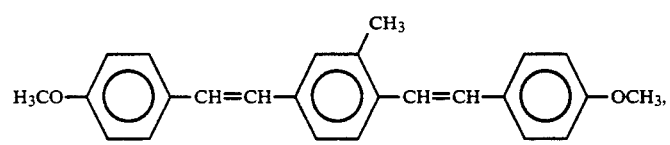
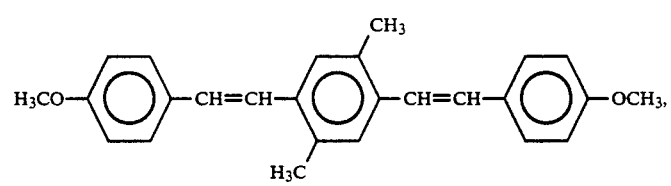
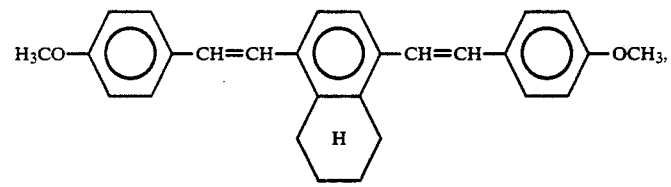
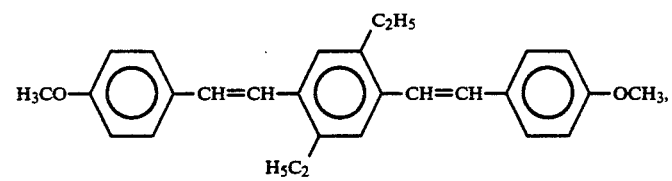
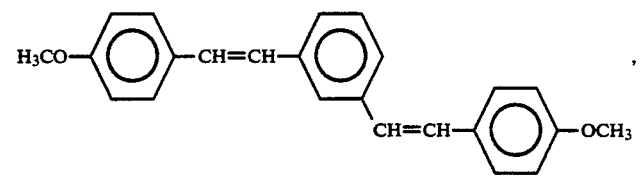

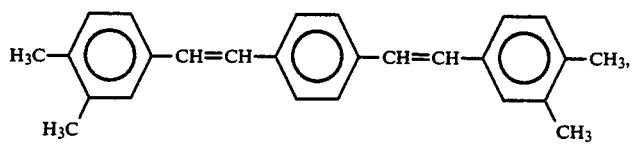
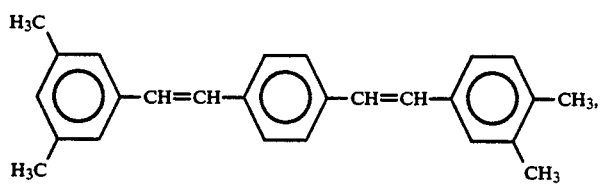
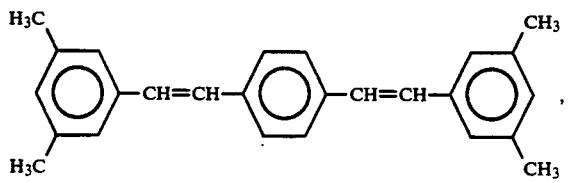
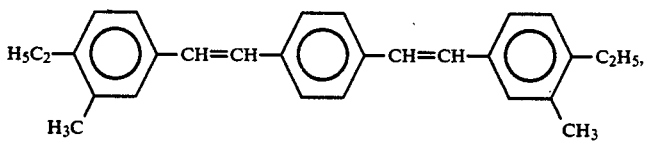
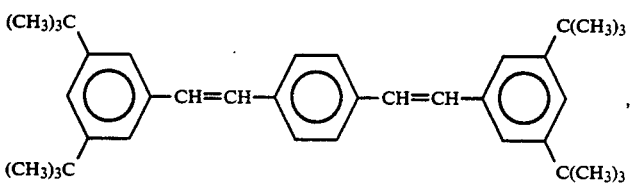
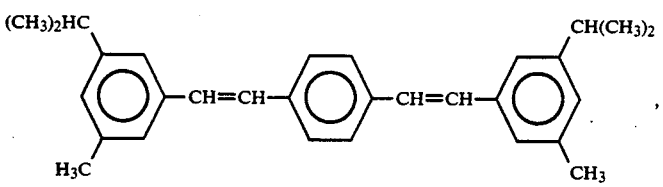
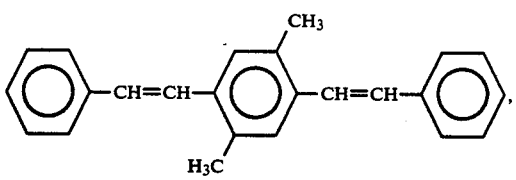
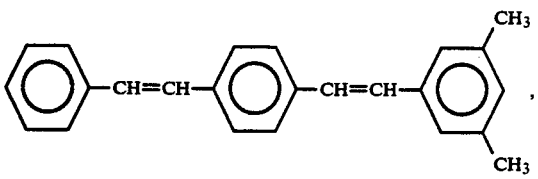
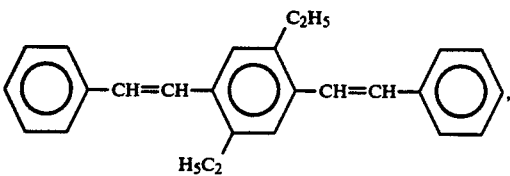

-continued
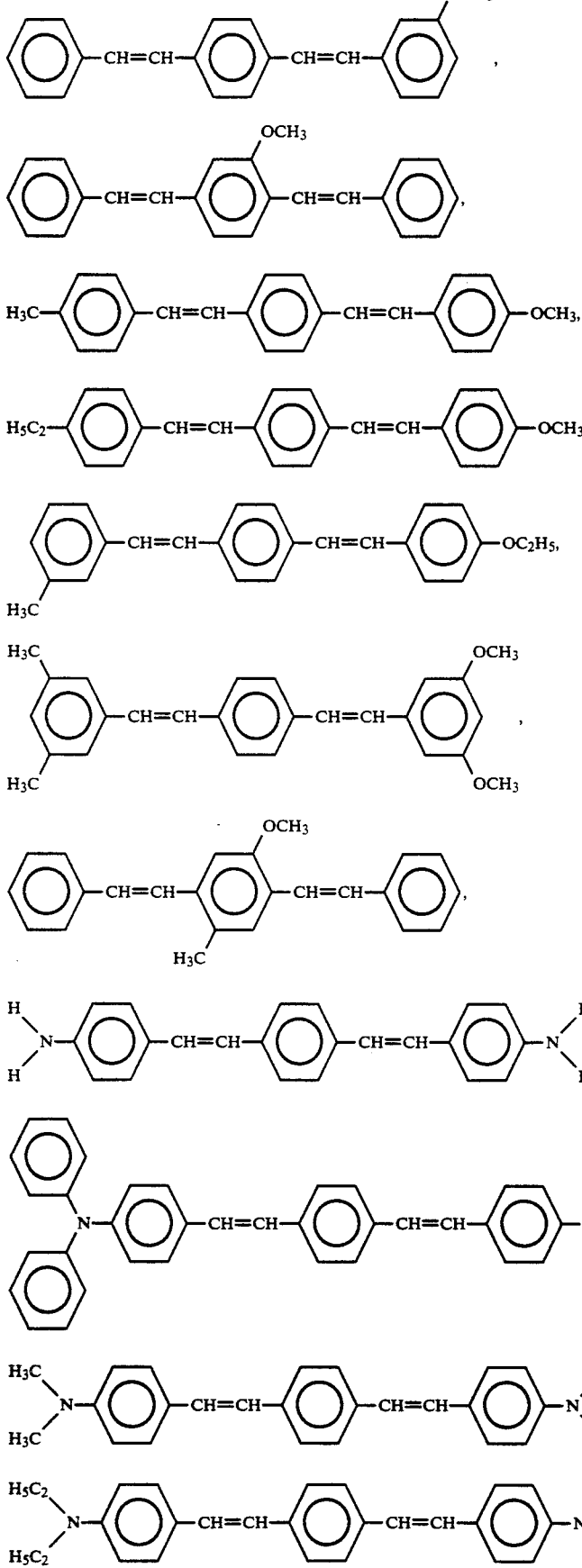

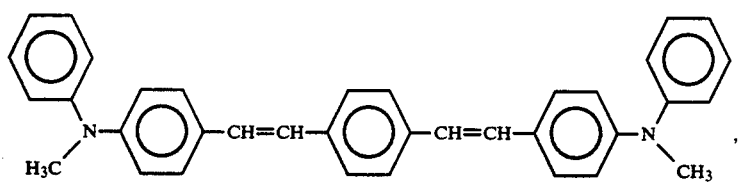
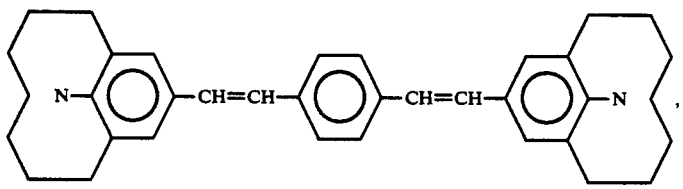
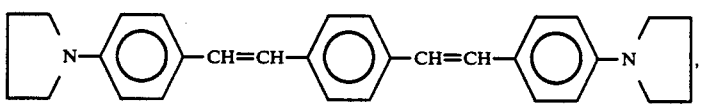
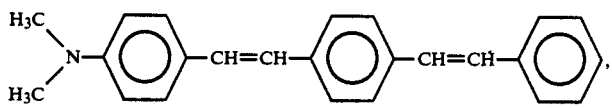
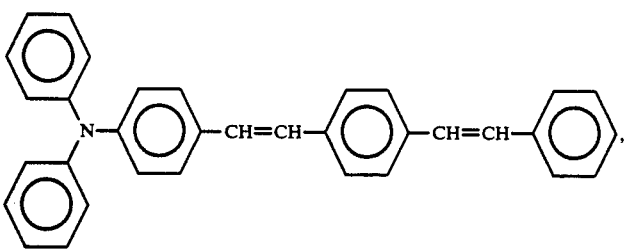
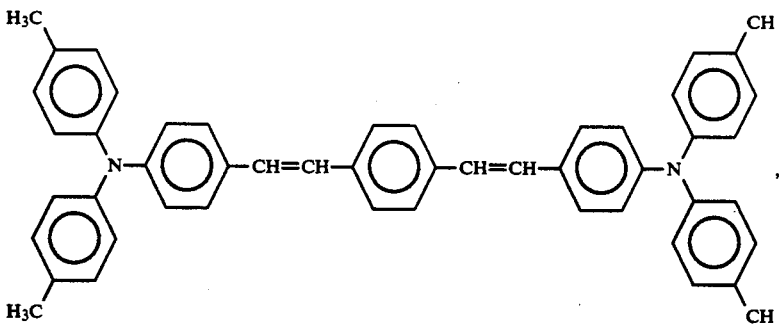
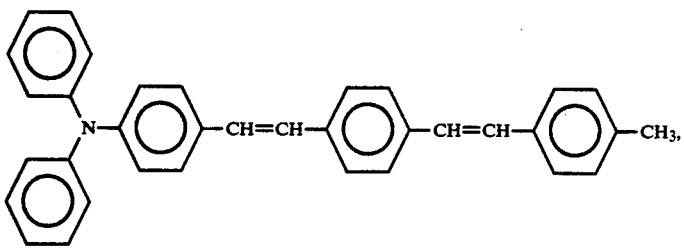

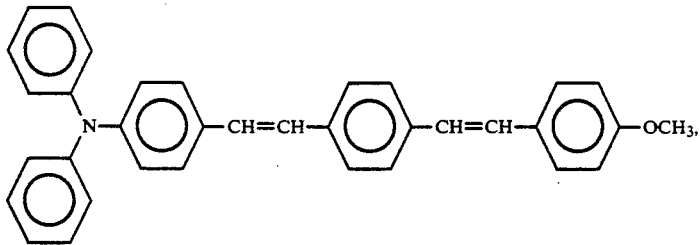

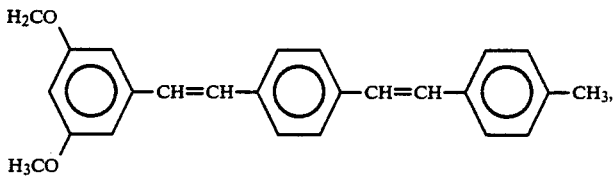

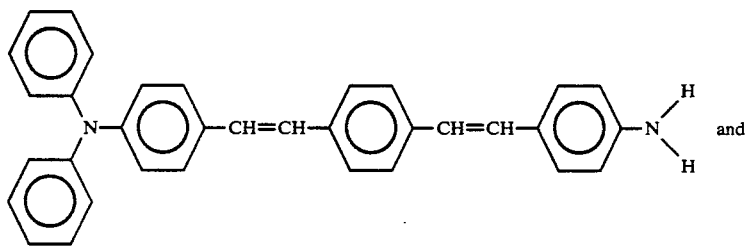

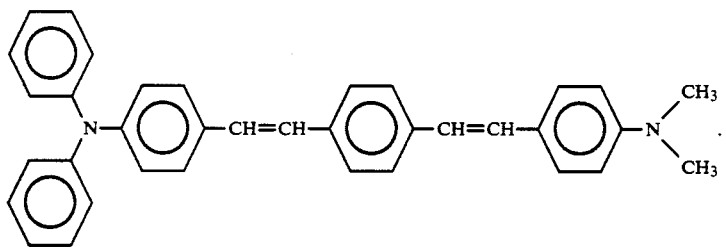

4. An electroluminescence device comprising an emitting layer and at least either a hole injection and a transport layer or an electron injection and a transport layer, said layers being disposed between two electrodes, at least one of said electrodes is transparent or semitransparent, an emitting material forming said emitting layer comprising at least one organic compound selected from the group consisting of

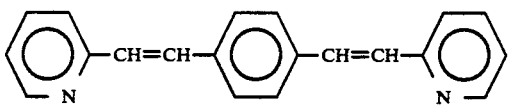

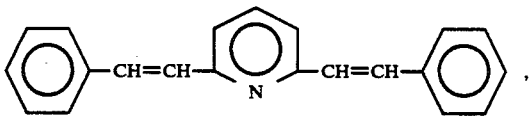

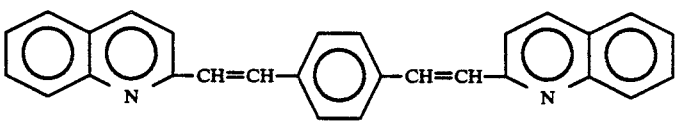

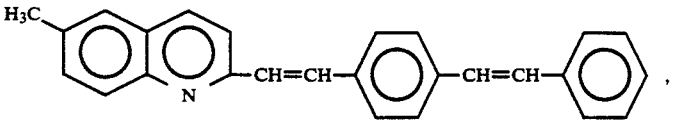

-continued
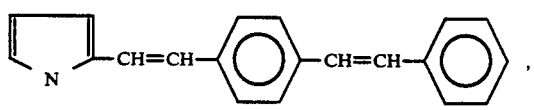,
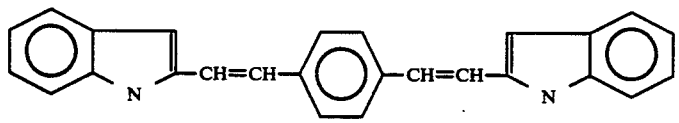,
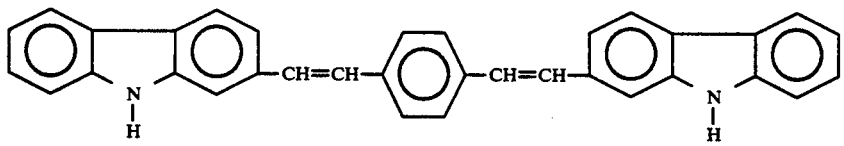,
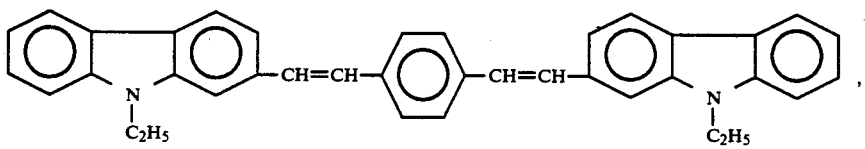,
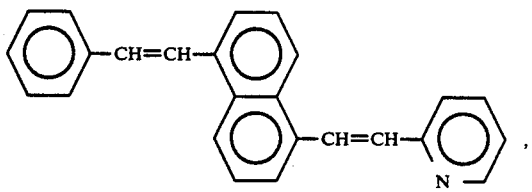,
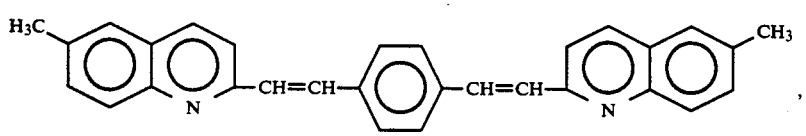,
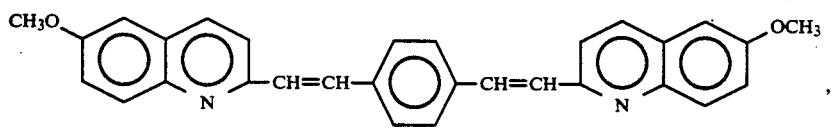,
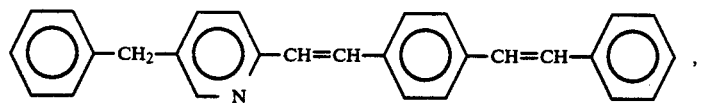,
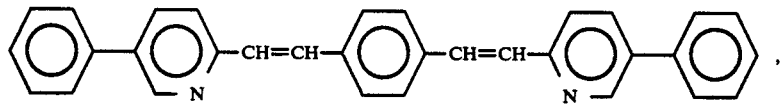,
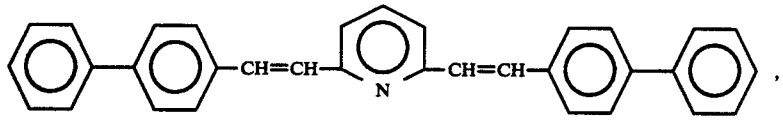,
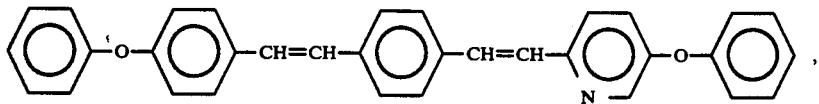,

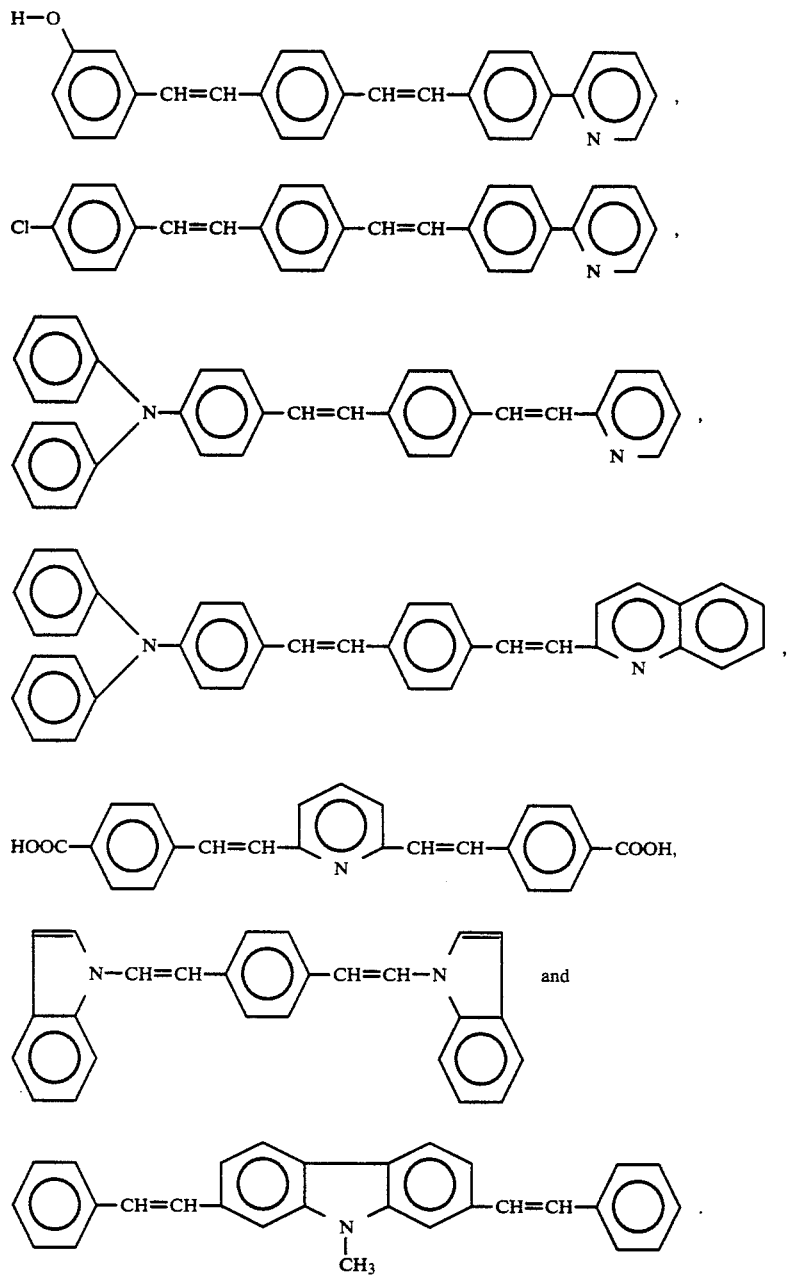

5. An electroluminescence device comprising an emitting layer and at least either a hole injection and a transport layer or an electron injection and a transport layer, said layers being disposed between two electrodes, at least one of said electrodes is transparent or semitransparent, an emitting material forming said emitting layer comprising at least one organic compound selected from the group consisting of

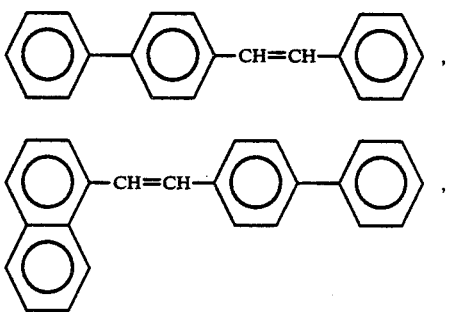

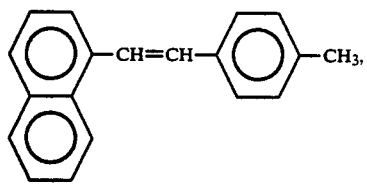
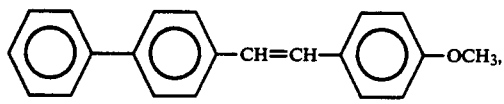
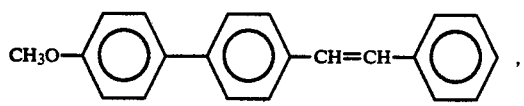
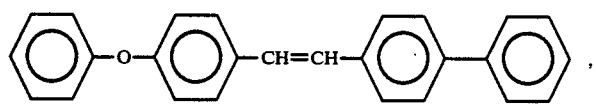
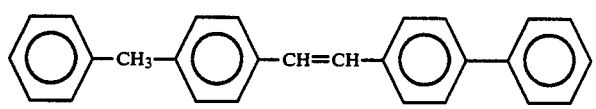
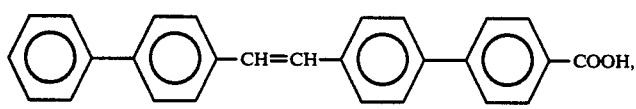
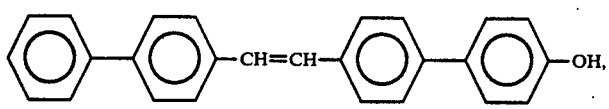
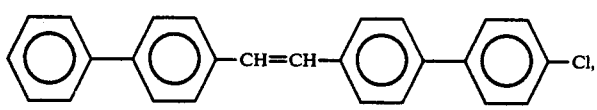
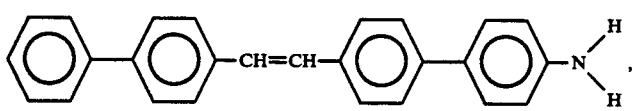
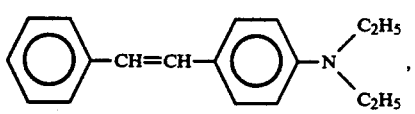
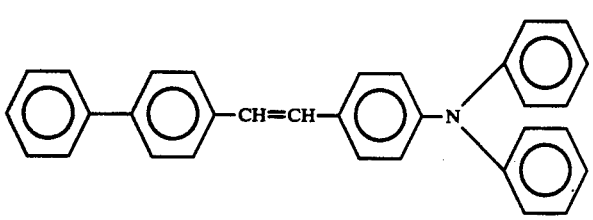

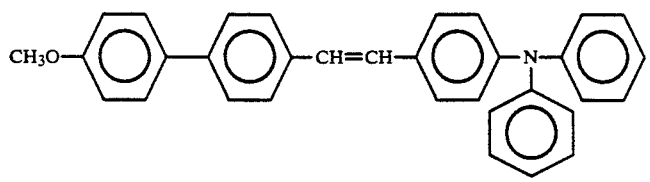
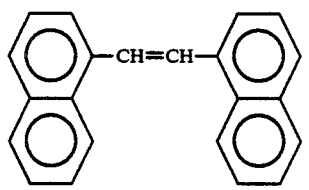
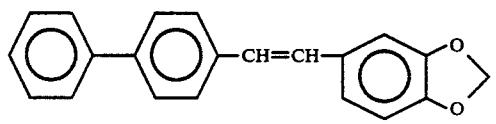
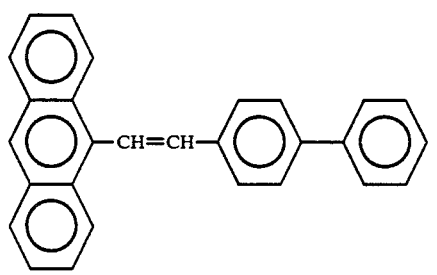
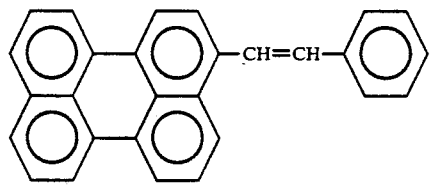
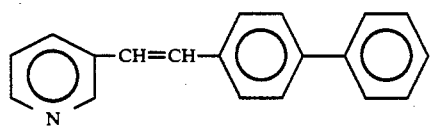
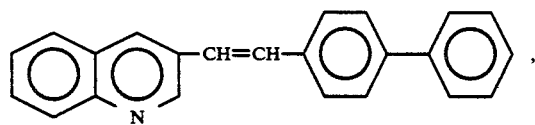
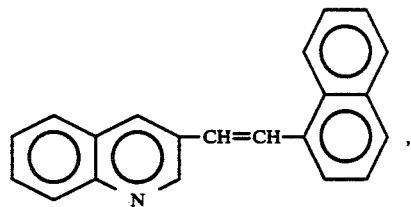
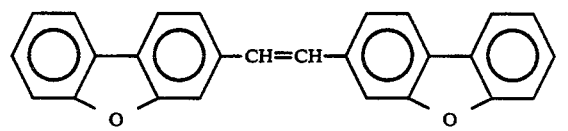

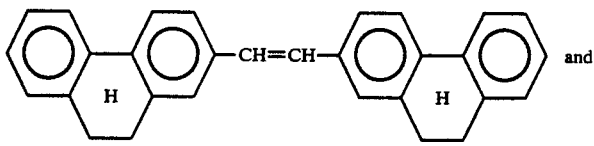

and

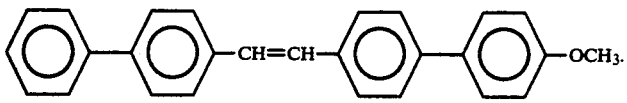

6. An organic electroluminescence element comprising an emitting layer and at least either a hole injection and a transport layer or an electron injection and a transport layer, said layers being disposed between two electrodes, an emitting material forming said emitting layer comprising an organic compound represented by the formula (I) or (II):

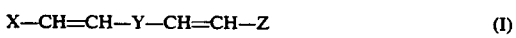 (I)

 (II)

wherein X is selected from the group consisting of naphthyl, anthranyl, pyrenyl, perylenyl, biphenyl, methoxy-biphenyl, terphenyl, methoxy-substituted phenyl, ethoxy-substituted phenyl, amino-substituted phenyl, diphenylamino-substituted phenyl, ditolylamino-substituted phenyl, dimethylamino-substituted phenyl, methylethylamino-substituted phenyl, diethylamino-substituted phenyl, phenoxy-substituted phenyl, styryl phenyl, methyl-substituted naphthyl, methoxy-substituted naphthyl, styryl biphenyl, fluorenyl, pyridyl, quinolyl, pyrrolyl, carbazolyl, N-methyl carbazolyl, N-ethyl carbazolyl, metyl-substituted quinolyl, methoxy-substituted quinolyl

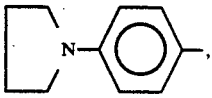

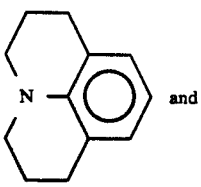

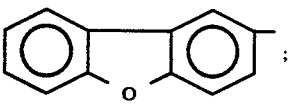

Z is selected from the group consisting of same substituents as X, phenyl, methyl-substituted phenyl, ethyl-substituted phenyl, propyl-substituted phenyl and butyl-substituted phenyl; Y is selected from the group consisting of phenylene, biphenylene, naphthylene, pyridylene, carbazolylene, N-methylcarbazolylene, N-ethylcarbazolylene, methyl-substituted phenylene, ethyl-substituted phenylene, methoxy-substituted phenylene and fluorenediyl; and the substituents for X, Y or Z may combine with each other to form a saturated five-membered ring or a saturated six-membered ring.

7. The organic electroluminescence element defined in claim 6, wherein X and Z are independently selected from the group consisting of the following electron-donating substituents:

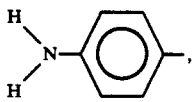

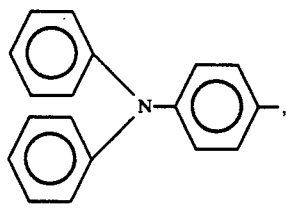

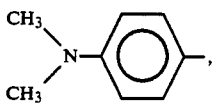

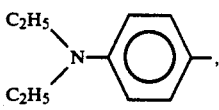

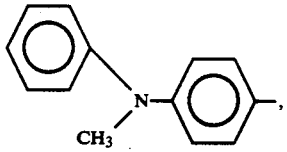

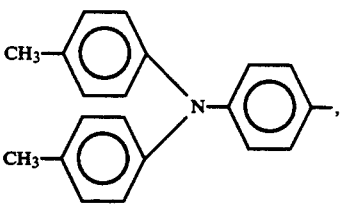

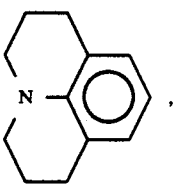

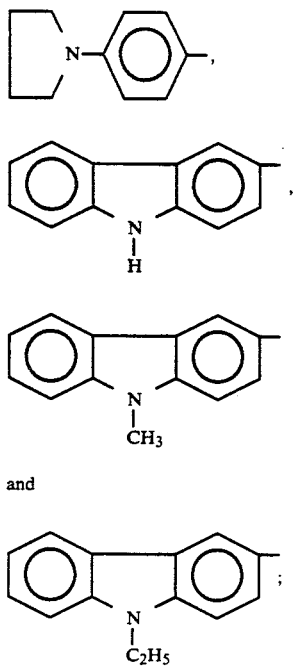

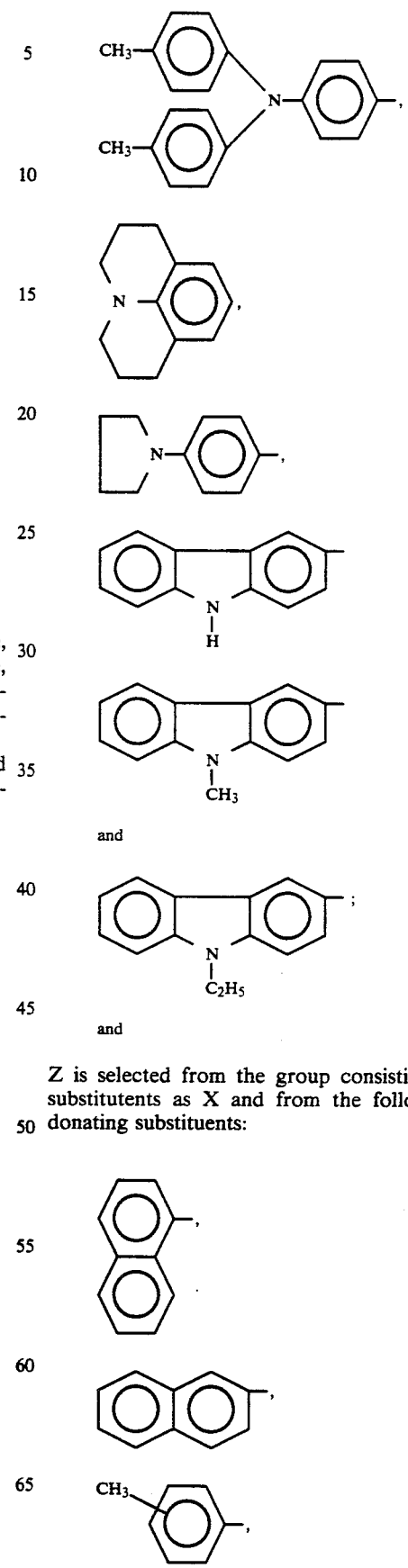

Y is selected from the group consisting of phenylene, biphenylene, naphthylene, pyridylene, carbazolylene, N-methylcarbazolylene, N-ethylcarbazolylene, methyl-substituted phenylene, ethyl-substituted phenylene, methoxy-substituted phenylene and fluorenediyl.

8. The organic electroluminescence element defined in claim 6, wherein X is selected from the group consisting of the following electron-donating substituents:

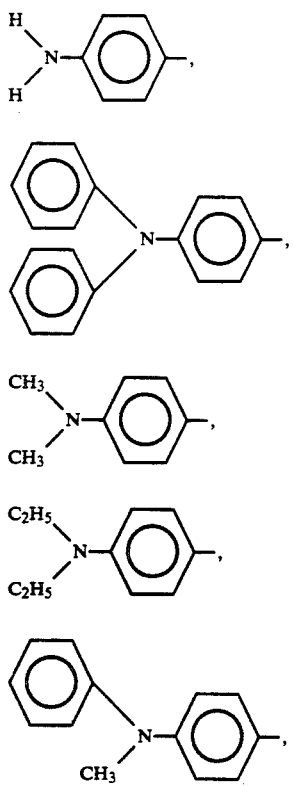

and

Z is selected from the group consisting of the same substitutents as X and from the following electron-donating substituents:

-continued

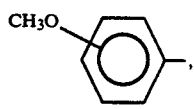

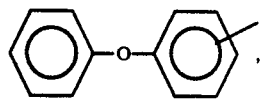

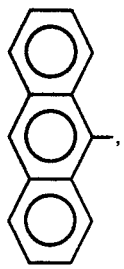

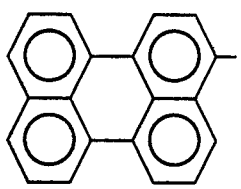

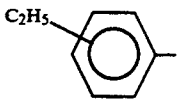

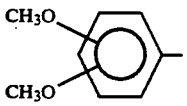

and

-continued

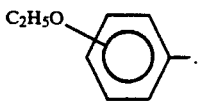

9. The organic electroluminescence element defined in claim 6, wherein X and Z are independently selected from the group consisting of the following electron-donating substituents:

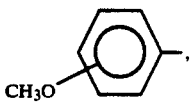

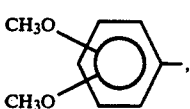

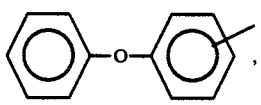

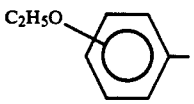

and

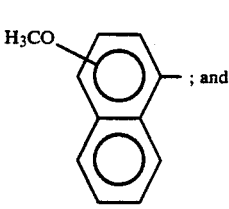 ; and

Y is selected from the group consisting of phenylene, biphenylene, naphthylene, pyridylene, carbazolylene, N-methylcarbazolylene, N-ethylcarbazolylene, methyl-substituted phenylene, ethyl-substituted phenylene, methoxy-substituted phenylene and fluoranediyl.

10. The organic electroluminescence element defined in claim 6, wherein at least one of said electrodes is transparent or semitransparent.

* * * * *

UNITED STATES PATENT AND TRADEMARK OFFICE
CERTIFICATE OF CORRECTION

PATENT NO. : 5,121,029
DATED : June 9, 1992
INVENTOR(S) : HOSOKAWA ET AL

It is certified that error appears in the above-identified patent and that said Letters Patent is hereby corrected as shown below:

Column 111, lines 28-29 (Claim 6):

Replace:

"methoxy-biphenyl" with --methoxy-substituted biphenyl--.

Signed and Sealed this

Twenty-sixth Day of October, 1993

*Attest:*

BRUCE LEHMAN

*Attesting Officer*　　　*Commissioner of Patents and Trademarks*